United States Patent
Okazaki et al.

(10) Patent No.: US 6,960,035 B2
(45) Date of Patent: Nov. 1, 2005

(54) LASER APPARATUS, EXPOSURE HEAD, EXPOSURE APPARATUS, AND OPTICAL FIBER CONNECTION METHOD

(75) Inventors: Yoji Okazaki, Kanagawa (JP); Hiromi Ishikawa, Kanagawa (JP); Kazuhiko Nagano, Kanagawa (JP); Takeshi Fujii, Kanagawa (JP); Hiromitsu Yamakawa, Saitama-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 260 days.

(21) Appl. No.: 10/409,675

(22) Filed: Apr. 9, 2003

(65) Prior Publication Data
US 2004/0022503 A1 Feb. 5, 2004

(30) Foreign Application Priority Data

| | | | |
|---|---|---|---|
| Apr. 10, 2002 | (JP) | ............ | 2002-108543 |
| May 23, 2002 | (JP) | ............ | 2002-149888 |
| Sep. 30, 2002 | (JP) | ............ | 2002-287632 |

(51) Int. Cl.[7] .......................... G02B 6/255
(52) U.S. Cl. .................. 385/96; 385/95; 385/98; 385/33
(58) Field of Search .................. 385/4, 40, 95–98, 385/31, 33; 359/197, 204

(56) References Cited

U.S. PATENT DOCUMENTS

| | | | | |
|---|---|---|---|---|
| 6,034,378 A | * | 3/2000 | Shiraishi | 250/559.29 |
| 6,519,387 B1 | * | 2/2003 | Sunagawa et al. | 385/33 |
| 6,535,271 B1 | * | 3/2003 | Ogasawara | 355/37 |
| 6,542,178 B2 | * | 4/2003 | Miyagawa et al. | 347/256 |
| 6,717,106 B2 | * | 4/2004 | Nagano et al. | 219/121.83 |
| 6,768,505 B2 | * | 7/2004 | Zelenka | 347/233 |

* cited by examiner

*Primary Examiner*—Akm Enayet Ullah
*Assistant Examiner*—Kevin S. Wood
(74) *Attorney, Agent, or Firm*—Sughrue Mion, PLLC

(57) ABSTRACT

An optical fiber of a bundled fiber light source is an optical fiber whose core diameter is uniform but whose emission end cladding diameter is smaller than an incidence end cladding diameter thereof, and a light emission region thereof is made smaller. An angle of luminous flux from this higher luminance bundled fiber light source, which passes through a lens system and is incident on a DMD, is smaller, i.e., an illumination NA is made smaller. Thus, an angle of flux which is incident on a surface that is to be exposed is smaller. That is, a minute image formation beam can be obtained without increasing the image formation NA, focal depth is lengthen.

6 Claims, 38 Drawing Sheets

M ROWS

N COLUMNS

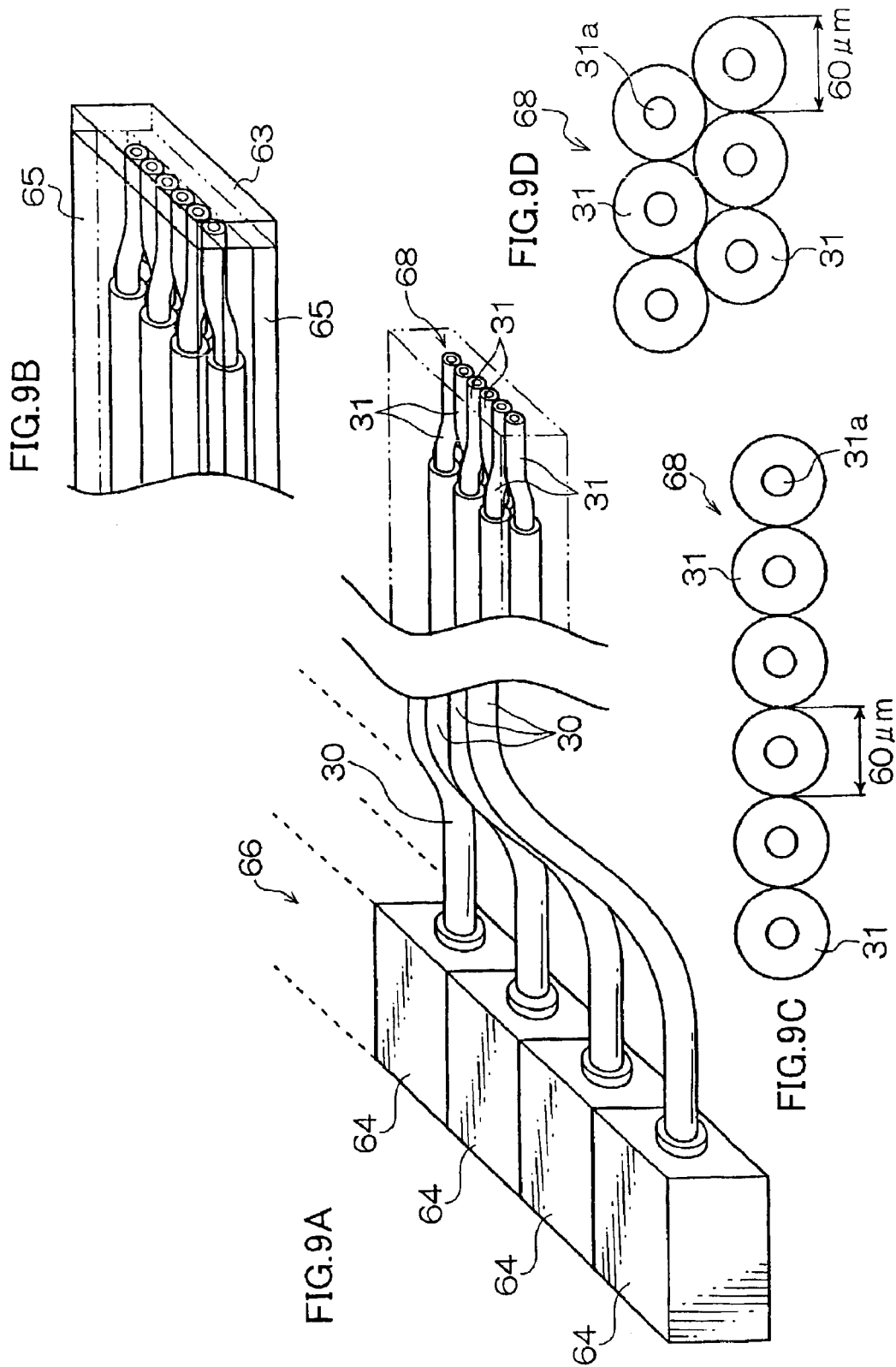

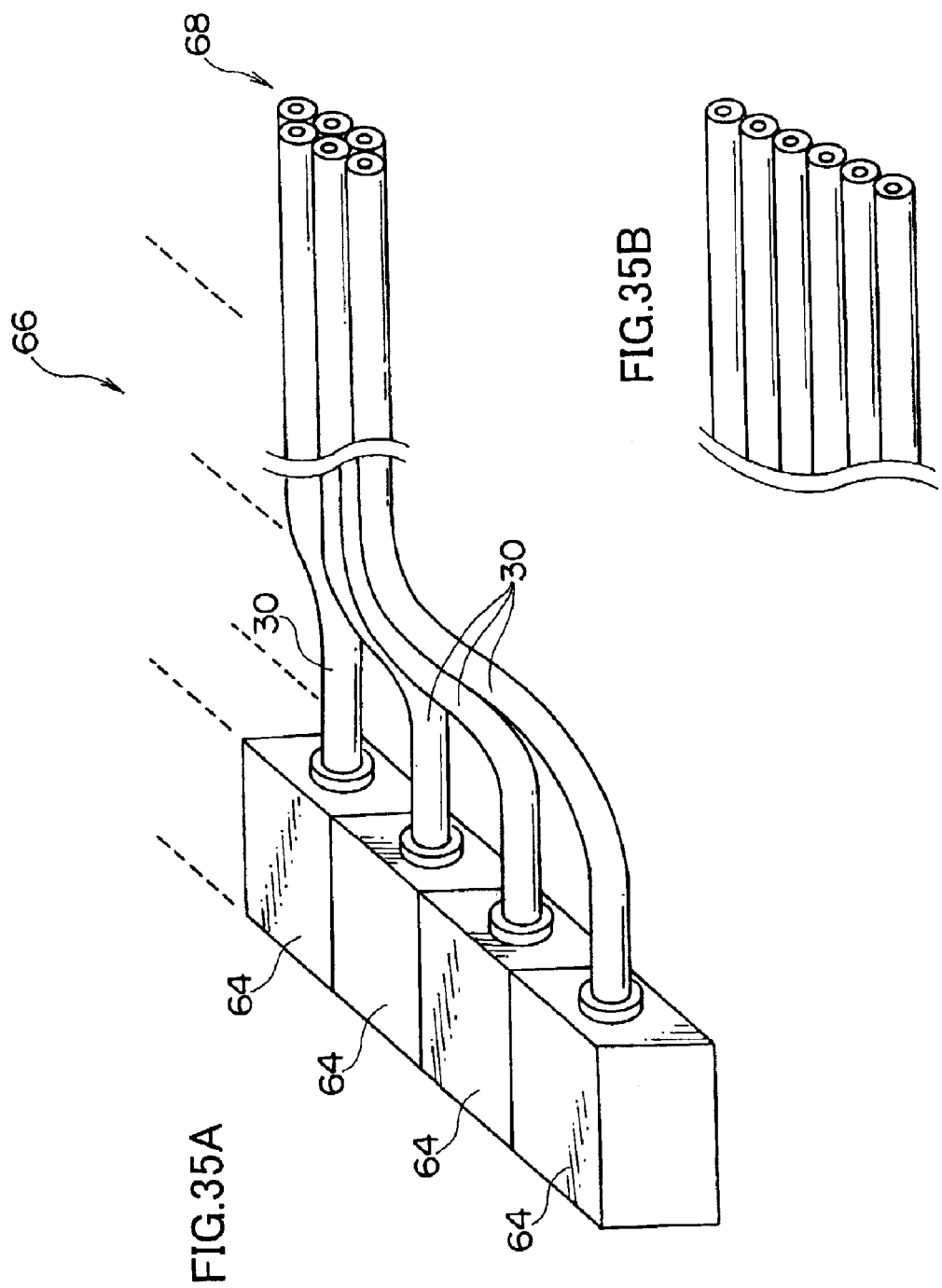

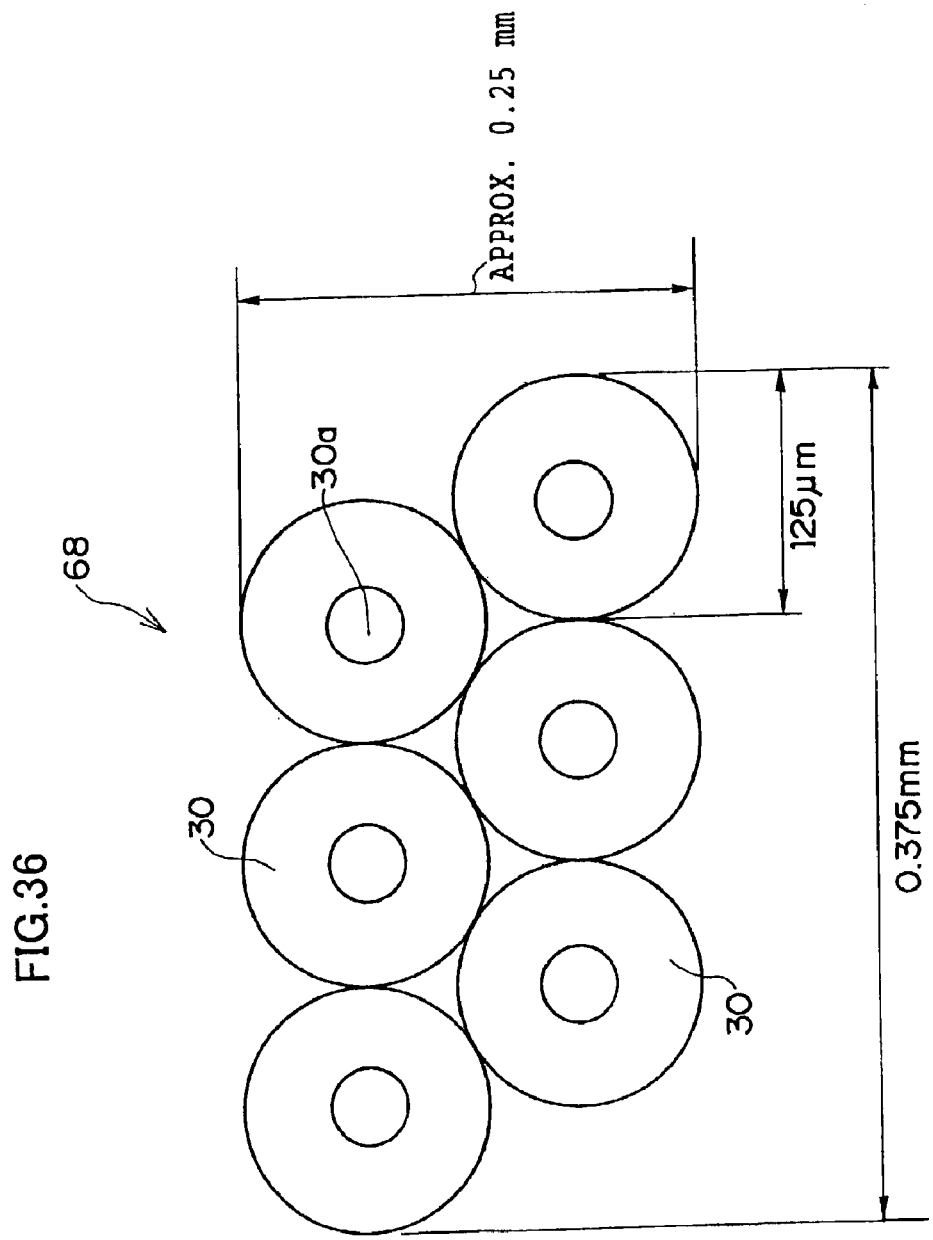

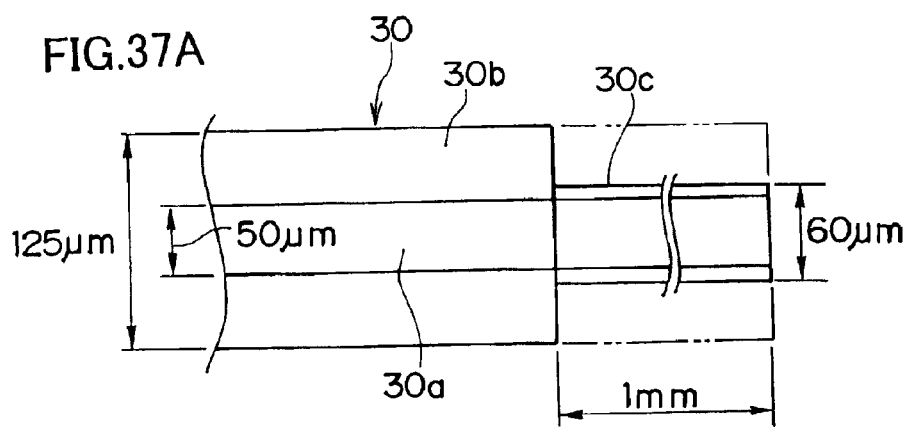
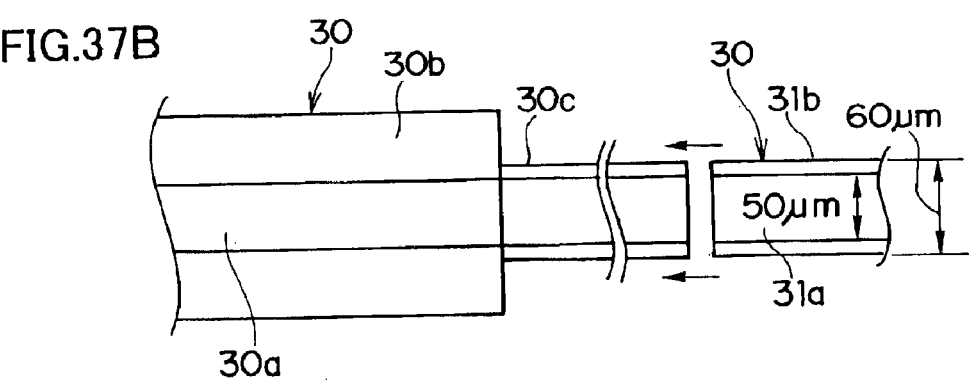
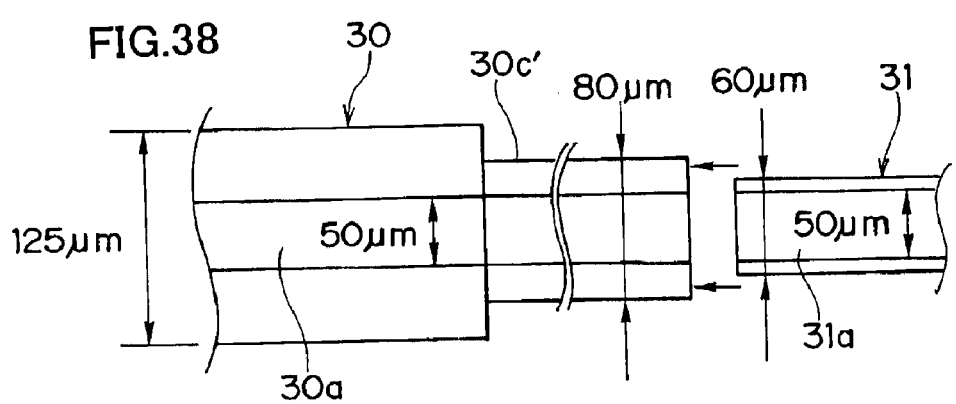

United States Patent US 6,960,035 B2

LASER APPARATUS, EXPOSURE HEAD, EXPOSURE APPARATUS, AND OPTICAL FIBER CONNECTION METHOD

BACKGROUND OF THE INVENTION

1. Field of the Invention

The present invention relates to a laser apparatus, an exposure head, and an exposure apparatus, and particularly relates to a suitable high-brightness laser apparatus which illuminates a spatial light-modulation element, an exposure head which exposes a photosensitive material with a laser beam modulated by a spatial light-modulation element in accordance with image data, and an exposure apparatus equipped with this exposure head.

Furthermore, the present invention relates to an optical fiber connection method and, in particular detail, to a method for connecting two optical fibers whose cladding diameters differ.

2. Description of the Prior Art

Heretofore, various exposure apparatuses which employ spatial light modulation elements such as digital micromirror devices (DMD) have been proposed for carrying out image exposure with light beams modulated in accordance with image data. An example of a DMD is a mirror device in which numerous micromirrors, which alter angles of reflection surfaces thereof in accordance with control signals, are arranged in a two-dimensional pattern on a semiconductor support of silicon or the like. An example of an exposure apparatus that utilizes such a DMD is, as shown in FIG. 15A, structured by a light source 1 which irradiates laser light, a lens system 2 which collimates the laser light irradiated from the light source 1, a DMD 3 which is disposed substantially at a focusing position of the lens system 2, and lens systems 4 and 6 which focus the laser light that has been reflected at the DMD 3 onto a scanning surface 5. In this exposure apparatus, the respective micromirrors of the DMD 3 are switched on and off by a control apparatus (not shown), in accordance with control signals generated in accordance with image data or the like, and modulate the laser light. Thus, image exposure is carried out by modulated laser light.

At the light source 1, a structural unit is plurally disposed. This structural unit is equipped, as shown in FIG. 29, with a single semiconductor laser 7, a single multi-mode optical fiber 8, and a pair of collimator lenses 9. The pair of collimator lenses 9 focuses laser light irradiated from the semiconductor laser 7 at an end face of the multi-mode optical fiber 8. The light source 1 is structured at a bundle-form fiber light source in which a plurality of the multi-mode optical fibers 8 are bundled.

Commonly, a laser with an output of around 30 mW (milliwatts) is employed as the semiconductor laser 7, and an optical fiber with a core diameter of 50 $\mu$m, a cladding diameter of 125 $\mu$m and an NA (numerical aperture) of 0.2 is employed as the multi-mode optical fiber 8. Accordingly, if an output of around 1 W (watt) is to be obtained, it is necessary to bundle a total of forty-eight (eight by six) of the multi-mode optical fibers 8 of the above-described structural units, and a diameter of the light emission point is about 1 mm.

However, in a conventional light source, the diameter of a light emission point becomes larger in the event of bundling and, consequently, there is a problem in that sufficient depth of focus cannot be obtained when a high resolution exposure head is to be structured. Sufficient focal depth cannot be obtained, in particular, in the case of very high resolution exposure with a beam diameter of around 1 $\mu$m. Moreover, beam blurring occurs at peripheral edge portions of an area-form exposure beam.

Further, when a high power output exposure head is structured with a conventional exposure head, the number of optical fibers that are bundled increases. Thus, there are problems in that, not only do costs increase, but diameter of a light emission point becomes larger, and the illumination NA with respect to the spatial light modulation element also becomes larger. As a result, the image formation NA of the image formation beam becomes larger. Thus, focal depth becomes shallower.

SUMMARY OF THE INVENTION

The present invention has been devised in the hope of solving the problems described above. A purpose of the present invention is to provide a high-brightness laser apparatus that enables size reduction of the illumination NA with respect to the spatial light modulation element. Another purpose of the present invention is to obtain a minute image formation spot without increasing the image formation NA of the image formation beam, and to thereby provide an exposure head and exposure apparatus capable of providing deep focal depth. Yet another purpose of the present invention is to provide an exposure head and exposure apparatus with high power outputs and low costs.

In order to achieve these purposes, a laser apparatus of the present invention includes a fiber light source which includes an optical fiber with an incidence end and an emission end, the fiber light source emitting laser light that enters the incidence end of the optical fiber from the emission end of the optical fiber, wherein the optical fiber includes an optical fiber having a uniform core diameter and a cladding diameter of the emission end which is smaller than a cladding diameter of the incidence end.

Because the laser apparatus of the present invention is equipped with the fiber light source which emits laser light that has entered through the incidence end of the optical fiber from the emission end thereof, and utilizes the optical fiber in which the core diameter is uniform but the cladding diameter of the incidence end is smaller than the cladding diameter of the emission end, a light emission portion diameter of the light source can be made smaller and higher luminance can be provided.

The fiber light source may, for example, be a fiber light source with a structure in which a single semiconductor laser is joined at the incidence end of a single optical fiber. However, a multiplex laser light source in which a plurality of laser lights are multiplexed and respectively fed into an optical fiber is favorable. Higher output can be obtained by employing a multiplex laser light source. Further, light emission points at emission ends of optical fibers of a plurality of fiber light sources can be arranged in an array pattern to form a fiber array light source, or the respective light emission points can be arranged in the form of a bundle to form a fiber bundle light source. Even in such cases of bundling or arraying, the number of optical fibers that are bundled/arrayed in order to obtain the same light output may be smaller, and costs are lower. Furthermore, when the number of optical fibers is small, a light emission region when the optical fibers are bundled or arrayed can also be made small. In other words, luminance can be made higher.

A multiplex laser light source may, for example, be: (1) a structure which includes a plurality of semiconductor lasers, a single optical fiber, and a condensing optical system which condenses laser light emitted from each of the plurality of semiconductor lasers and focuses the condensed beams at the incidence end of the optical fiber; (2) a structure which includes a multi-cavity laser provided with a plurality of light emission points, a single optical fiber, and a condensing optical system which condenses laser light emitted from each of the plurality of light emission points and focuses the condensed beams at the incidence face of the optical fiber; or (3) a structure which includes a plurality of multi-cavity lasers, a single optical fiber, and a condensing optical system which condenses laser light emitted from each of a plurality of light emission points of the plurality of multi-cavity lasers and focuses the condensed beams at the incidence end of the optical fiber.

From the viewpoint of the diameter of a light emission point being small, it is preferable if the cladding diameter of the emission end of the optical fiber is smaller than 125 $\mu$m, more preferably 80 $\mu$m or less, and particularly preferably 60 $\mu$m or less. An optical fiber in which the core diameter is uniform and the cladding diameter of the emission end is smaller than the cladding diameter of the incidence end may be structured by, for example, joining a plurality of optical fibers with the same core diameter and different cladding diameters. Furthermore, when a plurality of optical fibers are structured to be detachably connected with a connector or connectors, replacement in a case in which the light source module is partially damaged or the like is simple.

In order to achieve the aforementioned purposes, an exposure head of the present invention includes: the laser apparatus of the present invention; a spatial modulation element which modulates laser light irradiated from the laser apparatus, the spatial modulation element including numerous pixel portions, light modulation states of which change in accordance with respective control signals, the pixel portions being arranged in a two-dimensional form on a support; and an optical system for focusing laser light that has been modulated at the pixel portions on an exposure surface. Further, the exposure apparatus of the present invention includes: the exposure head of the present invention; and moving means which moves the exposure head relatively with respect to the exposure surface.

In the exposure head of the present invention and the exposure apparatus of the present invention, the spatial modulation element modulates the laser light from the laser apparatus and controls exposure. Because the high-brightness laser apparatus is provided to serve as the laser apparatus, long focal depth can be obtained. Furthermore, in a case in which a multiplex laser light source at which a plurality of laser lights are multiplexed and fed into respective optical fibers is utilized as the fiber light source structuring the laser apparatus, high power output can be obtained. Moreover, even in a case of bundling or arraying, the number of light fibers need only be small, and lower costs can be expected.

As the spatial modulation element, a micromirror device (a DMD: digital micromirror device) at which a large number of reflection surfaces, whose angles are adjustable in accordance with respective control signals, are arranged in a two-dimensional pattern on a micromirror support (for example, a silicon support) can be utilized. Further, the spatial modulation element may be structured with a one-dimensional grating light valve (GLV) whose structure includes numerous movable grilles and fixed grilles alternately disposed in parallel. The movable grilles are provided with ribbon-like reflection surfaces and are movable in accordance with control signals, and the fixed grilles are provided with ribbon-like reflection surfaces. Further still, the spatial modulation element may be structured with a two-dimensional light valve array in which GLVs are arranged in the form of an array. Further again, a liquid crystal shutter array whose structure includes numerous liquid crystal cells, which are capable of blocking transmitted light in accordance with respective control signals, arranged in a two-dimensional pattern on a support may be utilized.

It is preferable if a microlens array is disposed at an emission side of the spatial modulation element. The microlens array is provided with microlenses which are provided in respective correspondence with pixel portions of the spatial modulation element and which condense laser light from the respective pixels. In a case in which a microlens array is disposed thus, the laser lights that have been modulated at the respective pixel portions of the spatial modulation element are condensed to correspond with respective pixels by the microlenses of the microlens array. Consequently, even in a case in which an exposure area at a surface to be exposed is enlarged, the size of each of beam spots can be reduced, and exposure can be carried out with high precision.

It is also preferable if a collimator lens and a light intensity distribution-correcting optical system are disposed between the laser apparatus and the spatial modulation element. The collimator lens makes luminous flux from the laser apparatus parallel flux. The light intensity distribution-correcting optical system converts a flux width at each of emission positions such that a ratio of a flux width at a peripheral edge portion to a flux width at a central portion, which is near an optical axis, is smaller at an emission side of the light intensity distribution-correcting optical system than at an incidence side thereof, and corrects a light intensity distribution of the laser light that has been converted to parallel flux by the collimator lens so as to be substantially uniform at irradiated faces of the spatial modulation element.

As a result of this light intensity distribution-correcting optical system, in which, for example, light with flux widths that are the same at the incidence side, at the emission side, the flux width at the central portion is greater in comparison with the peripheral edge portion and, conversely, the flux width at the peripheral edge portion is smaller in comparison with the central portion. Thus, because flux of the central portion can be brought to the peripheral edge portion, the spatial modulation element can be illuminated with light whose light intensity distribution is substantially uniform, without reducing usage efficiency of the light as a whole. Consequently, a high quality image can be exposed at the exposed surface, without the occurrence of exposure irregularities. Note that, a conventional rod integrator or a fly-eye lens array may be utilized as the amount distribution correction optical system.

The spatial modulation element of the exposure head and exposure apparatus of the present invention can be controlled with control signals that are generated in accordance with exposure information for each of a plurality of the pixel portions whose number is smaller than the total number of pixel portions arranged on the support. That is, rather than controlling all of the pixel portions arranged on the support, a subsection of the pixel portions can be controlled. Consequently, a transmission rate of the control signals can be made shorter than in a case in which control signals are transmitted for all of the pixel portions, and a modulation rate of the laser light can be made faster. As a result, high-speed exposure is possible.

Conventionally, in exposure devices which expose photosensitive materials with ultraviolet-region laser light (ultraviolet exposure devices), it has been common to employ gas lasers, such as argon lasers and the like, and solid lasers with THG (third harmonics). However, these exposure devices have had problems in that the devices are large and difficult to maintain, and exposure speeds are slow. The exposure apparatus of the present invention can be made to serve as an ultraviolet exposure device by utilizing a GaN-based (gallium nitride) semiconductor laser with a wavelength of 350 to 450 nm as the laser apparatus. This ultraviolet exposure device can be provided with smaller size and lower cost than the conventional ultraviolet exposure devices. Moreover, high speed, high accuracy exposure is possible.

The exposure device of the present invention may be suitably applied to an optical modelling device in which a light beam exposes a photo-curable resin to form a three-dimensional model, a lamination modelling device which sinters a powder with a light beam to form sintered layers and accumulates the sintered layers to form a three-dimensional model which is constituted by a sintered powder body, and the like.

An optical modelling device may, for example, be provided with a modelling tank which accommodates a photo-curable resin, a support table which is for supporting a model and is movable up and down within the modelling tank, and an exposure head which includes: a laser apparatus which irradiates laser light; a spatial modulation element including a large number of pixel portions whose light modulation states change in accordance with respective control signals, and which are arranged in a two-dimensional pattern on a support, and modulate the laser light irradiated from the laser apparatus; and an optical system which focuses the laser light that has been modulated by the respective pixel portions onto a liquid surface of the photo-curable resin accommodated in the modelling tank. This optical modelling device is also provided with moving means for moving the exposure head relative to the liquid surface of the photo-curable resin. If the laser apparatus of the present invention is utilized in this optical modelling device, high-speed, high-precision modelling is possible. A specific device structure is disclosed in Japanese Patent Application No. 2001-274360.

A lamination modelling device may, for example, be provided with a modelling tank which accommodates a powder to be sintered by irradiation of light, a support table which is for supporting a model and is movable up and down within the modelling tank, and an exposure head which includes: a laser apparatus which irradiates laser light; a spatial modulation element including a large number of pixel portions whose light modulation states change in accordance with respective control signals, and which are arranged in a two-dimensional pattern on a support, in accordance with respective control signals and modulate the laser light irradiated from the laser apparatus; and an optical system which focuses the laser light that has been modulated by the respective pixel portions onto the surface of the powder accommodated in the modelling tank. This lamination modelling device is also provided with moving means for moving the exposure head relative to the surface of the powder. If the laser apparatus of the present invention is utilized in this lamination modelling device, high-speed, high-precision modelling is possible. A specific device structure is disclosed in Japanese Patent Application No. 2001-274351.

A further purpose of the present invention is to provide a method capable of reliably joining optical fibers which have a large difference in external diameters.

A first optical fiber connection method according to the present invention is a method for connecting two optical fibers with different cladding diameters, which method includes the steps of: machining cladding of one end portion of the optical fiber whose cladding diameter is larger to a diameter substantially the same as the cladding diameter of the optical fiber whose cladding diameter is smaller; and fusing the optical fiber whose cladding diameter is smaller to the one end portion of the optical fiber that has been machined.

A second optical fiber connection method according to the present invention is similarly a method for connecting two optical fibers with different cladding diameters, which method includes the steps of: machining cladding of one end portion of the optical fiber whose cladding diameter is larger to a diameter intermediate to the cladding diameters of the two optical fibers; and fusing the optical fiber whose cladding diameter is smaller to the one end portion of the optical fiber that has been machined.

A third optical fiber connection method according to the present invention is similarly a method for connecting two optical fibers with different cladding diameters, which method includes the steps of: fusing one end portion of an optical fiber with a cladding diameter intermediate to the cladding diameters of the two optical fibers to the optical fiber whose cladding diameter is larger; and fusing the other end portion of the optical fiber with the intermediate cladding diameter to the optical fiber whose cladding diameter is smaller.

In the first optical fiber connection method according to the present invention, the cladding at the one end of the optical fiber whose cladding diameter is larger is machined to substantially the same diameter as the cladding diameter of the optical fiber whose cladding diameter is small, and the optical fiber whose cladding diameter is smaller is fused to the one end portion of the optical fiber that has been machined. Thus, fusion-splicing is applied to two optical fibers which have substantially the same cladding diameter. Accordingly, the two optical fibers can be easily and reliably joined without, as in a case in which two optical fibers whose diameters differ greatly are joined by fusing, an optical fiber whose external diameter is smaller being excessively melted or, conversely, an optical fiber whose external diameter is larger not being melted.

In the second optical fiber connection method according to the present invention, the cladding at the one end of the optical fiber whose cladding diameter is larger is machined to an intermediate diameter between the cladding diameters of the two optical fibers, and the optical fiber whose cladding diameter is smaller is fused to the one end portion of the optical fiber that has been machined. Thus, fusion-splicing is applied to two optical fibers whose cladding diameters do not differ greatly. Accordingly, with this method too, the optical fibers can be easily and reliably joined without, as in the case in which two optical fibers whose diameters differ greatly are joined by fusing, the optical fiber whose external diameter is smaller being excessively melted or, conversely, the optical fiber whose external diameter is larger not being melted.

In the third optical fiber connection method according to the present invention, the optical fiber whose cladding diameter is larger and the optical fiber whose cladding diameter is smaller are joined by fusing via an optical fiber therebetween which has an intermediate cladding diameter between the cladding diameters of these two optical fibers. Thus, fusion-splicing is applied to the optical fiber having the intermediate cladding diameter and the optical fiber having the larger cladding diameter and fusion-splicing is applied to the optical fiber having the intermediate cladding diameter and the optical fiber having the smaller cladding diameter, without cladding diameters of the pair of optical fibers in either case differing greatly. Accordingly, with this method too, the optical fibers can be easily and reliably joined without, as in the case in which two optical fibers whose diameters differ greatly are joined by fusing, the optical fiber whose external diameter is smaller being excessively melted or, conversely, the optical fiber whose external diameter is larger not being melted.

BRIEF DESCRIPTION OF THE DRAWINGS

FIG. 9A is a perspective view showing structure of a fiber array light source.

FIG. 9B is a partial enlarged view of the fiber array light source shown in FIG. 9A.

FIG. 9C is a plan view showing an arrangement of light emission points at a laser emission section.

FIG. 9D is a plan view showing another arrangement of light emission points at a laser emission section.

FIG. 35A is a perspective view showing structure of a fiber bundle light source.

FIG. 35B is a perspective view showing structure of a different fiber array light source.

FIG. 36 is a plan view showing an end face of a laser emission portion of a bundle-form fiber light source.

FIGS. 37A and 37B are views for explaining one example of an optical fiber connection method.

FIG. 38 is a view for explaining another example of an optical fiber connection method.

DETAILED DESCRIPTION OF THE PREFERRED EMBODIMENTS

Below, embodiments of the present invention will be described in detail with reference to the drawings.

First Embodiment

Structure of Exposure Apparatus

Figure 1:
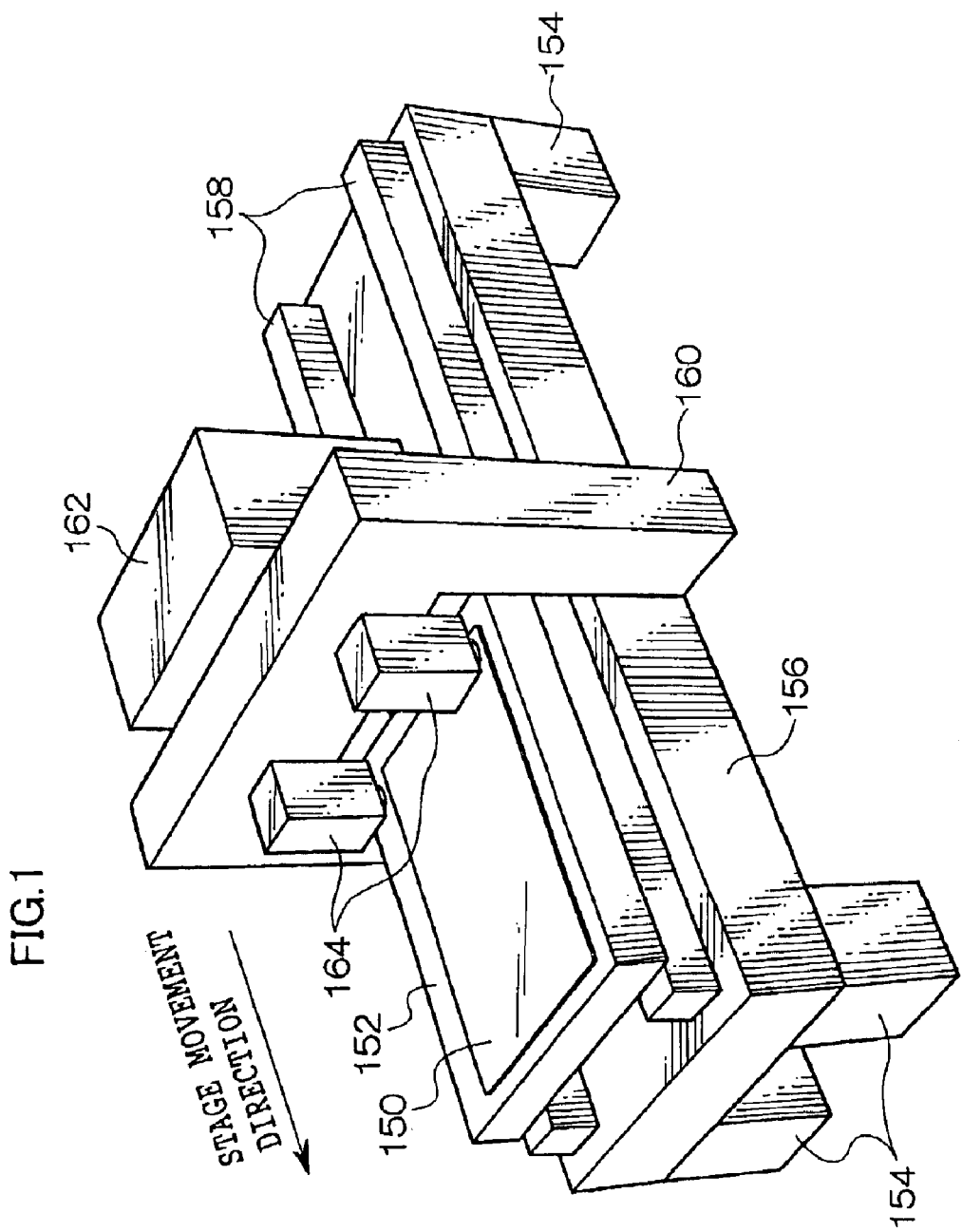
FIG. 1 is a perspective view showing the exterior of an exposure apparatus relating to a first embodiment of the present invention.

As shown in FIG. 1, an exposure apparatus relating to an embodiment of the present invention is provided with a flat board-form stage 152, which sucks and retains a sheet-form photosensitive material 150 at a surface thereof. Two guides 158, which extend in a stage movement direction, are provided at an upper face of a thick board-form equipment pedestal 156, which is supported by four leg portions 154. The stage 152 is disposed such that a longitudinal direction thereof is oriented in the stage movement direction, and is supported by the guides 158 so as to be movable reciprocally. In the exposure apparatus, an unillustrated driving apparatus is provided for driving the stage 152 along the guides 158.

At a central portion of the equipment pedestal 156, an inverted 'U'-like gate 160 is provided so as to straddle a movement path of the stage 152. Respective end portions of the inverted 'U'-like gate 160 are fixed at two side faces of the equipment pedestal 156. Sandwiching the gate 160, a scanner 162 is provided at one side, and a plurality (for example, two) of detection sensors 164 are provided at the other side. The detection sensors 164 detect a leading end and a trailing end of the photosensitive material 150. The scanner 162 and the detection sensors 164 are respectively mounted at the gate 160, and are fixedly disposed upward of the movement path of the stage 152. The scanner 162 and detection sensors 164 are connected to an unillustrated controller which controls the scanner 162 and detection sensors 164.

Figure 2:
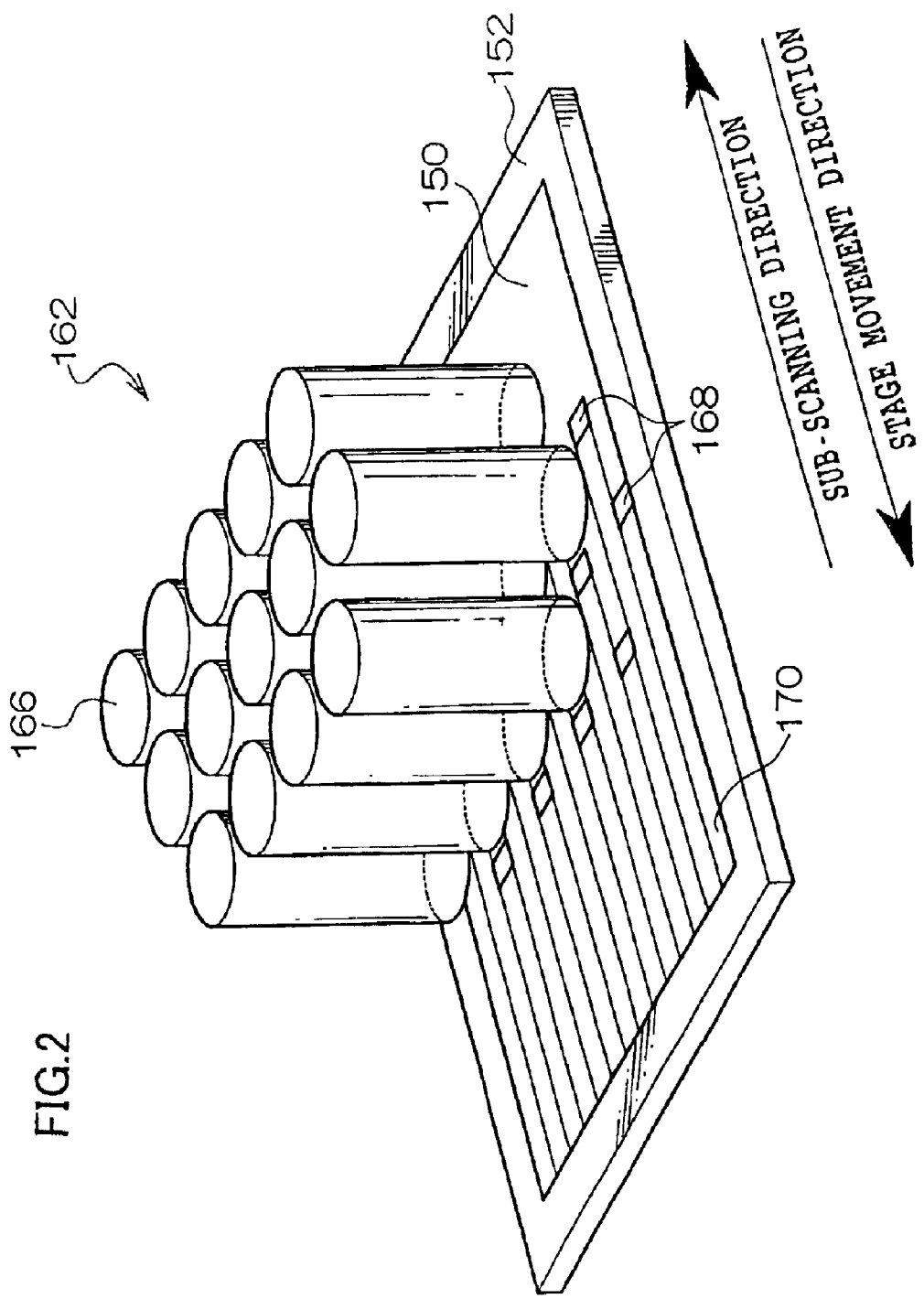
FIG. 2 is a perspective view showing a structure of a scanner of the exposure apparatus relating to the first embodiment of the present invention.
Figure 3A:
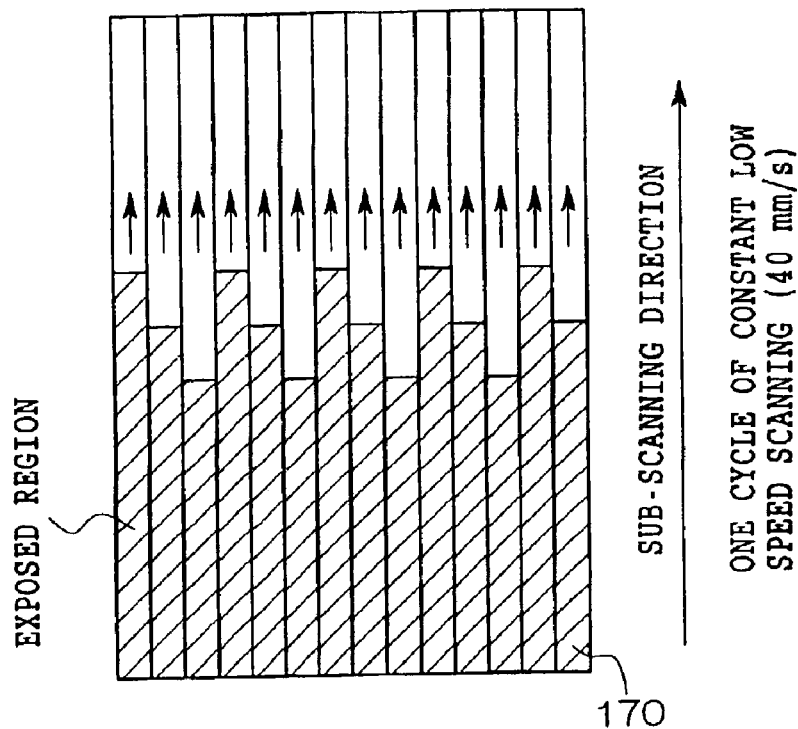
FIG. 3A is a plan view showing exposed regions formed at a photosensitive material.
Figure 3B:
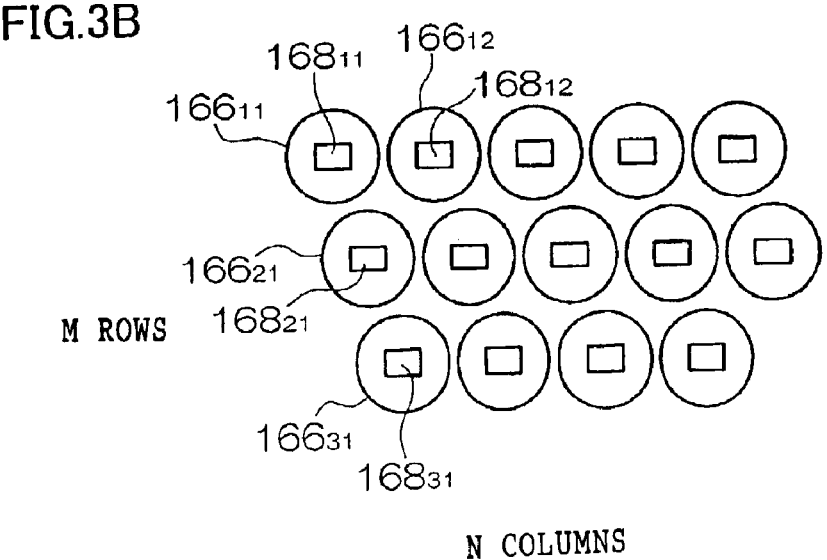
FIG. 3B is a view showing an arrangement of exposure areas due to respective exposure heads.

As shown in FIGS. 2 and 3B, the scanner 162 is equipped with a plurality (for example, fourteen) of exposure heads 166, which are arranged substantially in a matrix pattern with m rows and n columns (for example, three rows and five columns). In this example, in consideration of width of the photosensitive material 150, four of the exposure heads 166 are provided in the third row. Note that when an individual exposure head, which is arranged in the m-th row and the n-th column is to be referred to, that exposure head is denoted as exposure head $166_{mn}$.

Exposure areas 168 covered by the exposure heads 166 have rectangular shapes with short sides thereof in a sub-scanning direction. Consequently, in accordance with movement of the stage 152, band-form exposed regions 170 are formed on the photosensitive material 150 at the respective exposure heads 166. Note that when an exposure area formed by an individual exposure head, which is arranged in the m-th row and the n-th column, is to be referred to, that exposure area is denoted as exposure area $168_{mn}$.

As shown in FIGS. 3A and 3B, in each row, the respective exposure heads, which are arranged in a line, are disposed to be offset by a predetermined interval in a row arrangement direction (which interval is an integer multiple (two in the present embodiment) of the long dimension of the exposure areas), such that the band-form exposed regions 170 will be lined up without gaps therebetween in a direction intersecting the sub-scanning direction. Thus, a portion that cannot be exposed between exposure area $168_{11}$ and exposure area $168_{12}$ of the first row can be exposed by exposure area $168_{21}$ of the second row and exposure area $168_{31}$ of the third row.

Figure 4:
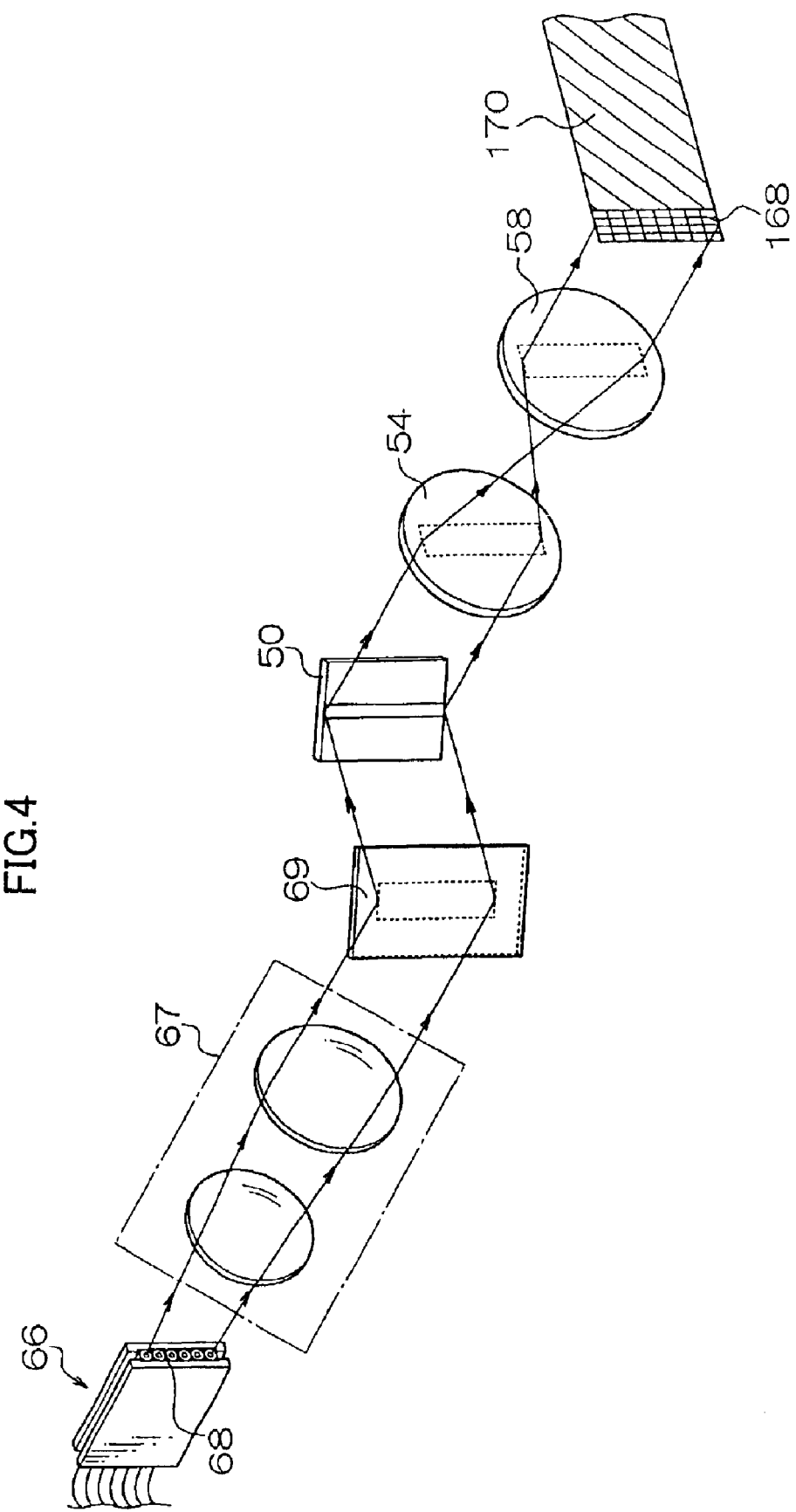
FIG. 4 is a perspective view showing schematic structure of an exposure head of the exposure apparatus relating to the first embodiment of the invention.
Figure 5A:
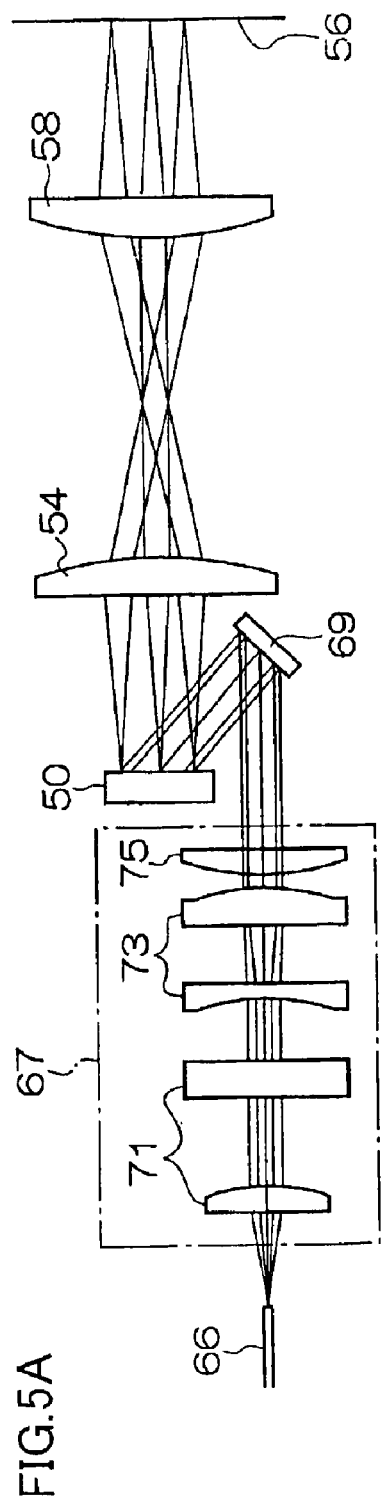
FIG. 5A is a sectional view, cut in a sub-scanning direction along an optical axis, showing structure of the exposure head shown in FIG. 4.
Figure 5B:
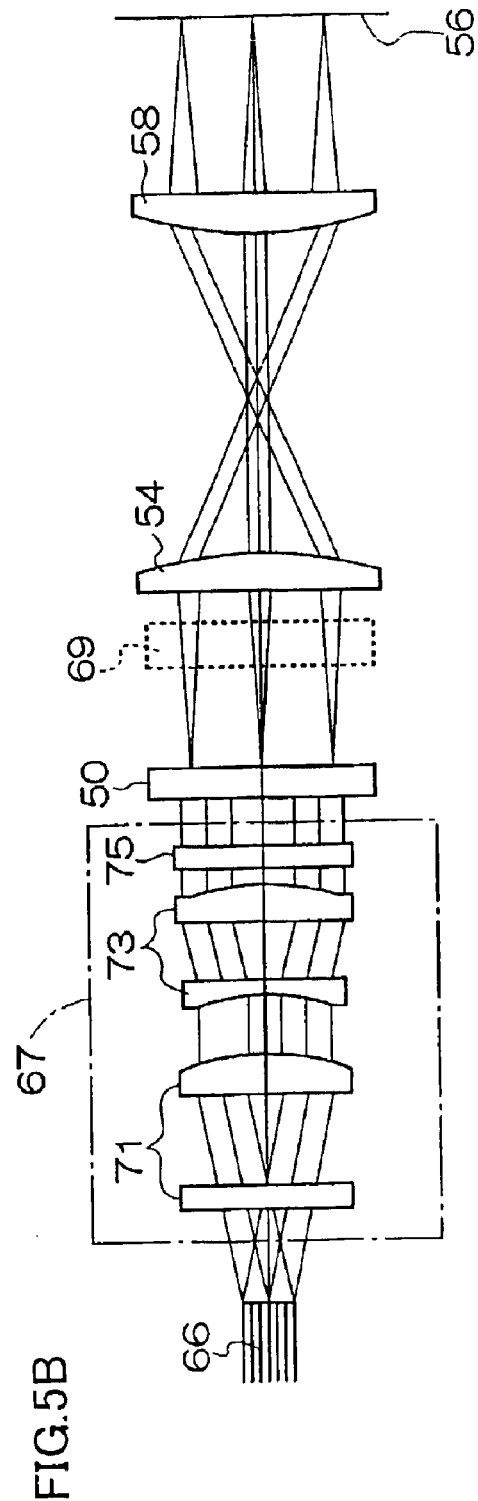
FIG. 5B is a side view showing a structure of the exposure head shown in FIG. 4.

As shown in FIGS. 4, 5A and 5B, at each of the exposure areas $166_{11}$ to $166_{mn}$, a digital micromirror device (DMD) 50 is provided to serve as a spatial modulation element for modulating an incident light beam at each of pixels in accordance with image data. The DMD 50 is connected with an unillustrated controller, which is provided with a data processing section and a mirror driving control section. At the data processing section of this controller, on the basis of inputted image data, driving signals are generated for driving control of each micromirror in a region of the DMD 50 at the corresponding exposure head 166 which region is to be controlled. The regions that are to be controlled are described later. The mirror driving control section controls the angle of a reflection surface of each micromirror of the DMD 50 at the corresponding exposure head 166, on the basis of the control signals generated at the image data processing section. Control of the angles of the reflection faces is described later.

At a light incidence side of the DMD 50, a fiber array light source 66, a lens system 67 and a mirror 69 are disposed in this order. The fiber array light source 66 is equipped with a laser emission section in which emission end portions (light emission points) of optical fibers are arranged in a row along a direction corresponding to the direction of the long sides of the exposure area 168. The lens system 67 corrects laser light that is emitted from the fiber array light source 66, and focuses the light on the DMD. The mirror 69 reflects the laser light that has been transmitted through the lens system 67 toward the DMD 50.

The lens system 67 is structured with a single pair of combination lenses 71, which make the laser light that has been emitted from the fiber array light source 66 parallel, a single pair of combination lenses 73, which correct the laser light that has been made parallel such that a light intensity distribution is uniform, and a condensing lens 75 that focuses the laser light whose light intensity distribution has been corrected on the DMD. The combination lenses 73 have the functions of, in the direction of arrangement of the laser emission ends, broadening portions of luminous flux that are close to an optical axis of the lenses and narrowing portions of the luminous flux that are distant from the optical axis, and in a direction intersecting this direction of arrangement, transmitting the light unaltered. Thus, the laser light is corrected such that the light intensity distribution is uniform. Here, an example of means for correcting distribution of the light intensity has been shown. However, conventionally known means for making the distribution of the light intensity uniform, such as rod integrator, fly-eye lens array or the like, may be used.

Lens systems 54 and 58 are disposed at a light reflection side of the DMD 50. The lens systems 54 and 58 focus the laser light that has been reflected at the DMD 50 on a scanning surface (a surface that is to be exposed) 56 of the photosensitive material 150. The lens systems 54 and 58 are disposed such that the DMD 50 and the surface to be exposed 56 have a conjugative relationship.

Figure 6:
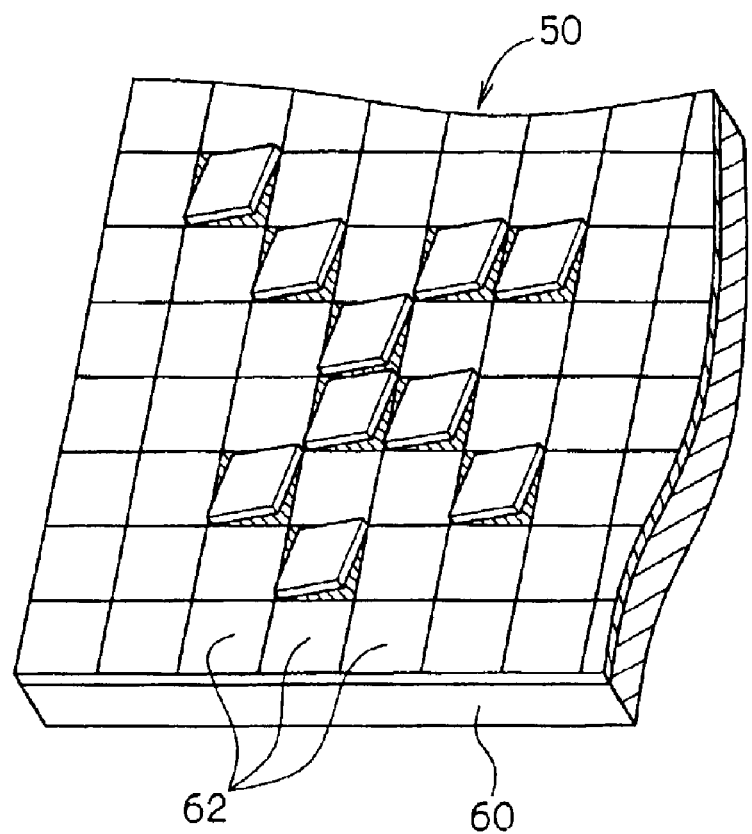
FIG. 6 is a partial enlarged view showing a structure of a digital micromirror device (DMD).

As shown in FIG. 6, at the DMD 50, very small mirrors (micromirrors) 62, which are supported by support columns, are disposed on an SRAM cell (memory cell) 60. The DMD 50 is a mirror device which is structured with a large number (for example, 600 by 800) of these extremely small mirrors, which structure picture elements (pixels), arranged in a checkerboard pattern. At each pixel, the micromirror 62 is provided so as to be supported at an uppermost portion of the support column. A material with high reflectivity, such as aluminum or the like, is applied by vapor deposition on the surface of the micromirror 62. Here, the reflectivity of the micromirror 62 is at least 90%. An SRAM cell 60 with CMOS silicon gates, which is fabricated by a usual semiconductor memory production line, is disposed directly under the micromirror 62, with the support column, which includes a hinge and a yoke, interposed therebetween. The whole of this structure is monolithic (integrated).

Figure 7A:
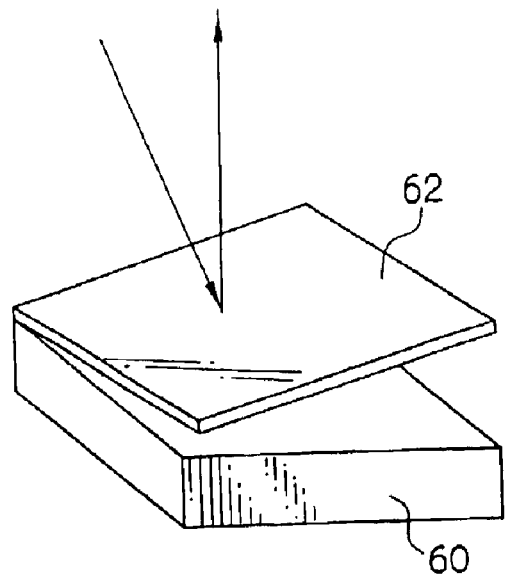
FIGS. 7A and 7B are explanatory views for explaining operation of the DMD.
Figure 7B:
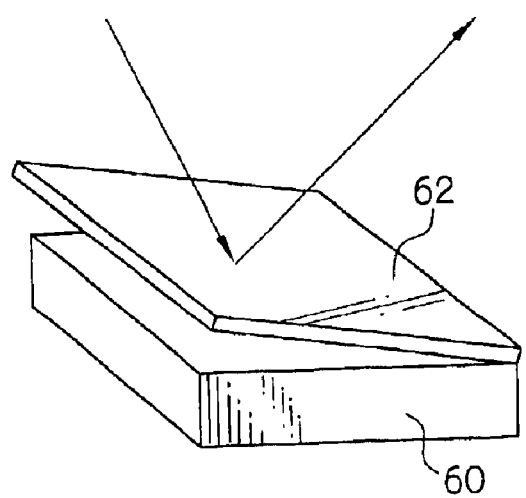

When digital signals are written to the SRAM cell 60 of the DMD 50, the micromirrors 62 supported at the support columns are inclined, about a diagonal of the micromirror 62, within a range of $\pm\alpha°$ (for example, $\pm10°$), relative to the side of the support at which the DMD 50 is disposed. FIG. 7A shows a state in which the micromirror 62 is inclined at $+\alpha°$, which is an 'ON' state, and FIG. 7B shows a state in which the micromirror 62 is inclined at $-\alpha°$, which is an 'OFF' state. Accordingly, as a result of control of the inclinations of the micromirrors 62 at the pixels of the DMD 50 in accordance with image signals, as shown in FIG. 6, light that is incident at the DMD 50 is reflected in directions of inclination of the respective micromirrors 62.

FIG. 6 shows a portion of the DMD 50 enlarged, and shows an example of a state in which the micromirrors 62 are controlled to $+\alpha°$ and $-\alpha°$. The ON-OFF control of the respective micromirrors 62 is carried out by the unillustrated controller connected to the DMD 50. A light-absorbing body (which is not shown) is disposed in the direction in which light beams are reflected by the micromirrors 62 that are in the OFF state.

Figure 8B:
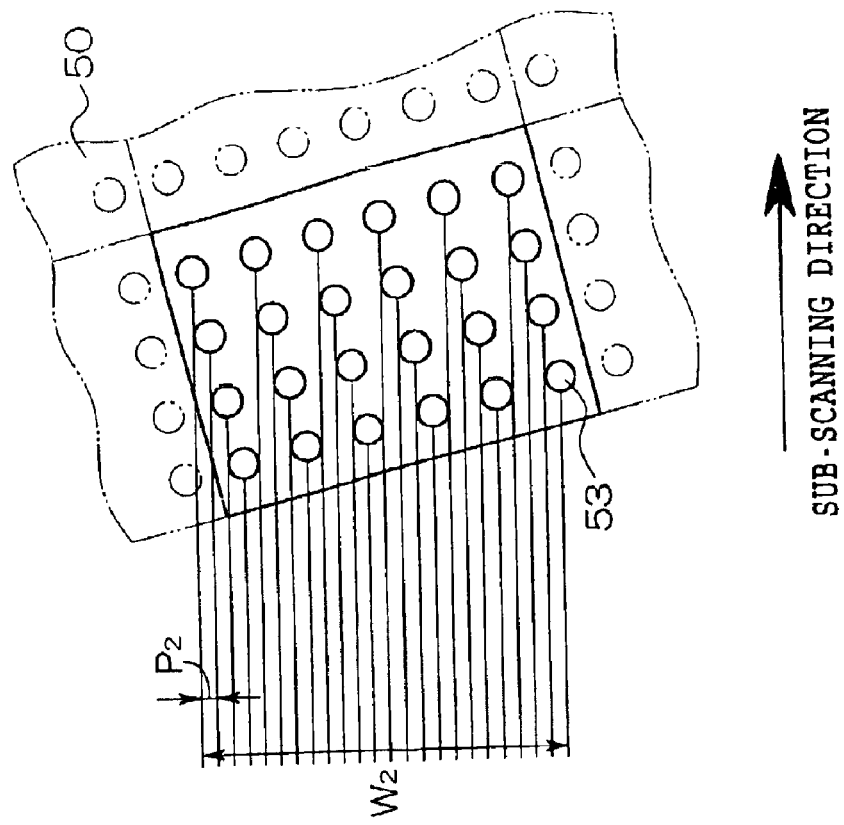
FIG. 8B is a plan view showing positions of exposure beams and scanning lines in a case in which the DMD is disposed at an angle.
Figure 8A:
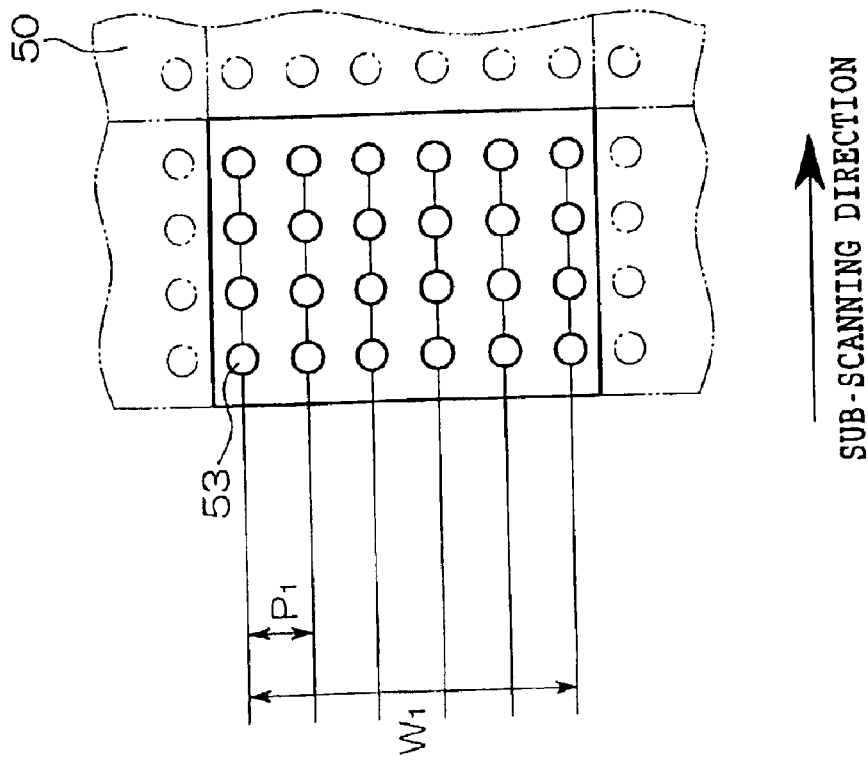
FIG. 8A is a plan view showing positions of exposure beams and scanning lines in a case in which the DMD is not disposed at an angle.

It is preferable if the DMD 50 is disposed to be slightly inclined, such that a short side thereof forms a predetermined angle θ (for example, 1° to 5°) with the sub-scanning direction. FIG. 8A shows scanning tracks of reflected light images (exposure beams) 53 formed by the micromirrors in a case in which the DMD 50 is not inclined. FIG. 8B shows scanning tracks of the exposure beams 53 in the case in which the DMD 50 is inclined.

At the DMD 50, a large number (for example, 800) of micromirrors are arranged in a long side direction to form a micromirror row, and a large number (for example, 600) of these micromirror rows are arranged in a short side direction. As shown in FIG. 8B, when the DMD 50 is inclined, a pitch P2 of scanning paths (scanning lines) of the exposure beams 53 from the micromirrors is tighter than a pitch P1 of scanning lines in the case in which the DMD 50 is not inclined. Thus, resolution can be greatly improved. However, because the angle of inclination of the DMD 50 is very small, a scanning width W2 in the case in which the DMD 50 is inclined is substantially the same as a scanning width W1 in the case in which the DMD 50 is not inclined.

The same scanning line will be superposingly exposed by different micromirror rows (multiple exposure). As a consequence of this multiple exposure, exposure positions can be controlled in very fine amounts, and high accuracy exposure can be implemented. Further, by control in very fine amounts of exposure positions at boundary lines between the plurality of exposure heads arranged in a main scanning direction, joins without steps can be formed.

Instead of inclining the DMD 50, the micromirrors may be disposed in a staggered pattern in which the micromirror rows are shifted by predetermined intervals in the direction intersecting the sub-scanning direction, and the same effects can be obtained.

As shown in FIG. 9A, the fiber array light source 66 is equipped with a plurality (for example, six) of laser modules 64. At each of the laser modules 64, one end of a multi-mode optical fiber 30 is connected. At the other end of the multi-mode optical fiber 30, an optical fiber 31, whose core diameter is the same as that of the multi-mode optical fiber 30 and whose cladding diameter is smaller than that of the multi-mode optical fiber 30, is connected. As shown in FIG. 9C, emission end portions of the multi-mode optical fibers 31 (light emission points) are arranged in a single row along the main scanning direction, which intersects the sub-scanning direction, to structure a laser emission portion 68. Note that the light emission points may be arranged in two rows along the main scanning direction, as shown in FIG. 9D.

As is shown in FIG. 9B, the emission end portions of the optical fibers 31 are inserted between a pair of support plates 65, which have flat faces.

In this example, because the emission ends of the optical fibers 31 with small cladding diameters are arranged in a single row without gaps therebetween, some of the multi-mode optical fibers 30, which are each between two of the multi-mode optical fibers 30 that are adjacent at the section with large cladding diameters, are piled up on the adjacent two of the multi-mode optical fibers 30. The emission end of the optical fiber 31 that is joined to the multi-mode optical fiber 30 that is piled up is arranged so as to be sandwiched between the two emission ends of the multi-mode optical fibers 31 that are joined to the two multi-mode optical fibers 31 that are adjacent at the section with large cladding diameters.

Figure 10:
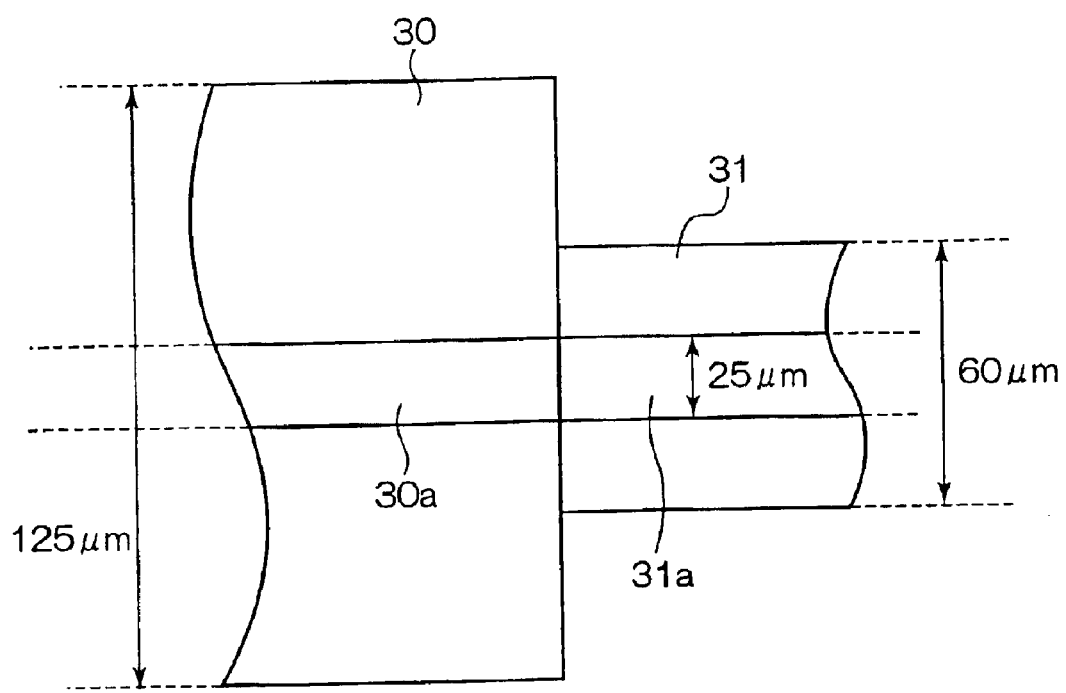
FIG. 10 is a view showing structure of a multi-mode optical fiber.

These optical fibers, as shown in FIG. 10, for example, can be obtained by coaxially joining 1 to 30 cm lengths of the optical fibers 31 with small diameters to distal end portions, at the laser light emission side, of the multi-mode optical fibers 30 with large cladding diameters. The two types of optical fiber are joined by fusing incidence end faces of the optical fibers 31 to emission end faces of the multi-mode optical fibers 30 such that central axes of the pairs of fibers coincide. As described above, a diameter of a core 31a of the optical fiber 31 has the same magnitude as a diameter of a core 30a of the multi-mode optical fiber 30.

A short-strip optical fiber, at which the optical fiber whose cladding diameter is smaller is fused to an optical fiber whose length is short and whose cladding diameter is larger, may be joined at the emission end of the multi-mode optical fiber 30 via a ferrule, an optical connector or the like. Because the joining is carried out using the connector or the like so as to be detachable, replacement of a peripheral end portion, in a case in which the optical fiber whose cladding diameter is small has been damaged or the like, is simple and costs required for maintenance of the exposure head can be reduced. Hereafter, the optical fiber 31 may on occasions be referred to as an exposure end portion of the multi-mode optical fiber 30.

As the multi-mode optical fiber 30 and the multi-mode optical fiber 31, any of step index-type optical fibers, graded index-type optical fibers and multiplex-type optical fibers can be used. For example, a step index-type optical fiber produced by Mitsubishi Cable Industries, Ltd. can be used. In the present embodiment, the multi-mode optical fiber 30 and the optical fiber 31 are step index-type optical fibers. The multi-mode optical fiber 30 has cladding diameter=125 µm, core diameter=25 µm, NA=0.2, and transmittance of an end face coating=99.5% or more. The optical fiber 31 has cladding diameter=60 µm, core diameter=25 µm, and NA=0.2.

Commonly, with laser light in the infrared region, propagation losses increase as the cladding diameter of an optical fiber becomes smaller. Therefore, suitable cladding diameters are determined in accordance with a wavelength range of laser light. However, the shorter the wavelength, the smaller the propagation losses. Thus, with laser light with a wavelength of 405 nm, emitted from a GaN-based semiconductor laser, propagation losses are barely increased at all in a case in which a cladding thickness ((cladding diameter—core diameter)/2) is around half that for a case of propagating infrared light in an 800 nm wavelength region or around a quarter that for a case of propagating infrared light in a 1.5 µm wavelength region, the latter of which is used for communications. Accordingly, the cladding diameter can be reduced to 60 µm. Therefore, by utilizing, in place of the infrared laser, a GaN-based semiconductor laser, which is a shorter wavelength light source, enables to make the cladding diameter can be reduced to a value substantially the same as the core diameter. Thus, by arranging the optical fibers having a small cladding in an array, or in other words, by disposing the optical fibers having a diameter substantially the same as the core diameter in an array it becomes highly possible to obtain a very high-brightness light source.

However, the cladding diameter of the optical fiber 31 is not limited to 60 µm. An optical fiber which is employed in a conventional fiber light source has a cladding diameter of 125 µm. However, because focal depth becomes deeper as the cladding diameter become smaller, it is preferable if the cladding diameter is 80 µm or less, more preferably 60 µm or less, and even more preferably 40 µm or less. On the other hand, given that the core diameter needs to be at least 3 to 4 µm, it is preferable that the cladding diameter of the optical fiber 31 is at least 10 µm.

Figure 11:
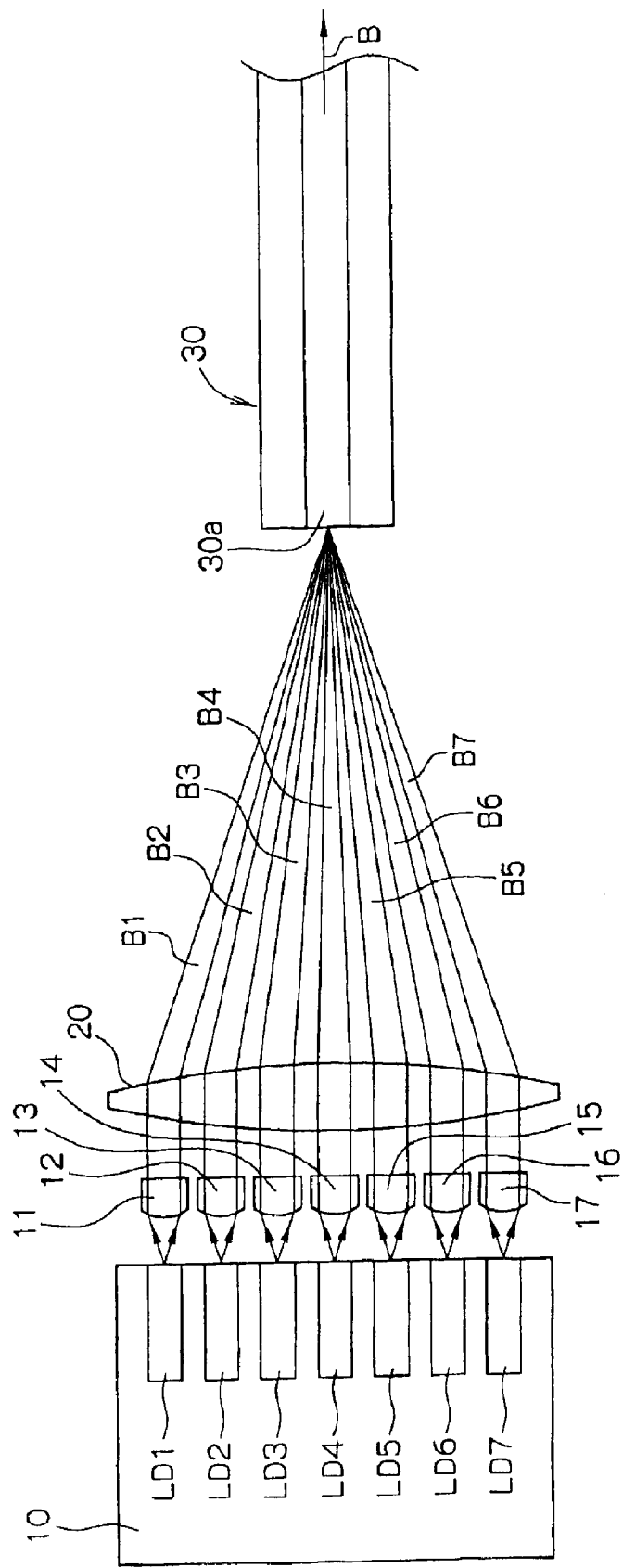
FIG. 11 is a plan view showing structure of a multiplex laser light source.

The laser module 64 is structured by a multiplexed laser light source (fiber light source) shown in FIG. 11. This multiplex laser light source is structured with a plurality (for example, seven) of chip-form lateral multi-mode or single-mode GaN-based semiconductor lasers LD1, LD2, LD3, LD4, LD5, LD6 and LD7, collimator lenses 11, 12, 13, 14, 15, 16 and 17, a single condensing lens 20, and one of the multi-mode optical fibers 30. The GaN-based semiconductor lasers LD1 to LD7 are fixedly arranged on a heat block 10. The collimator lenses 11 to 17 are provided in correspondence with the GaN-based semiconductor lasers LD1 to LD7, respectively. The number of semiconductor lasers is not limited to seven. As many as twenty semiconductor lasers may be fed into a multi-mode optical fiber with cladding diameter=60 µm, core diameter=50 µm and NA=0.2. Thus, a light intensity required from the exposure head can be realized, and/or the number of optical fibers can be further reduced.

The GaN-based semiconductor lasers LD1 to LD7 all have a common oscillation wavelength (for example, 405 nm), and a common maximum output (for example, 100 mW with multi-mode lasers, 30 mW with single-mode lasers). For the GaN-based semiconductor lasers LD1 to LD7, lasers can be utilized which are provided with an oscillation wavelength different from the above-mentioned 405 nm, in a wavelength range of 350 nm to 450 nm.

Figure 12:
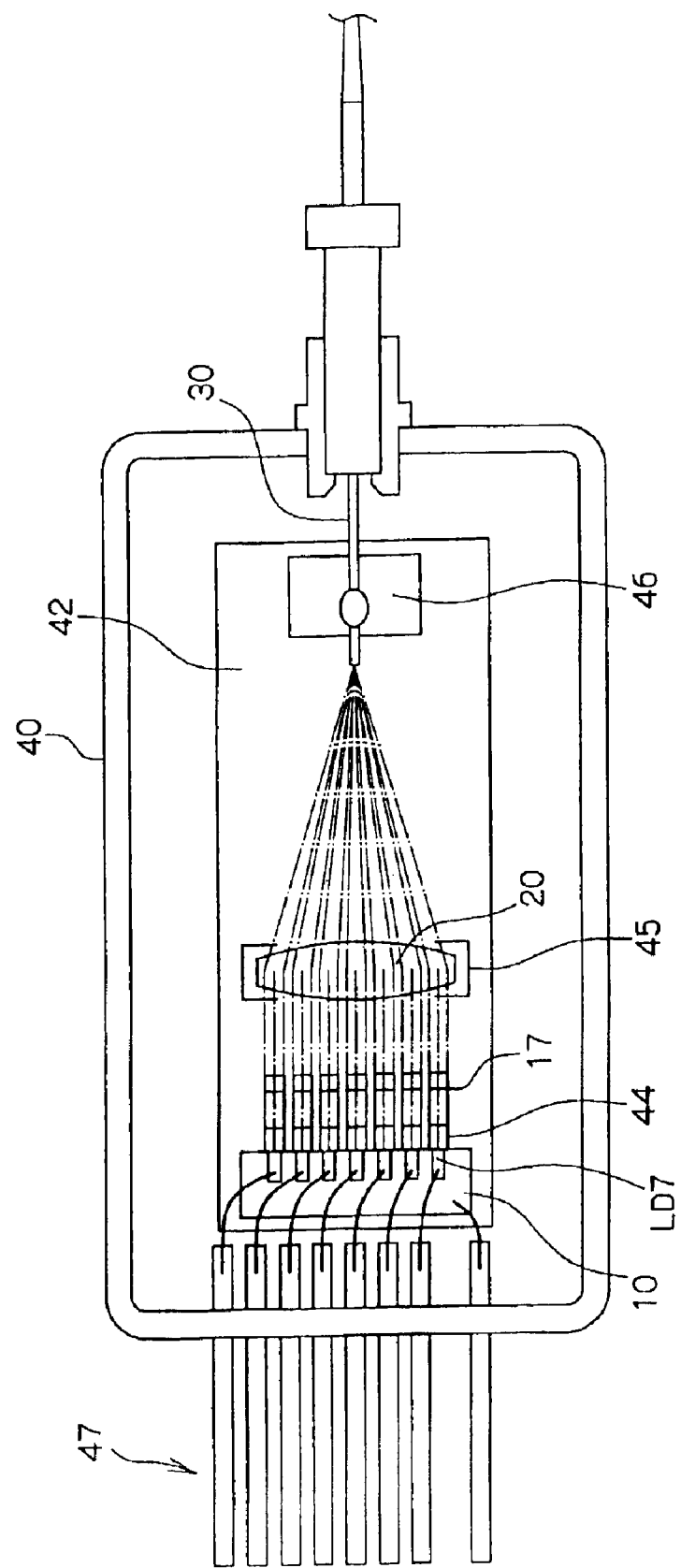
FIG. 12 is a plan view showing structure of a laser module.
Figure 13:
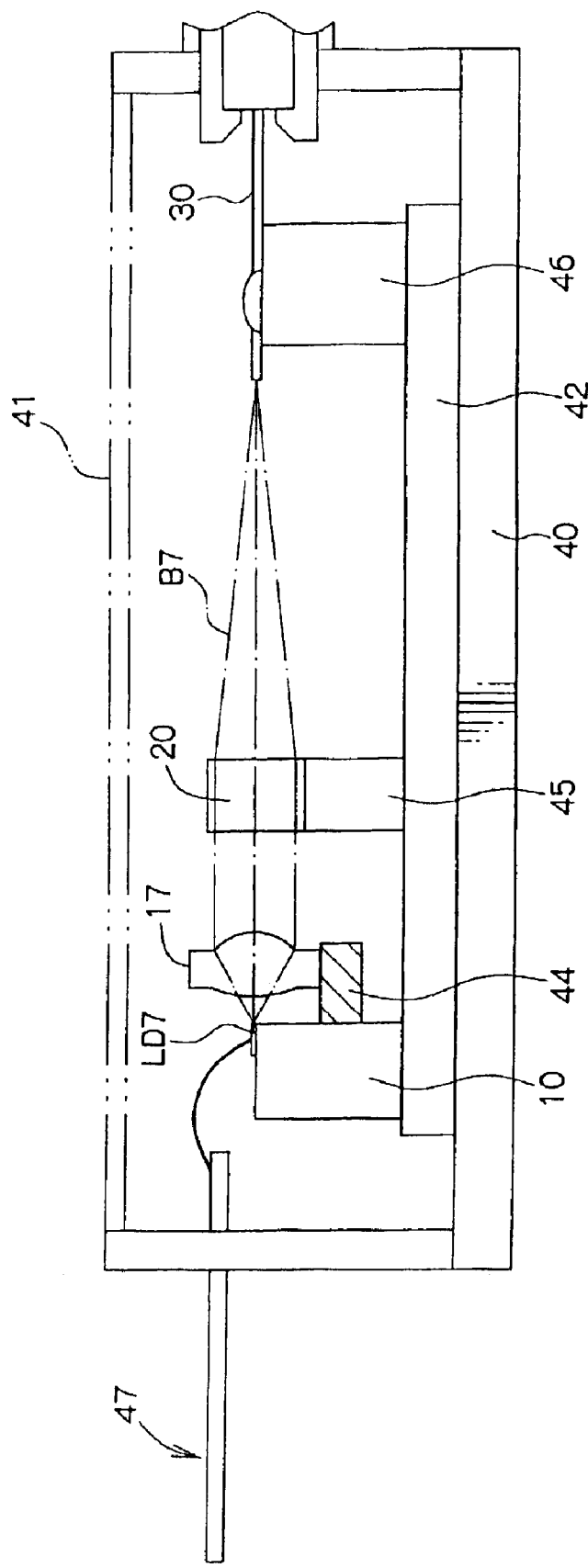
FIG. 13 is a side view showing structure of the laser module shown in FIG. 12.

As shown in FIGS. 12 and 13, the above-described multiplex laser light source, together with other optical elements, is accommodated in a box-like package 40 a top of which is opened. The package 40 is provided with a package lid 41 prepared so as to close the opening of the package 40. After an air removal treatment, sealed gas is introduced inside the package and the opening of the package 40 is closed by the package lid 41. Thus, the above-described multiplex laser light source is hermetically sealed in a closed space (sealed space) formed by the package 40 and the package lid 41.

A baseplate 42 is fixed at a lower face of the package 40. The heat block 10, a condensing lens holder 45 and a fiber holder 46 are attached at an upper face of the baseplate 42. The condensing lens holder 45 holds the condensing lens 20. The fiber holder 46 holds an incidence end portion of the multi-mode optical fiber 30. An opening is formed in a wall face of the package 40, and the emission end portion of the multi-mode optical fiber 30 is passed through this opening and led out to the outside of the package.

A collimator lens holder 44 is attached at a side face of the heat block 10, and holds the collimator lenses 11 to 17. Openings are formed in a lateral wall face of the package 40. Wiring 47, which supplies driving current to the GaN-based semiconductor lasers LD1 to LD7, is passed through these openings and led out to outside the package.

Note that in FIG. 13, in order to avoid complexity of the drawing, of the plurality of GaN-based semiconductor lasers, only the GaN-based semiconductor laser LD7 is marked with a reference numeral, and of the plurality of collimator lenses, only the collimator lens 17 is marked with a reference numeral.

Figure 14:
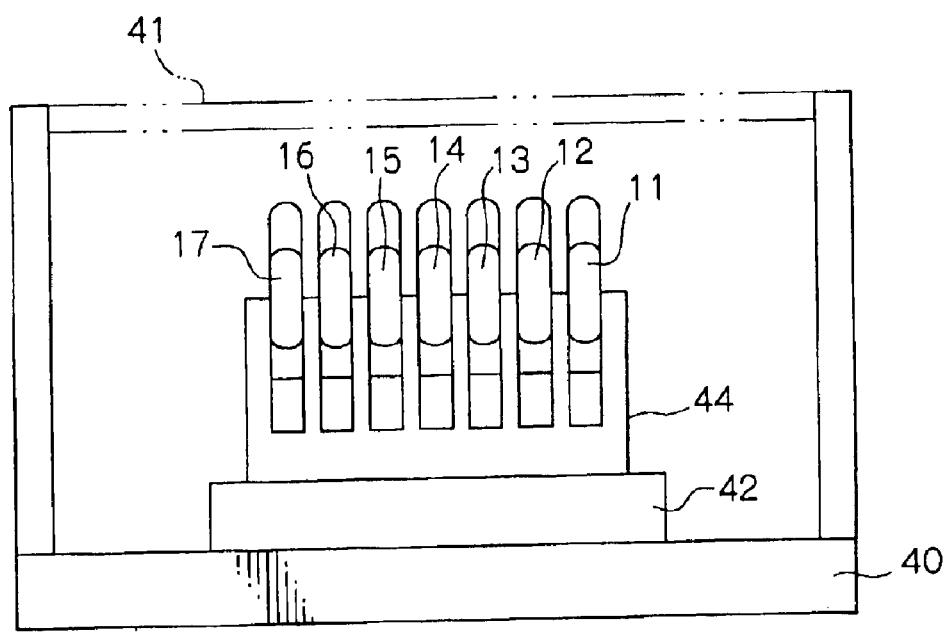
FIG. 14 is a partial side view showing structure of the laser module shown in FIG. 12.

FIG. 14 shows front face configurations of attachment portions of the collimator lenses 11 to 17. Each of the collimator lenses 11 to 17 has a long, narrow, cut-down shape with parallel flat faces defining a region that includes an optical axis of a circular-form lens which is provided with an aspherical surface. The collimator lenses with this long, narrow shape can be formed, for example, by molding-formation of resin or optical glass. The collimator lenses 11 to 17 are closely disposed in a direction of arrangement of light emission points of the GaN-based semiconductor lasers LD1 to LD7 (the left-right direction in FIG. 14) such that the longitudinal directions of the collimator lenses 11 to 17 cross the direction of arrangement of the light emission points at right angles.

As the GaN-based semiconductor lasers LD1 to LD7, lasers may be employed which are provided with an active layer with a light emission width of 2 µm, and which respectively emit laser beams B1 to B7 in forms which widen at angles of, for example, 10° and 30° with respect, respectively, to a direction parallel to the active layers and a direction perpendicular to the active layers. These GaN-based semiconductor lasers LD1 to LD7 are disposed such that the light emission points are lined up in a single row in the direction parallel to the active layers.

Accordingly, the laser beams B1 to B7 emitted from the respective light emission points are incident, respectively, on the collimator lenses 11 to 17 having the long, narrow forms described above, in states in which the direction for which the spreading angle of the beam, which is greater, is greater coincides with the longitudinal direction of the lens and the direction in which the spreading angle is smaller coincides with a width direction (a direction intersecting the longitudinal direction at right angles). Specifically, the width of each of the collimator lenses 11 to 17 is 1.1 mm and the length thereof is 4.6 mm, and the laser beams B1 to B7 incident thereat have beam diameters in the horizontal direction and the vertical direction of 0.9 mm and 2.6 mm, respectively. Further, each of the collimator lenses 11 to 17 has a focal length f1=3 mm, NA=0.6 and lens arrangement pitch=1.25 mm.

The condensing lens 20 is cut away in a long, narrow shape with parallel flat faces defining a region that includes an optical axis of a circular-form lens which is provided with an aspherical surface, and is formed in a shape which is long in the direction of arrangement of the collimator lenses 11 to 17 (i.e., the horizontal direction) and short in a direction perpendicular thereto. The condensing lens 20 has a focal length f2=23 mm and NA=0.2. Since the wavelength is about 400 nm, a minute spot diameter that sufficiently enables joining with high efficiency for a core diameter of 50 $\mu$m can be obtained. The condensing lens 20 is also formed by, for example, molding-formation of resin or optical glass.

Operation of the Exposure Apparatus

Next, operation of the exposure apparatus described above will be explained.

In the exposure heads 166 of the scanner 162, the respective laser beams B1, B2, B3, B4, B5, B6 and B7, which are emitted in divergent forms from the respective GaN-based semiconductor lasers LD1 to LD7 that structure the multiplex laser light source of the fiber array light source 66, are converted to parallel light by the corresponding collimator lenses 11 to 17. The laser beams B1 to B7 that have been collimated are focused by the condensing lens 20, and converge at the incidence end face of the core 30a of the multi-mode optical fiber 30.

In the present example, a condensing optical system is structured by the collimator lenses 11 to 17 and the condensing lens 20, and a multiplexing optical system is structured by the condensing optical system and the multi-mode optical fiber 30. Thus, the laser beams B1 to B7 focused by the condensing lens 20 as described above enter the core 30a of the multi-mode optical fiber 30, are propagated in the optical fiber, multiplexed to a single laser beam B, coupled at the emission end portion of the multi-mode optical fiber 30, and emitted from the optical fiber 31.

In each laser module, a coupling efficiency of the laser beams B1 to B7 into the multi-mode optical fiber 30 is 0.85. Therefore, in a case in which the respective outputs of the GaN-based semiconductor lasers LD1 to LD7 are 30 mW, the multiplexed laser beam B can be obtained with an output of 180 mW (=30 mW×0.85×7) from each of the optical fibers 31 arranged in the array pattern. Accordingly, output of the laser emission portion 68 in which six of the optical fibers 31 are arranged in the array pattern is approximately 1 W (=180 mW×6).

At the laser emission portion 68 of the fiber array light source 66, high-brightness light emission points as described above are arranged in a single row along the main scanning direction. Because a conventional fiber light source, in which laser light from a single semiconductor laser is focused at a single optical fiber, has low output, a desired output cannot be obtained without arranging these conventional light sources in a large number of rows. However, because the multiplex laser light source employed in the present embodiment has high power output, a desired output can be obtained with only a small number of rows, for example, one row.

For example, in a conventional fiber light source, in which semiconductor lasers are joined with optical fibers in a one-to-one relationship, lasers with outputs of around 30 mW (milliwatts) are commonly employed as the semiconductor lasers, and multi-mode optical fibers with core diameter 50 $\mu$m, cladding diameter 125 $\mu$m, and NA (numerical aperture) 0.2 are employed as the optical fibers. Therefore, if an output of around 1 W (watt) is to be obtained, forty-eight (8×6) multi-mode optical fibers must be bundled. Thus, from a light emission region with an area of 0.62 mm$^2$ (0.675 mm by 0.925 mm), luminance of this laser emission portion 68 is $1.6\times10^6$ W/m$^2$, and luminance from each optical fiber is $3.2\times10^6$ W/m$^2$.

In contrast, in the present embodiment, an output of approximately 1 W can be provided by six multi-mode optical fibers, as described above. Thus, from a light emission region of the laser emission portion 68 with an area of 0.0081 mm$^2$ (0.325 mm×0.025 mm), luminance of the laser emission portion 68 is $123\times10^6$ W/m$^2$. Thus, a luminance about eighty times higher than in the conventional case can be expected. Furthermore, the luminance from each optical fiber is $90\times10^6$ W/m$^2$. Thus, a luminance around twenty-eight times higher than in the conventional case can be expected. As described above, a light source having a high-brightness can be obtained. Particularly, since a shorter wavelength light source such as a GaN-based light source can be utilized, a minute spot can be obtained even at the same condensing NA (i.e., fiber incident NA), and a fiber light source and a fiber array or bundle having a higher luminance can be obtained. As a result, since the laser light has a shorter wavelength, the image formation beam can be formed in a minute spot, and thus, high energy density and strong photon energy can be obtained. Due to these two effects, the light source may be utilized not only for chemical alteration, such as photochemical polymerization, but for broad applications, such as sintering, annealing and metal machining which use physical alteration.

Further, since the light source is a high-brightness light source, a minute image formation beam can be secured even by a small image formation NA, and even in digital exposure using a spatial light modulation element, an illumination NA for the spatial light modulation element can be made smaller. As a result, the size of the spatial light modulation element can be reduced, and transmission speed or light-switching speed can be easily improved, and high speed and high precision exposure can be carried out.

Furthermore, by utilizing a semiconductor laser, photon cost can be greatly reduced. Further, since turning the light source ON and OFF can be easily carried out and life of the light source can be lengthen, the light source can be made maintenance free, and reduction in cost of the light source sufficient to allow broad application thereof can be realized for the first time.

Moreover, an optical fiber is easy to handle and easy to replace. Therefore, the light source can be utilized for various uses.

Figure 15A:
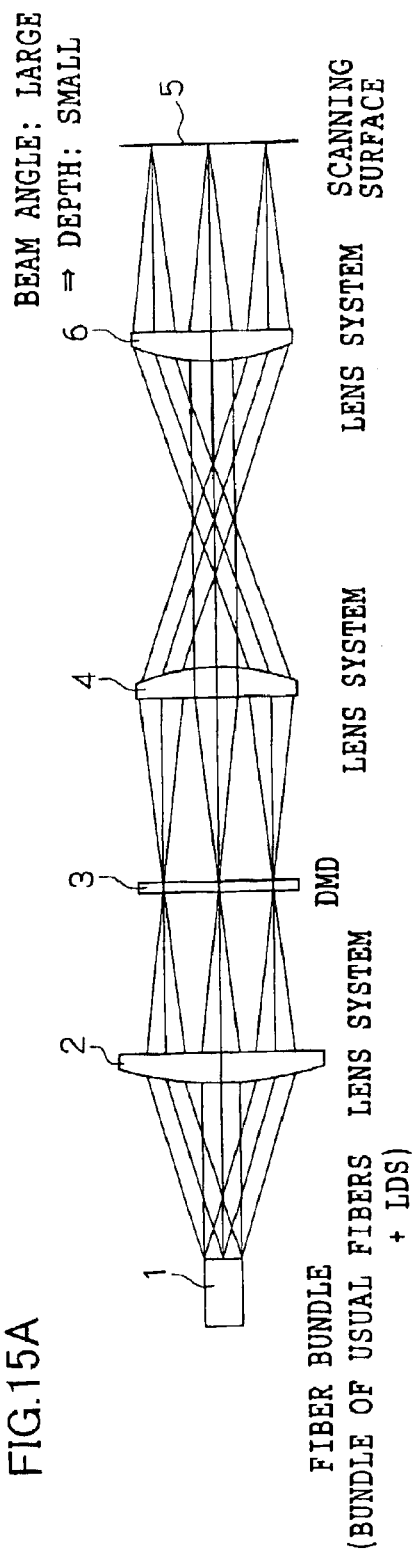
FIG. 15A is a sectional view, cut along the optical axis, showing depth of focus in a conventional exposure apparatus.

Now, a difference in focal depth between the conventional exposure head and the exposure head of the present embodiment will be described with reference to FIGS. 15A and 15B. A diameter in the sub-scanning direction of the light-emitting region of the bundle-form fiber light source of the conventional exposure head is 0.675 mm, whereas the diameter in the sub-scanning direction of the light-emitting region of the fiber array light source of the exposure head of the present embodiment is 0.025 mm. As shown in FIG. 15A, with the conventional exposure head, because the light-emitting region of the light source 1 (the bundle-form fiber light source) is large, the angle of luminous flux incident on the DMD 3 is large. Hence, the angle of luminous flux incident on the scanning surface 5 is large. Consequently, the beam diameter is susceptible to broadening with respect to a condensing direction (displacement in a direction of focusing).

Figure 15B:
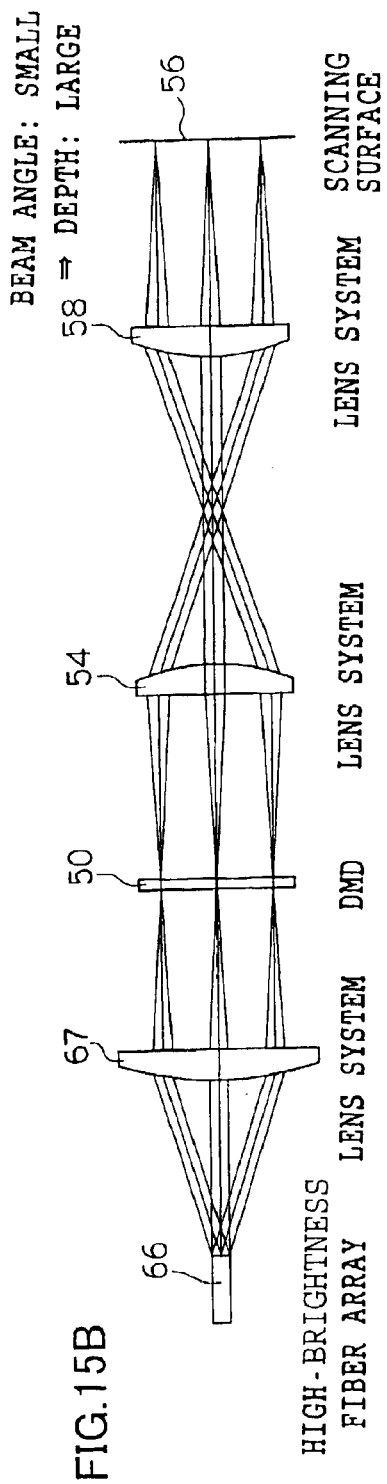
FIG. 15B is a sectional view, cut along the optical axis, showing depth of focus in the exposure apparatus relating to the first embodiment of the invention.

In contrast, as shown in FIG. 15B, with the exposure head of the present embodiment, the diameter in the sub-scanning direction of the light-emitting region of the fiber array light source 66 is smaller. Hence, the angle of luminous flux that has passed through the lens system 67 and is incident on the DMD 50 is smaller. Consequently, the angle of luminous flux incident on the scanning surface 56 is smaller. That is, the focal depth is longer. In this example, the diameter in the sub-scanning direction of the light-emitting region is about a thirtieth that in the conventional case, and a focal depth substantially corresponding to the diffraction limit can be obtained. Accordingly, the present embodiment is excellent for exposure with very fine spots. The effect on the focal depth is particularly remarkable when the light intensity required from the exposure head is large, which is useful. In this example, the size of one pixel as projected on the exposure surface is 10 μm by 10 μm. Note that, although the DMDs are reflection-type spatial modulation elements, FIGS. 15A and 15B are expanded views, for the purpose of explaining optical relationships.

Image data corresponding to an exposure pattern is inputted at the unillustrated controller connected to the DMD 50, and is temporarily stored in a frame memory in the controller. This image data is data which represents a density of each pixel structuring an image with a binary value (whether or not a dot is to be recorded).

The stage 152, at which the surface of the photosensitive material 150 is sucked and attached, is moved along the guides 158 at a constant speed by the driving apparatus, from an upstream side of the gate 160 to a downstream side thereof. When the stage 152 is passing under the exposure areas 168, and the leading end of the photosensitive material 150 has been detected by the detection sensors 164 attached at the gate 160, the image data stored in the frame memory is read out as a plurality of line portion units in sequence, and control signals for each of the exposure heads 166 are generated on the basis of the image data read from the data processing section. Hence, the micromirrors of the DMDs 50 at the respective exposure heads 166 are respectively switched on and off by the mirror driving control section on the basis of the control signals that have been generated.

When laser light is irradiated from the fiber array light source 66 to the DMD 50, if a micromirror of the DMD 50 is in the ON state, the reflected laser light is focused on the surface to be exposed 56 of the photosensitive material 150 by the lens systems 54 and 58. Thus, the laser light irradiated from the fiber array light source 66 is turned on or off at each pixel, and the photosensitive material 150 is exposed in a unit with a number of pixels substantially the same as the number of pixels employed at the DMD 50 (the exposure area 168). Furthermore, as the photosensitive material 150 is moved together with the stage 152 at the constant speed, the photosensitive material 150 is scanned in a direction opposite to the stage movement direction by the scanner 162, and the strip-form exposed regions 170 are formed at the respective exposure heads 166.

Figure 16A:
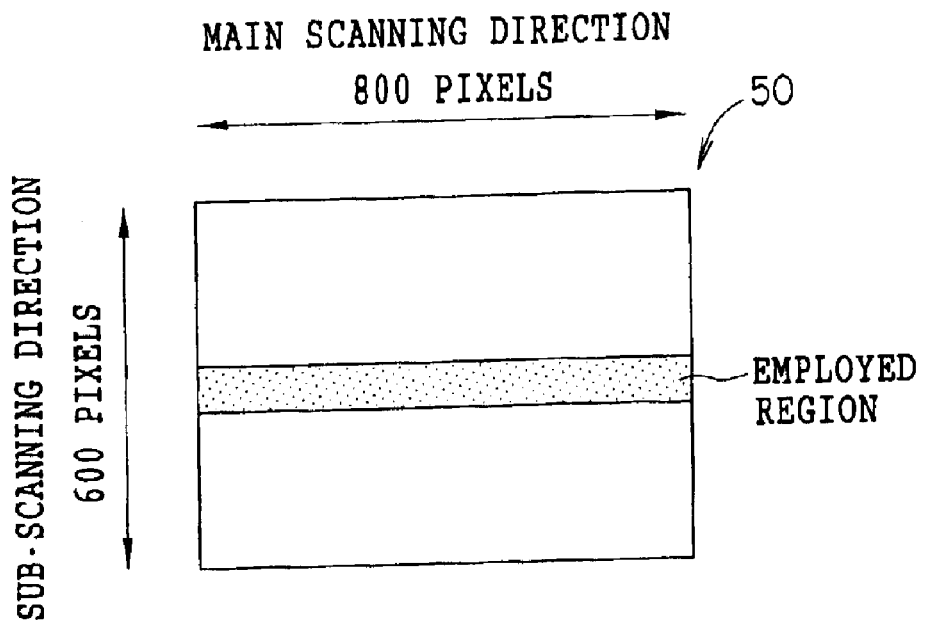
FIG. 16A is a view showing one row of an employed region of a DMD.
Figure 16B:
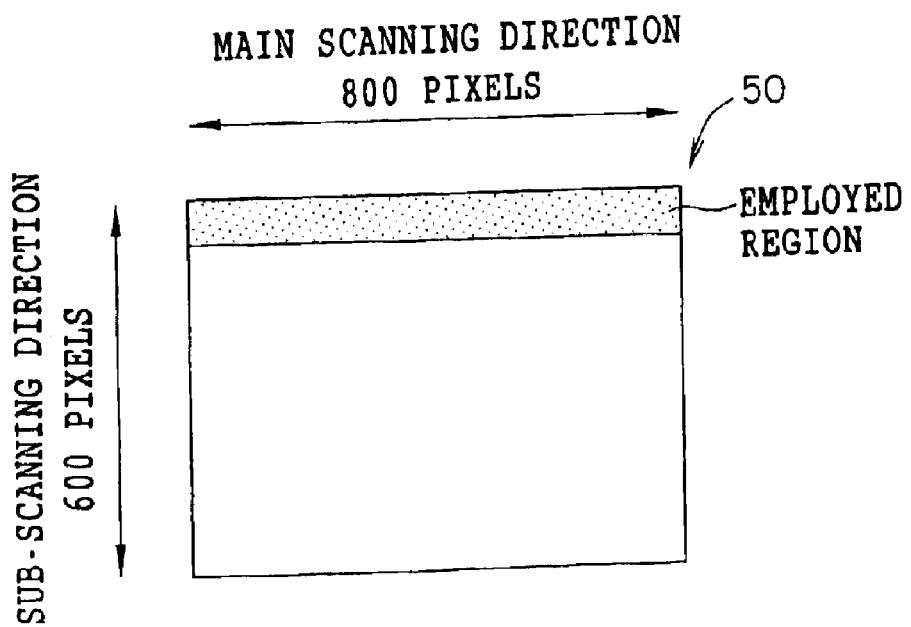
FIG. 16B is a view showing another row of the employed region of the DMD.

As shown in FIGS. 16A and 16B, at the DMD 50 in the present embodiment, 600 micromirror rows, in each of which 800 of the micromirrors are arranged in the main scanning direction, are arranged in the sub-scanning direction. However, control by the controller so as to drive only a portion of the micromirror rows (for example, 800 micromirrors by 100 rows) is possible.

Micromirror rows that are disposed at a central portion of the DMD 50 may be employed, as shown in FIG. 16A, and micromirror rows that are disposed at an end portion of the DMD 50 may be employed, as shown in FIG. 16B. Further, in a case in which defects have occurred at some of the micromirrors, the micromirror rows that are to be employed may be suitably changed in accordance with the situation, by employing micromirror rows in which defects have not occurred, or the like.

There is a limit to a data processing speed of the DMD 50, and a modulation rate for one line is determined in proportion to the number of pixels employed. Thus, the modulation rate for one line can be accelerated by employing only a portion of the micromirror rows. Further, in the case of an exposure method in which the exposure head is continuously moved relative to the exposure surface, there is no need to employ all pixels in the sub-scanning direction.

For example, in a case in which only 300 of the 600 rows of micromirrors are employed, modulation is possible at twice the rate for one line as in a case in which all 600 lines are employed. Further, in a case in which only 200 of the 600 rows of micromirrors are employed, modulation is possible three times as quickly for one line as in the case of employing all 600 lines. Specifically, a region which is 500 mm in the sub-scanning direction can be exposed in 17 seconds. Furthermore, in a case in which only 100 lines are employed, modulation for one line can be done six times as quickly. That is, a region which is 500 mm in the sub-scanning direction can be exposed in 9 seconds.

The number of micromirror rows that are employed, that is, the number of micromirrors arranged in the sub-scanning direction, is preferably at least 10 and at most 200, and is more preferably at least 10 and at most 100. An area corresponding to one micromirror, which corresponds to one pixel, is 15 μm×15 μm. Therefore, when an employed region of the DMD 50 is reduced, it is preferable that this region is at least 12 mm by 150 μm and at most 12 mm by 3 mm, and more preferably at least 12 mm by 150 μm and at most 12 mm by 1.5 mm.

Figure 17A:
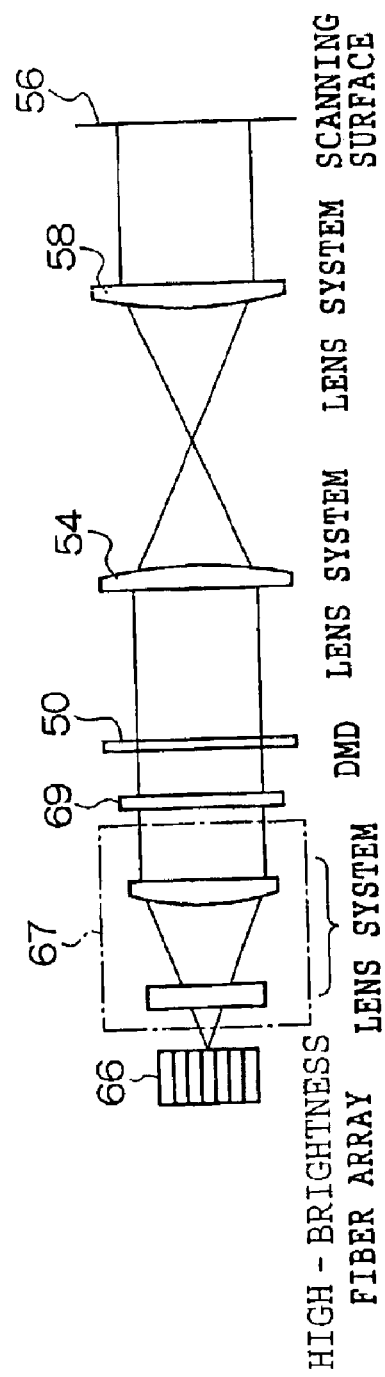
FIG. 17A is a side view showing a case in which the employed region of the DMD is appropriate.
Figure 17B:
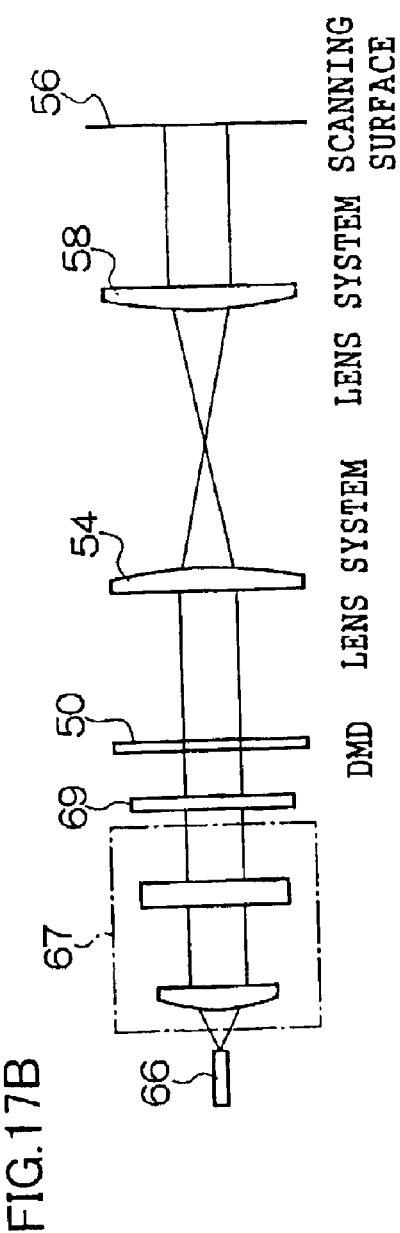
FIG. 17B is a sectional view, cut in the sub-scanning direction along the optical axis, of FIG. 17A.

If the number of micromirrors that are employed is within the ranges described above, the laser light that is irradiated from the fiber array light source 66 can be made substantially parallel by the lens system 67 and irradiated at the DMD 50, as shown in FIGS. 17A and 17B. It is preferable if an irradiated region of the DMD 50 which is irradiated with the laser light substantially coincides with the region of the DMD 50 that is employed. If the irradiated region is larger than the employed region, then usage efficiency of the laser light will fall.

There is a requirement that the diameter in the sub-scanning direction of the light beam that is focused on the DMD 50 is made smaller by the lens system 67, in accordance with the number of micromirrors arranged in the sub-scanning direction. Thus, if the number of micromirror rows that are employed is less than 10, the angle of the luminous flux incident at the DMD 50 will be large, and the focal depth of the light beam at the surface to be exposed 56 will be shallow, which is not preferable. In addition, the number of micromirror rows that are employed is preferable to be less than 200 or less from the viewpoint of modulation rate. Note that, although the DMD is a reflection-type spatial modulation element, FIGS. 17A and 17B are expanded views, for the purpose of explaining optical relationships.

When sub-scanning of the photosensitive material 150 by the scanner 162 has been completed and the trailing end of the photosensitive material 150 has been detected by the detection sensors 164, the stage 152 is driven back along the guides 158 by the unillustrated driving apparatus, to a start point at an upstream-most side of the gate 160, and is again moved along the guides 158, at a constant speed, from the upstream side to the downstream side of the gate 160.

As has been described above, the exposure apparatus of the present embodiment is provided with an exposure head in which a fiber array light source, at which emission end portions (light emission points) of optical fibers of a multiplex laser light source are arranged in an array pattern, irradiates a spatial modulation element. At this fiber array light source, because cladding diameters of emission ends of the optical fibers are set to be smaller than cladding diameters of incidence ends thereof, light emission portion diameters are smaller and a fiber array light source with a higher luminance can be provided. Consequently, an exposure head and exposure apparatus featuring a deep focal depth can be realized. For example, in a case of very high resolution exposure with a beam diameter of 1 µm or less and a resolution of 0.1 µm or less, a long focal depth can be obtained, and beam blurring at peripheral edge portions of an area-type exposure beam can be suppressed. Thus, high-speed, high-precision exposure is possible. Accordingly, the exposure apparatus of the present embodiment can be employed even for thin film transistor (TFT) exposure processes and the like, which require high resolution.

Further, because a multiplex laser light source in which a plurality of laser lights are multiplexed and fed into an optical fiber is used, output at the emission end of the optical fiber is greater, and exposure with a high power output is possible. Further still, because the output of each fiber light source is greater, the number of fiber light sources required for providing a desired output is smaller, and reducing in costs of the exposure apparatus can be provided.

Further yet, the exposure apparatus of the present embodiment is provided with a DMD in which 600 micromirror rows are arranged in the sub-scanning direction with 800 micromirrors being arranged in the main scanning direction in each of the micromirror rows. However, by a controller controlling so as to drive only some of the micromirror rows, a modulation rate for one line can be made faster than in a case in which all of the micromirror rows are driven. Thus, exposure at high speed is possible.

Second Embodiment

An exposure apparatus relating to a second embodiment utilizes grating light valves (GLV) as spatial light modulation elements which are employed at respective exposure heads. The GLVs are one kind of MEMS-type (microelectro-mechanical systems) spatial light modulation elements (SLM: spatial light modulator), and are reflective diffraction grating-type spatial light modulation elements. Other structures are the same as in the exposure apparatus relating to the first embodiment. Accordingly, descriptions thereof will be omitted.

Figure 30:
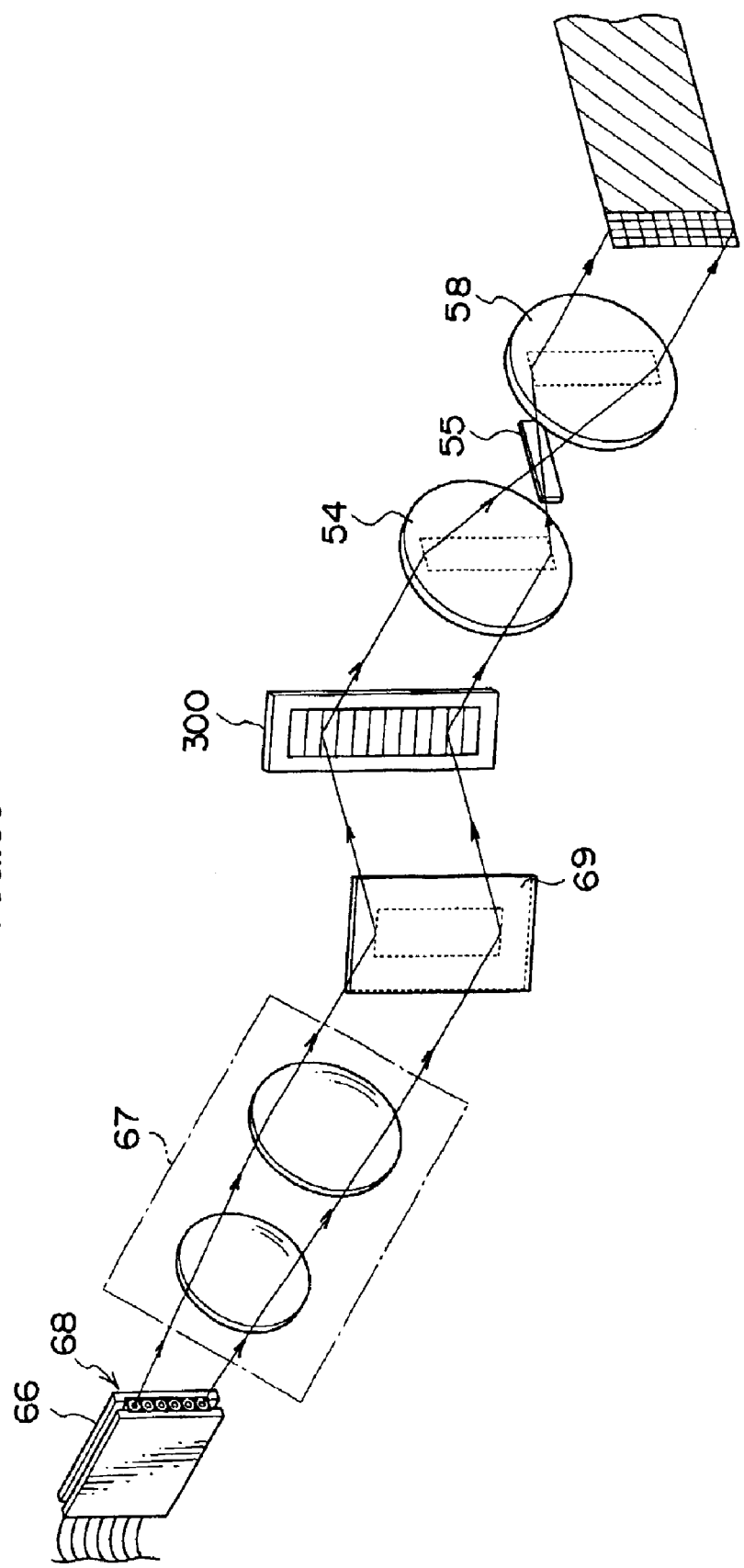
FIG. 30 is a perspective view showing schematic structure of an exposure head of an exposure apparatus relating to a second embodiment of the invention.
Figure 31A:
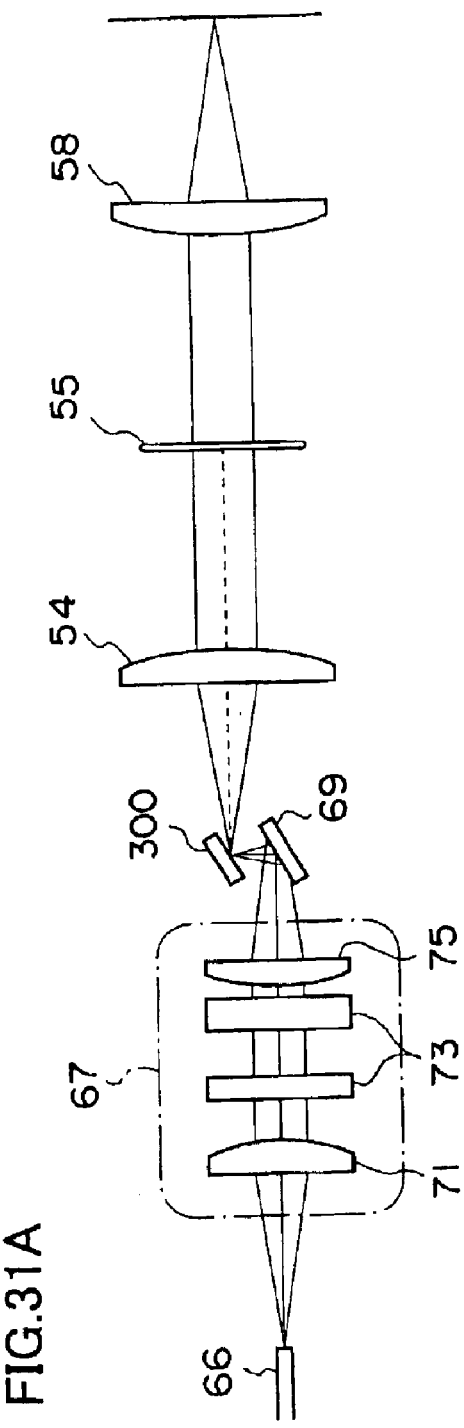
FIG. 31A is a sectional view, cut along the optical axis, showing structure of the exposure head shown in FIG. 30.
Figure 31B:
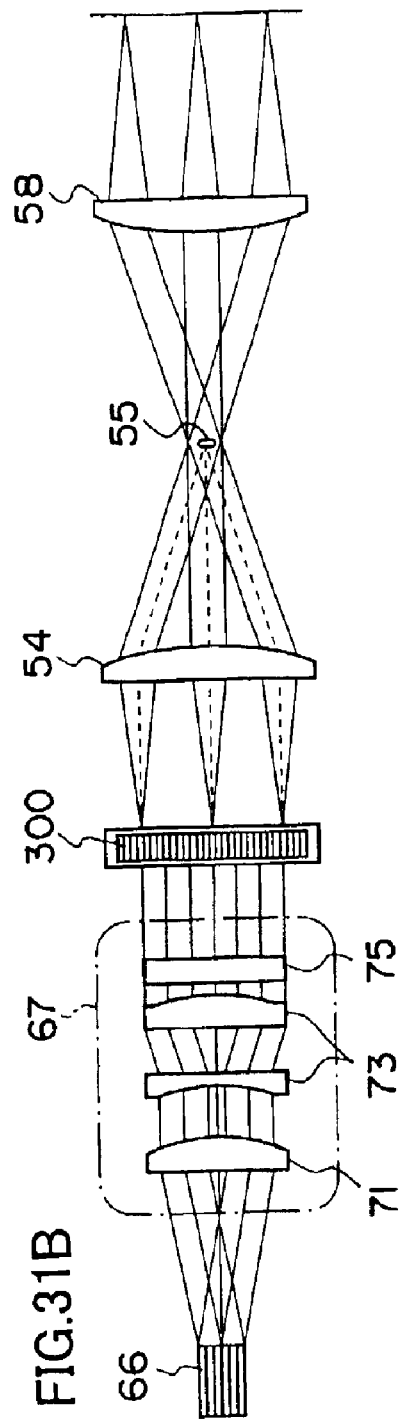
FIG. 31B is a side view showing structure of the exposure head shown in FIG. 31A.

As shown in FIGS. 30, 31A and 31B, each of the exposure heads $166_{11}$ to $166_{mn}$ is provided with a GLV 300 whose shape is long in a predetermined direction (a linear form), to serve as a spatial light modulation element for modulating the incident light beam at each of the pixels in accordance with the image data. At a light incidence side of the GLV 300, similarly to the first embodiment, the fiber array light source 66, the lens system 67 and the mirror 69 are disposed in this order.

The linear-form GLV 300 is disposed such that a long direction thereof is parallel with the direction of arrangement of the optical fibers of the fiber array light source 66, and reflection faces of ribbon-form microbridges of the GLV 300 are substantially parallel to the reflection face of the mirror 69. The GLV 300 is connected to an unillustrated controller which controls the GLV 300.

Figure 32:
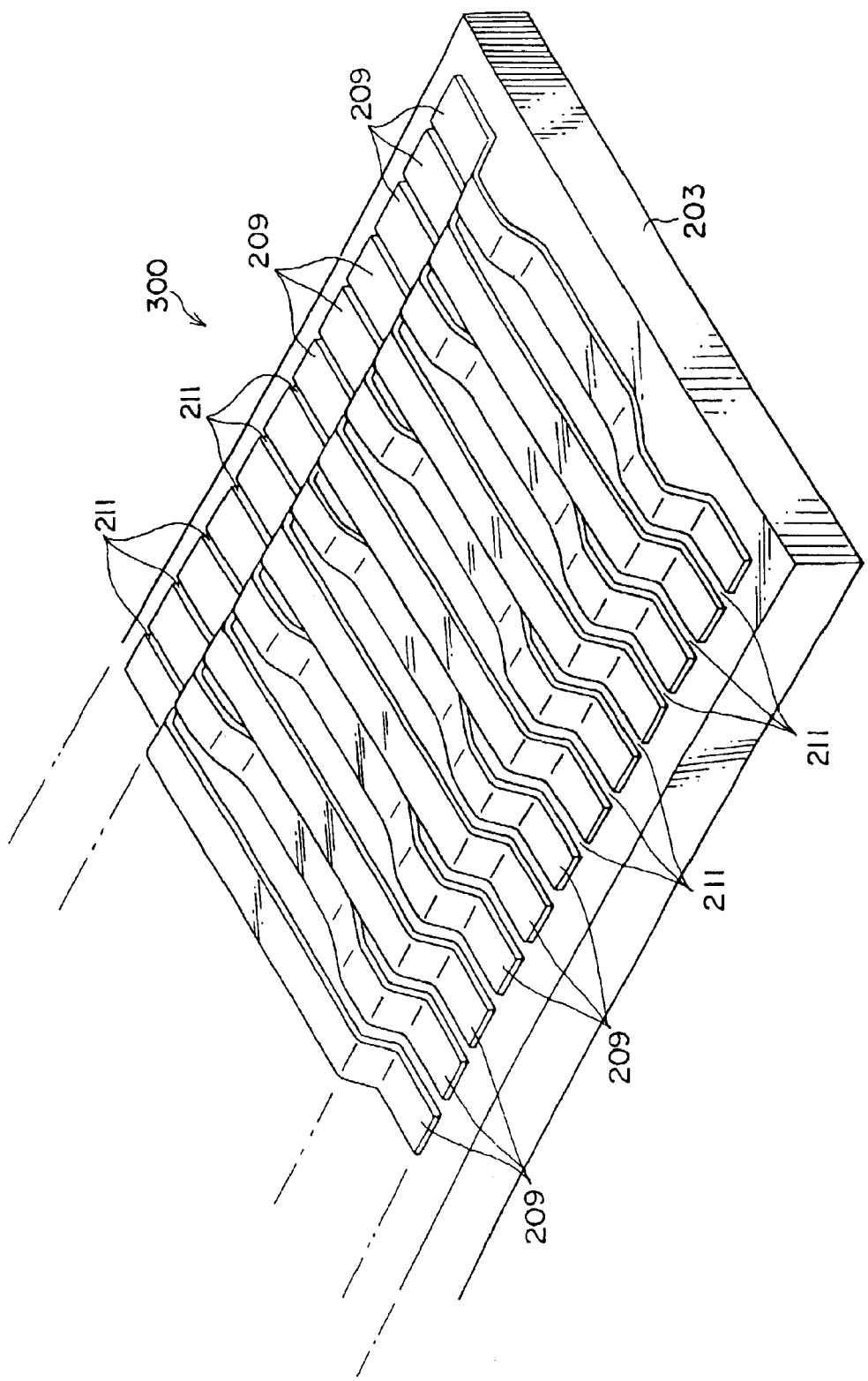
FIG. 32 is a partial enlarged view showing structure of a grating light valve (GLV).

At the GLV 300, as shown in FIG. 32, a large number (for example, 6,480) of microbridges 209, which are provided with ribbon-form reflection surfaces, are arranged in parallel on a long strip-form form support 203, which is formed of silicon or the like. At the GLV 300, a large number of slits 211 are formed between adjacent microbridges 209. Ordinarily, one pixel is structured by a row of a plurality (for example, six) of the microbridges 209. If it is assumed that each pixel is structured by a row of six microbridges, then exposure of 1,080 pixels is possible with the 6,480 microbridges.

Figure 33A:
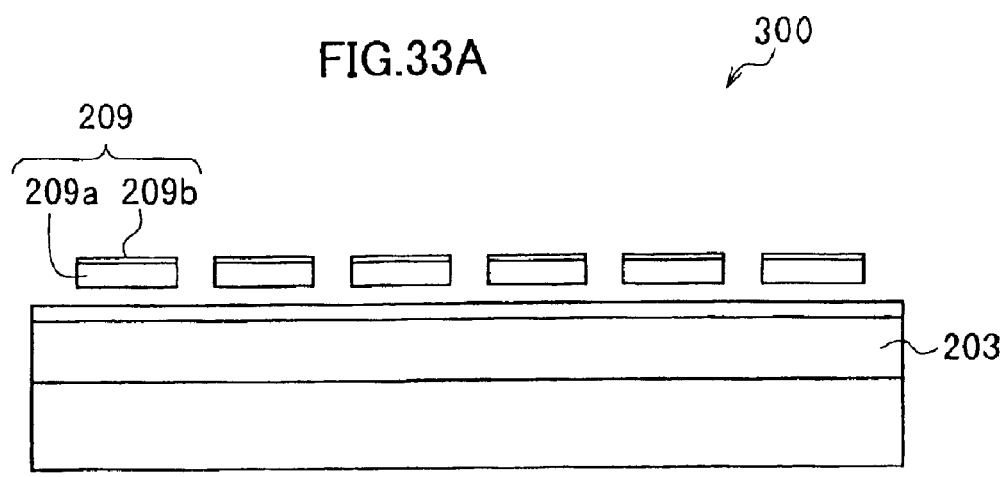
FIGS. 33A and 33B are explanatory views for explaining operation of the GLV.
Figure 33B:
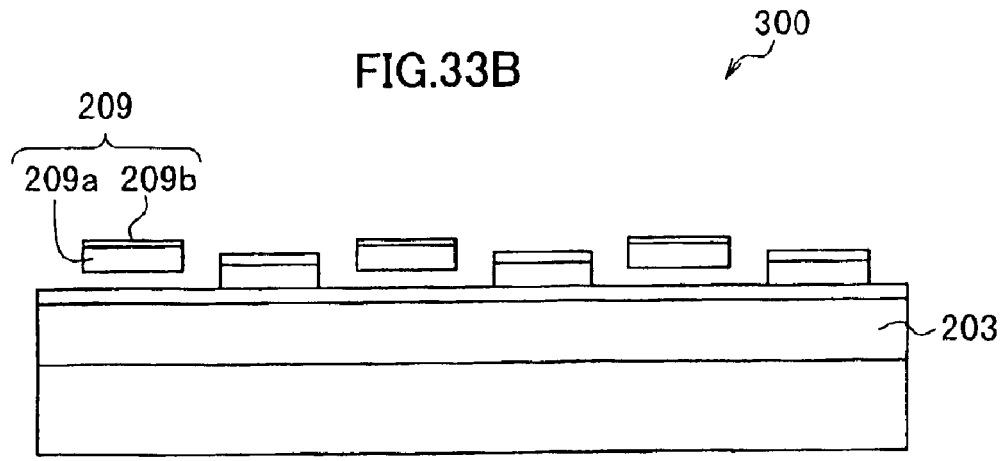

As shown in FIGS. 33A and 33B, at each microbridge 209, a reflection electrode film 209b is formed on a surface of a flexible beam 209a. The beam 209a is formed of silicon nitride ($SiN_x$) or the like, and the reflection electrode film 209b is formed of a single-layer metallic film of aluminum (or gold, silver, copper or the like). Each of the reflection electrode films 209b is connected to a power source by unillustrated wiring, via an unillustrated switch.

Now, a principle of operation of the GLV 300 will be briefly described. In a state in which voltage is not applied, the microbridge 209 has a predetermined spacing distance from the support 203. When a voltage is applied between the microbridge 209 and the support 203, a static electricity attraction force is generated between the microbridge 209 and the support 203 by induced static charge, and the microbridge 209 flexes to the support 203 side thereof. Then, when the application of voltage is stopped, this flexure is released and the microbridge 209 reverts elastically, thus separating from the support 203. Accordingly, by disposing microbridges to which voltage is applied and microbridges to which voltage is not applied alternately, a diffraction grating can be formed by the application of voltages.

FIG. 33A shows a case in which voltage is not applied to a row of microbridges of a pixel unit, and the pixel unit is in an 'OFF' state. In the OFF state, the heights of reflection surfaces of the microbridge 209 are all the same, optical path differences in reflected light are not generated, and the reflected light is reflected normally. In other words, diffracted light only of the zero-th order can be obtained. Alternatively, FIG. 33B shows a case in which voltages are applied to the microbridge row of the pixel unit, and the pixel unit is in an 'ON' state. Note that the voltage is only applied to every second microbridge 209. In the ON state, according to the principle described above, central portions of the microbridges 209 are flexed, and a reflection surface with alternating steps is formed. In other words, a diffraction grating is formed. When laser light is made incident on this reflection surface, an optical path difference is generated between light that is reflected from the microbridges 209 that are flexed and light that is reflected from the microbridges 209 that are not flexed. Thus, light with a diffraction order of ±1 is emitted in a predetermined direction.

Accordingly, in accordance with control signals from the unillustrated controller, voltages are applied to drive the microbridge rows for the respective pixels of the GLV 300 for control between the ON and OFF states. Thus, laser light that is incident at the GLV 300 is modulated at each pixel and diffracted in the predetermined direction.

At the light reflection side of the GLV 300, that is, at the side to which the diffracted light (zero-th order diffracted light and ±1st order diffracted light) is emitted, the lens systems 54 and 58, which focus the diffracted light onto the scanning surface (surface to be exposed) 56 are disposed such that the GLV 300 and the surface to be exposed 56 have a conjugative relationship. Furthermore, the ribbon-form reflection surfaces of the GLV 300 are disposed in advance to be inclined at a predetermined angle (for example, 45°) with respect to the optical axis of the lens system 54, such that the diffracted light is incident at the lens system 54.

In FIGS. 31A and 31B, the zero-th order diffraction light is represented by broken lines and the ±1st order diffraction light is represented by solid lines. The zero-th order diffraction light from the GLV 300 is focused only in the longitudinal direction of the GLV by the lens system 54. Accordingly, a shading plate 55 with a long strip form, which is for eliminating the zero-th order diffraction light from the optical path to the scanning surface 56 is disposed between the lens system 54 and the lens system 58 such that the longitudinal direction of the shading plate 55 intersects the longitudinal direction of the GLV 300.

The lens system 54 condenses the diffracted light that is incident thereat in the longitudinal direction of the GLV 300, and makes the light parallel in the sub-scanning direction. The long strip-form shading plate 55, which is for eliminating the zero-th order diffracted light from the optical path to the scanning surface 56, is disposed at a focusing point of the zero-th order diffracted light between the lens system 54 and the lens system 58, such that the longitudinal direction of the shading plate 55 intersects the longitudinal direction of the GLV at right angle. As a result, the zero-th order diffracted light alone is selectively removed.

In this exposure head, image data corresponding to an exposure pattern is inputted to the unillustrated controller connected to the GLV 300, and control signals are generated on the basis of this image data. Each pixel unit of the microbridges of the GLV 300 at each exposure head is switched on or off on the basis of the generated control signals. As a result, the photosensitive material 150 is exposed in a unit with a number of pixels substantially the same as the number of pixels at the GLVs 300. Thus, with sub-scanning due to movement of the stage 152, the strip-form exposed regions are respectively formed by the exposure heads.

In the exposure apparatus of the present embodiment, because the GLV 300 is a long strip-form spatial light modulation element whose width in a short direction thereof is narrow, it is difficult to illuminate the GLV 300 efficiently. However, as in the first embodiment, the high-brightness fiber array light source, at which the emission end portions of the optical fibers of the multiplex laser light source are arranged in an array pattern, is utilized at a light source for illuminating the GLV, and the cladding diameters of the emission ends of the optical fibers are smaller than the cladding diameters of the incidence ends thereof. Therefore, the sub-scanning direction diameter of the beam emitted from the laser emission portion 68 is small, and an angle of luminous flux that has passed through the lens system 67 and the like and is incident on the GLV 300 is small. Thus, the GLV 300 can be illuminated with high efficiency and a long depth of focus can be provided. Moreover, because the multiplex laser light source is utilized, exposure with a high power output is possible and a lower cost exposure apparatus can be provided.

Next, variant examples of the exposure apparatus described above will be described.

Application of the Exposure Apparatus

The exposure apparatus described above may be suitably utilized for application to, for example, exposure of a dry film resist (DFR) in a process for fabricating a printed wiring board (PWB), formation of a color filter in a process for fabricating a liquid crystal display (LCD), exposure of a DFR in a process for fabricating a TFT, exposure of a DFR in a process for fabricating a plasma display panel (PDP), and the like.

Further, the exposure apparatus described above may also be employed for various types of laser machining, such as laser ablation for vaporizing, dispersing or the like and hence removing a portion of a material by laser irradiation, and for sintering, lithography and the like. Because the exposure apparatus described above has high power output and is capable of exposing at high speed with a deep depth of focus, the exposure apparatus can be employed for fine-detail machining by laser ablation or the like. For example, instead of carrying out developing processing to prepare a PWB, the exposure apparatus described above may be employed for removing a resist in accordance with a pattern by ablation, or for forming a pattern in a PWB by direct ablation without using a resist. Further still, for a lab-on-a-chip, in which mixing, reaction, separation, detection and the like of numerous fluids are integrated at a glass or plastic chip, the exposure apparatus described above can be employed for forming very small flow channels with groove widths of tens of microns.

In particular, because the exposure apparatus described above utilizes the GaN-based semiconductor lasers in the fiber array light sources, the exposure apparatus can be favorably employed for the above-mentioned laser processes. Specifically, GaN-based semiconductor lasers can be driven with short pulses, and sufficient power can be provided even for laser ablation and the like. Further, because these are semiconductor lasers, unlike solid state lasers in which driving speeds are low, rapid driving with a cycling frequency of around 10 MHz is possible, and high-speed exposure is possible. Further still, because metals have high optical absorptivities for laser light with a wavelength in the vicinity of 400 nm, and readily convert such laser light to heat energy, laser ablation or the like can be carried out rapidly.

In a case of exposing a liquid resist which is to be employed for TFT patterning, a liquid resist which is to be employed for patterning a color filter or the like, it is preferable that the material to be exposed is exposed in a nitrogen atmosphere, in order to prevent a reduction in sensitivity (desensitization) due to oxygen inhibition. Consequent to such exposure in a nitrogen atmosphere, oxygen inhibition of photopolymerization reactions is inhibited, sensitivity of the resist is raised, and rapid exposure is possible.

With the exposure apparatus described above, any of photon mode photosensitive materials, which are directly recorded with information by exposure, and heat mode photosensitive materials, in which heat is generated by exposure and information is recorded thereby, may be employed. In cases in which photon mode photosensitive materials are employed, GaN-based semiconductor lasers, wavelength-conversion solid state lasers and the like are employed as the laser apparatus, and in cases in which heat mode photosensitive materials are employed, AlGaAs-based semiconductor lasers (infrared lasers) and solid state lasers are employed as the laser apparatus.

Other Spatial Modulation Elements

For the first embodiment described above, examples of driving only a portion of the DMD micromirrors were described. However, a long, thin DMD may be utilized in which a large number of micromirrors, whose reflection surface angles can be respectively altered in accordance with control signals, are arranged in a two-dimensional pattern on a support whose length in a direction corresponding to a predetermined direction is longer than a length thereof in a direction intersecting the predetermined direction. When such a DMD is utilized, because the number of micromirrors whose reflection surface angles are to be controlled is smaller, modulation rates can be similarly increased.

For the first and second embodiments described above, exposure heads which are provided with DMDs or GLVs as spatial modulation elements have been described. However, for example, MEMS (microelectro-mechanical systems) type spatial modulation elements (SLM: spatial light modulator), optical elements (PLZT elements), liquid crystal shutters (FLC) and the like, which modulate transmitted light by electro-optical effects, and spatial modulation elements other than MEMS types may be utilized. In these cases too, a pixel portion which is a subsection of all of the pixels that are arranged on a support may be employed. Thus, modulation rates per pixel and per main scanning line can be made faster, and the same effects as above can be provided.

Herein, MEMS is a general term for Microsystems in which micro-size sensors, actuators and control circuits are integrated by micro-machining technology based on IC fabrication processes. MEMS type spatial modulation elements means spatial modulation elements which are driven by electro-mechanical operations by utilization of static electric forces.

Another Exposure Method

Figure 18:
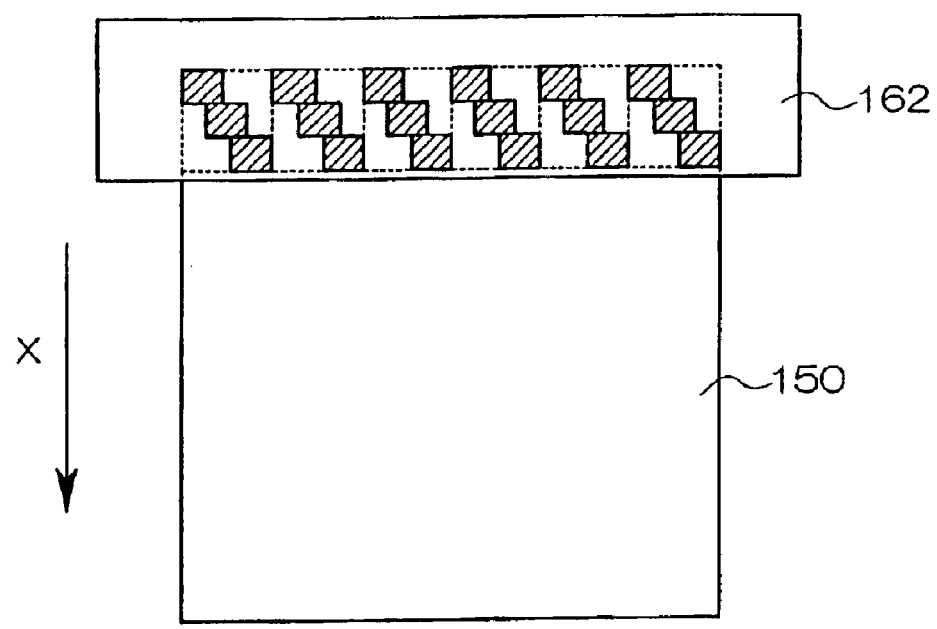
FIG. 18 is a plan view for explaining an exposure method for exposing a photosensitive material with a single cycle of scanning by a scanner.
Figure 19A:
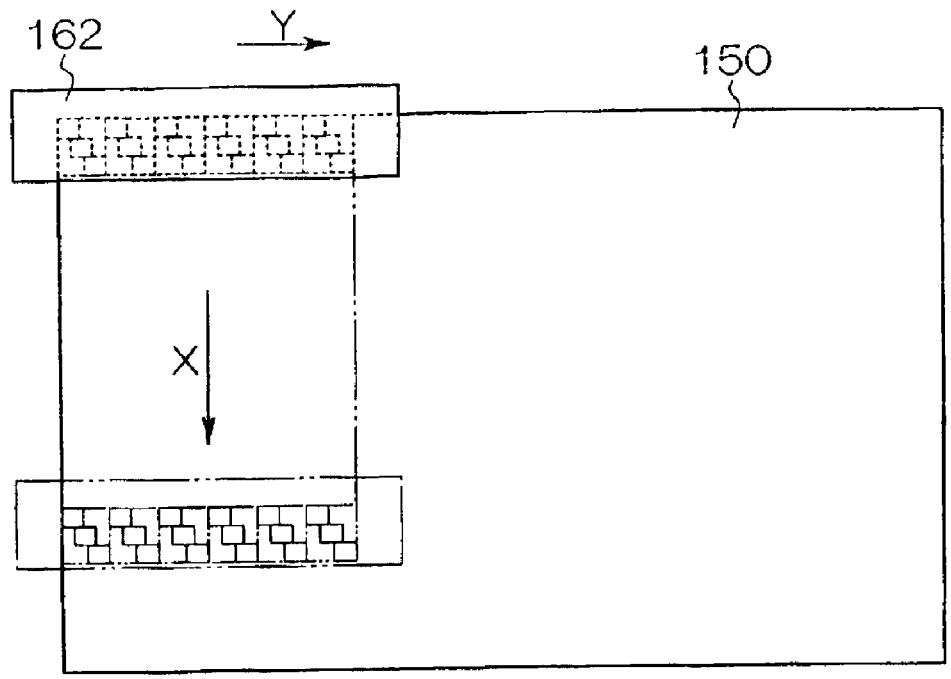
FIGS. 19A and 19B are plan views for explaining an exposure method for exposing a photosensitive material with a plurality of cycles of scanning by a scanner.
Figure 19B:
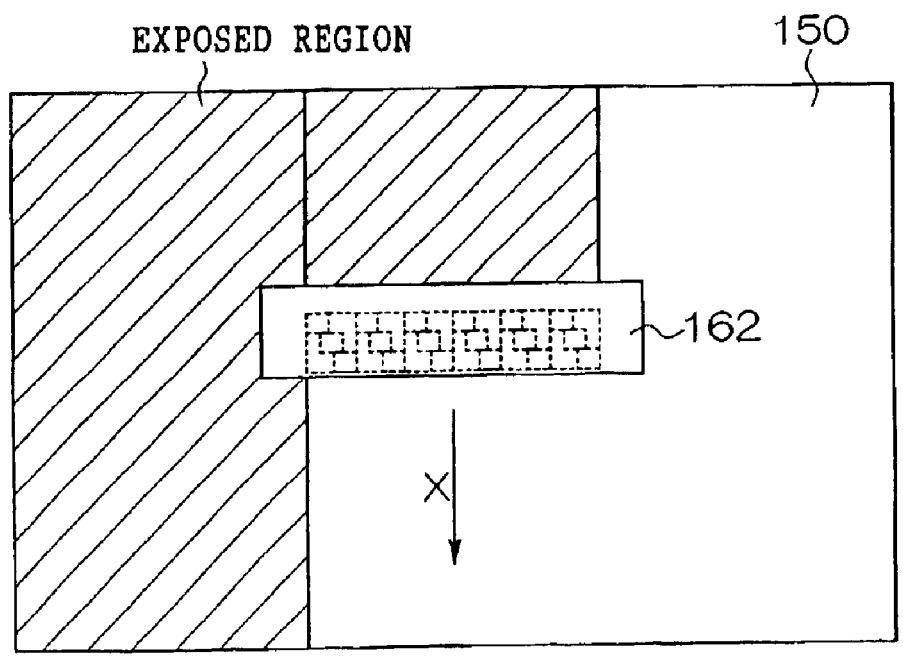

As shown in FIG. 18, the whole surface of the photosensitive material 150 may be exposed by a single cycle of scanning in a direction X by the scanner 162, the same as in the embodiments described above. Alternatively, as shown in FIGS. 19A and 19B, scanning and displacement may be repeated such that, after the photosensitive material 150 has been scanned in the direction X by the scanner 162, the scanner 162 is displaced by one step in a direction Y and scanning is again carried out in the direction X. Thus, the whole surface of the photosensitive material 150 can be exposed by a plurality of scans. Note that in this example the scanner 162 is equipped with eighteen of the exposure heads 166.

Other Laser Devices (Light Sources)

For the embodiments described above, examples in which the fiber array light sources that are utilized are equipped with pluralities of multiplex laser light sources have been described. However, the laser apparatus is not limited to a fiber array light source in which multiplexed laser light sources are arranged. For example, a fiber array light source may be utilized in which fiber light sources which are each equipped with a single optical fiber, which emits laser light inputted from a single semiconductor laser having one light emission point, are arrayed.

Figure 20:
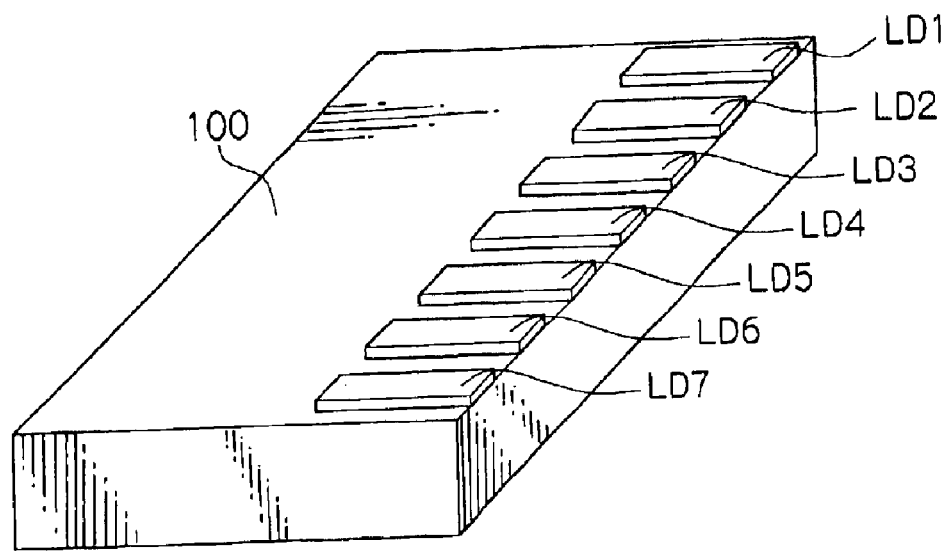
FIG. 20 is a perspective view showing structure of a laser array.

Further, for the embodiments described above, an example in which the multiplex laser light source that is utilized is provided with a laser array in which, as shown in FIG. 20, the plurality (for example, seven) of chip-form semiconductor lasers LD1 to LD7 are arranged on a heat block 100, has been described. However, the multiplex laser light source is not limited to a laser light source which multiplexes laser light emitted from a plurality of chip-form semiconductor lasers.

Figure 21A:
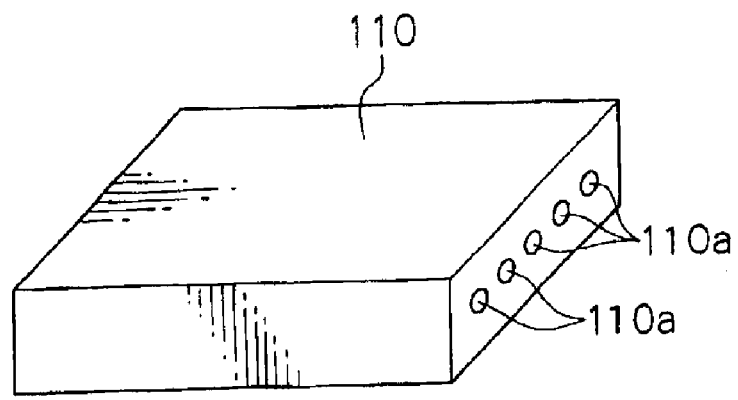
FIG. 21A is a perspective view showing structure of a multi-cavity laser.
Figure 22:
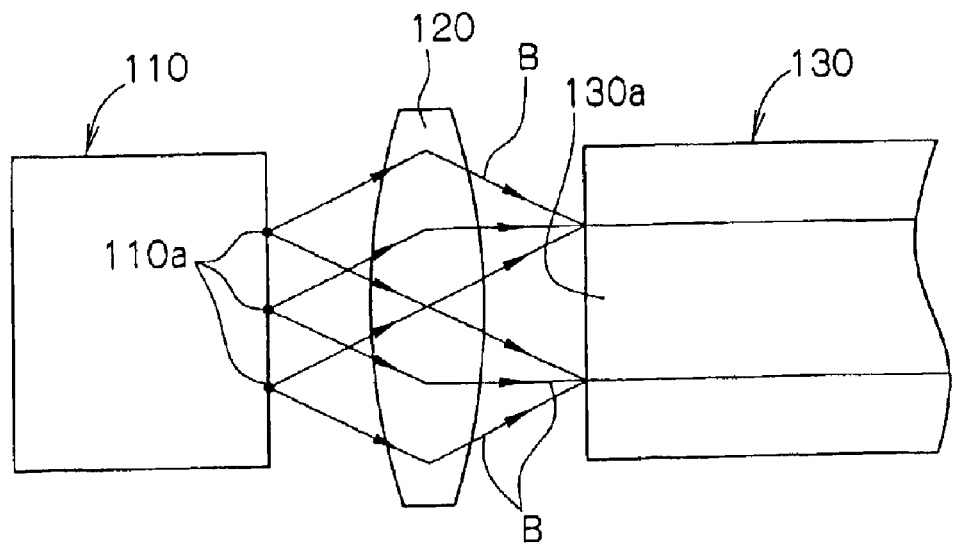
FIG. 22 is a plan view showing structure of another multiplex laser light source.

As shown in FIG. 21A, a chip-form multi-cavity laser 110 in which a plurality (for example, five) of light emission points 110a are arranged in a predetermined direction is known. For example, as shown in FIG. 22, a multiplex laser light source in which this multi-cavity laser 110 is provided may be utilized. This multiplex laser light source is structured with the multi-cavity laser 110, a single multi-mode optical fiber 130 and a condensing lens 120. The multi-cavity laser 110 may be structured with, for example, a GaN-based laser diode with an oscillation wavelength of 405 nm.

In comparison with cases in which chip-form semiconductor lasers are arranged, the multi-cavity laser 110 can be arranged with better positional accuracy of the light emission points. As a result, the laser beams emitted from the respective light emission points are easier to multiplex. However, if the number of light emission points is large, deformation of the multi-cavity laser 110 is likely to occur during laser fabrication. Therefore, it is preferable if the number of the light emission points 110a is not more than five.

In the structure described above, laser beams B, which are emitted respectively from the plurality of light emission points 110a of the multi-cavity laser 110, are condensed by the condensing lens 120 and inputted to a core 130a of the multi-mode optical fiber 130. The laser lights that have been inputted to the core 130a are propagated in the optical fibers, multiplexed into a single beam, and emitted.

The plurality of light emission points 110a of the multi-cavity laser 110 may be lined up within a breadth that is substantially the same as a core diameter of the multi-mode optical fiber 130. As the condensing lens 120, a convex lens with a focal length substantially the same as the core diameter of the multi-mode optical fiber 130, a rod lens which collimates the beams emitted from the multi-cavity laser 110 only in a dimension which is orthogonal to active layers of the multi-cavity laser 110, or the like may be utilized. By lining up the light emission points 110a and using such a lens, a coupling efficiency of the laser beams B into the multi-mode optical fiber 130 can be raised.

Figure 21B:
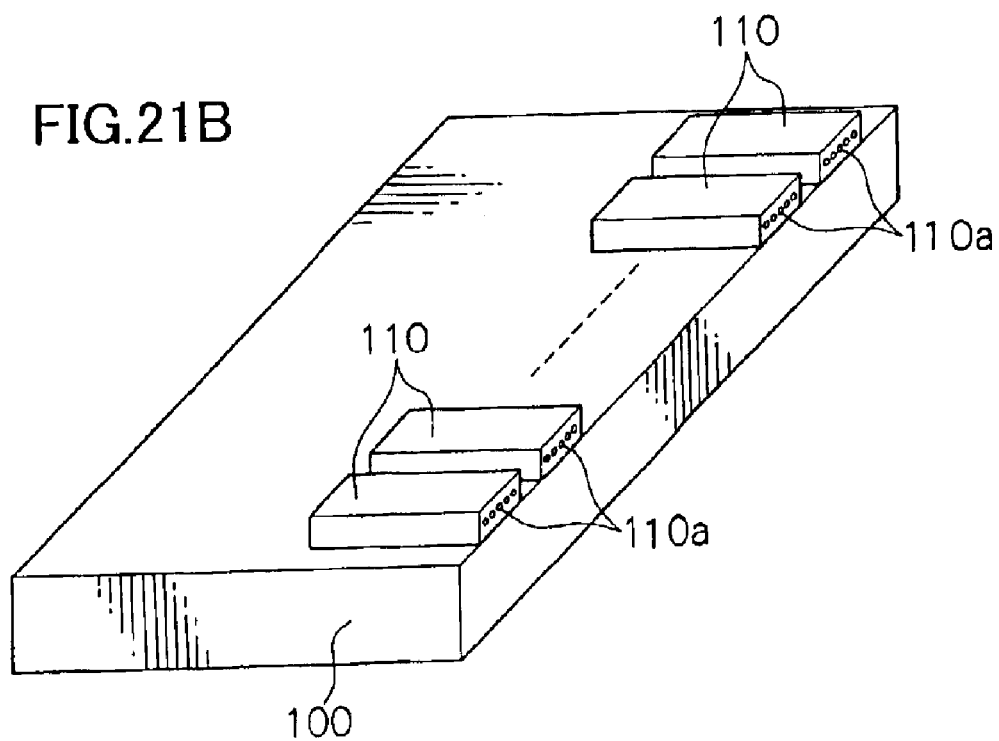
FIG. 21B is a perspective view of a multi-cavity laser array in which multi-cavity lasers are arranged in the form of an array.
Figure 23:
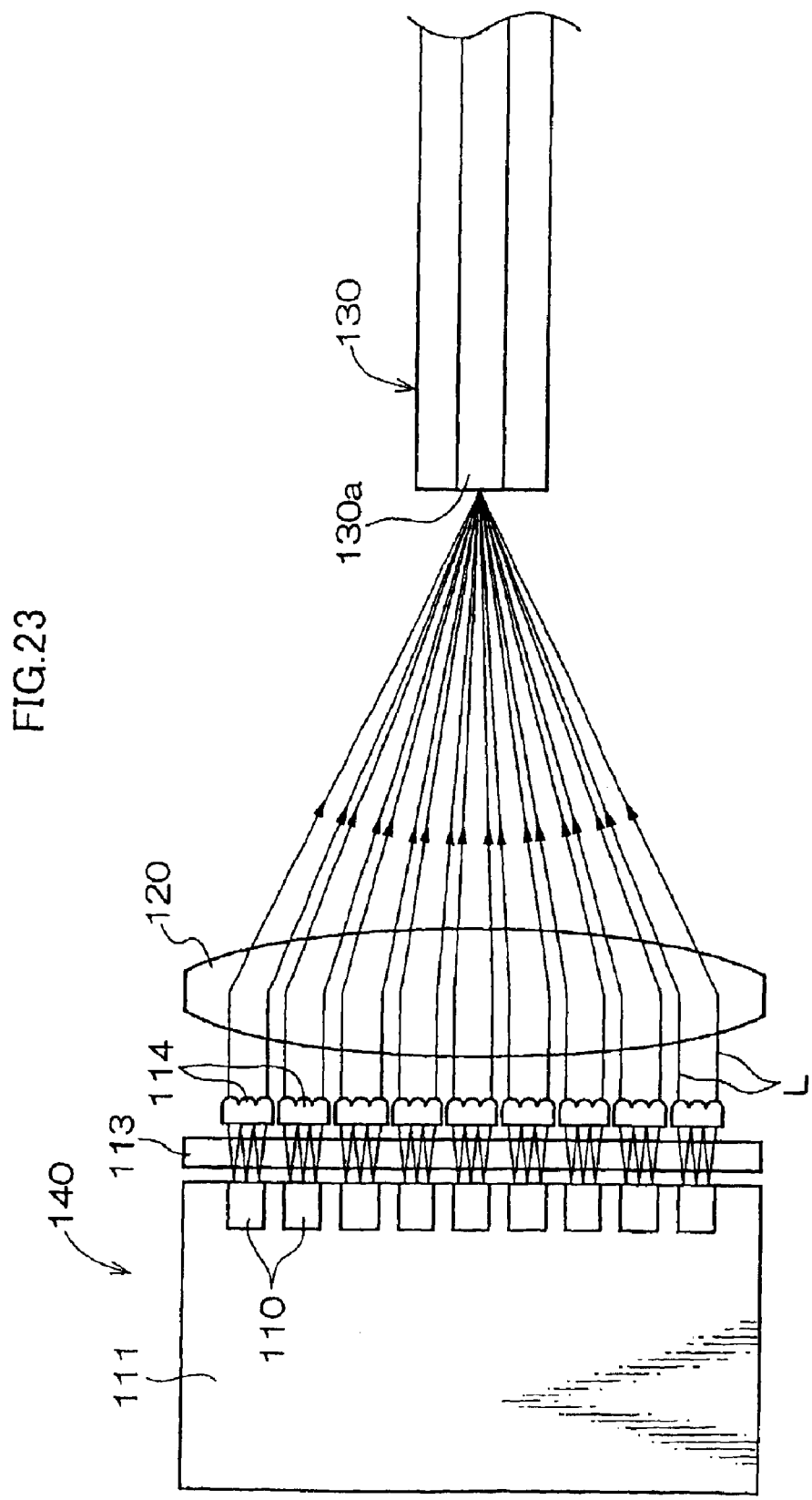
FIG. 23 is a plan view showing structure of yet another multiplex laser light source.

Further, as shown in FIG. 21B, a multi-cavity laser array can be utilized in which a plurality of the multi-cavity lasers 110 are arranged on the heat block 100 in the same direction as the arrangement direction of the light emission points 110a of each of these chips. As shown in FIG. 23, a structure of a multiplex laser array may be provided with a laser array 140 in which a plurality (for example, nine) of the multi-cavity lasers 110 are arranged with a constant spacing therebetween on a heat block 111. The plurality of multi-cavity lasers 110 are arranged in the same direction as the direction of arrangement of the light emission points 110a of each chip, and fixed.

The structure of this multiplex laser array includes the laser array 140, a plurality of lens arrays 114, a single rod lens 113, the single multi-mode optical fiber 130 and the condensing lens 120. The plurality of lens arrays 114 is disposed in correspondence with the multi-cavity lasers 110. The rod lens 113 is disposed between the laser array 140 and the plurality of lens arrays 114. The lens arrays 114 are provided with pluralities of microlenses corresponding to the light emission points of the multi-cavity lasers 110.

In the structure described above, each of laser beams B that are respectively emitted from the plurality of light emission points 110a of the plurality of multi-cavity lasers 110 are condensed in a predetermined direction by the rod lens 113, and then made parallel by the respective microlenses of the lens arrays 114. Laser beams L that have been made parallel are condensed by the condensing lens 120 and inputted into the core 130a of the multi-mode optical fiber 130. The laser light that has been fed in to the core 130a is propagated in the optical fiber, multiplexed to a single beam, and emitted.

Figure 24A:
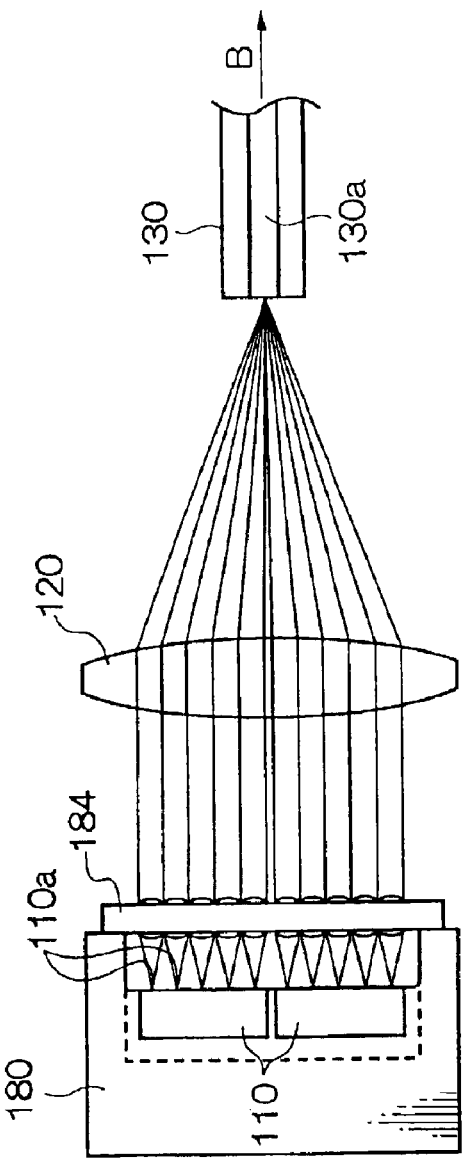
FIG. 24A is a plan view showing structure of still another multiplex laser light source.
Figure 24B:
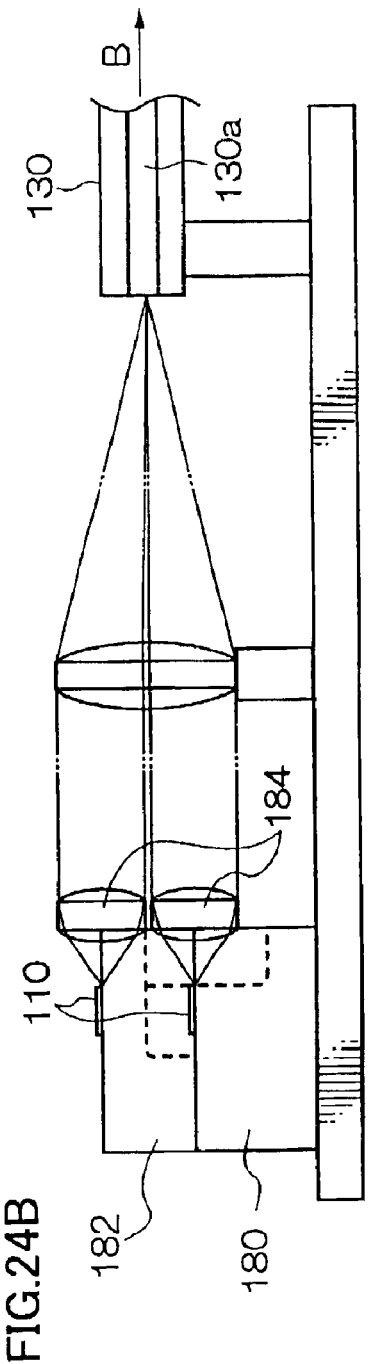
FIG. 24B is a sectional view, cut along the optical axis, of FIG. 24A.

Still another example of a multiplex laser light source will be illustrated. In this multiplex laser light source, as shown in FIGS. 24A and 24B, a heat block 182, which is L-shaped in a section cut in the direction of an optical axis, is mounted on a substantially rectangular heat block 180. An accommodation space is formed between the two heat blocks. At an upper face of the L-shaped heat block 182, a plurality (for example, two) of the multi-cavity lasers 110, in which pluralities (for example, five) of the light emission points are arranged in an array pattern, are arranged with constant spacing in a direction the same as the direction of arrangement of the light emission points 110a of each chip, and fixed.

A recess is formed in the substantially rectangular heat block 180. A plurality (for example, two) of the multi-cavity lasers 110, in which pluralities (for example, five) of the light emission points are arranged in an array pattern, are disposed on a recess side of an upper face of the heat block 180, such that the light emission points thereof are disposed in the same vertical plane as the light emission points of the laser chips that are disposed at the upper face of the heat block 182.

A collimation lens array 184, in which collimator lenses are arranged in correspondence with the light emission points 110a of each chip, is disposed at a laser light emission side of the multi-cavity lasers 110. The collimation lens array 184 is disposed such that a longitudinal direction of each collimator lens coincides with a direction in which spreading angles of the laser beams are large (a fast axis direction) and the width direction of the each collimator lens coincides with a direction in which the spreading angles are small (a slow axis direction). Accordingly, because the collimator lenses are arrayed and integrated, a spatial utilization rate of the laser light can be improved, and higher output can be provided by the multiplexed laser light source. Moreover, the number of components can be reduced and costs can be lowered.

The single multi-mode optical fiber 130 and the condensing lens 120 are disposed at a laser light emission side of the collimation lens array 184. The condensing lens 120 condenses and focuses the laser beams onto the incidence end of the multi-mode optical fiber 130.

In the structure described above, respective laser beams, which are emitted from the pluralities of light emission points 110a of the plurality of multi-cavity lasers 110 disposed on the heat blocks 180 and 182, are converted to parallel light by the collimation lens array 184, condensed by the condensing lens 120, and made to be incident on the core 130a of the multi-mode optical fiber 130. The laser light that is incident at the core 130a is propagated in the optical fiber, multiplexed into a single beam, and emitted.

Because, in this multiplex laser light source, the multi-cavity lasers are disposed at a plurality of levels and the collimator lenses are arrayed as described above, a particularly high power output can be expected. When this multiplexed laser light source is utilized, a fiber array light source, a bundled fiber light source or the like with even higher luminance can be structured. Thus, this multiplex laser light source is particularly favorable for use as the fiber light source structuring the laser light source of the exposure apparatus of the present invention.

The multiplex laser light source described above is accommodated in a casing, and a laser module in which an emission end portion of the multi-mode optical fiber 130 is led out from the casing can be structured.

For the embodiments described above, examples have been described in which another optical fiber, which has the same core diameter as the multi-mode optical fiber but a smaller cladding diameter than the multi-mode mode optical fiber, is joined at the emission end of the multi-mode optical fiber of the multiplex laser array, and the fiber array light source is thus designed to have a higher luminance. However, for example, as shown in FIGS. 35A and 35B, the multi-mode optical fibers 30 may be employed with cladding diameters of 125 $\mu$m, 80 $\mu$m, 60 $\mu$m or the like, and without joining other optical fibers at the emission ends thereof. When such optical fibers with small cladding diameters are employed and two or three of the fiber light sources at which numerous beams are multiplexed are arrayed as shown in FIG. 35B or bundled as shown in FIG. 35A, the light emission points can be brought close together, as a point-like light source. Consequently, structure of the optical system that is used in this light source is simple. Accordingly, this light source can be structured with a low cost, high functionality optical system.

FIG. 36 shows end faces (a light emission portion) of the laser emission portion 68 of FIG. 35A. The multi-mode optical fibers 30 are bundled such that adjacent the optical fibers are as close to each other as possible. Because, as described above, cladding diameters of the multi-mode optical fibers 30 are all 125 $\mu$m, the size of the light emission portion is about 0.375 mm by 0.25 mm. Further, as described above, the output of the laser emission portion 68 is about 1 W. Thus, in comparison with a conventional bundled fiber light source, the same laser output can be provided with about one-seventh the number of fibers, about one-third the light emission portion diameter, and about one-tenth the light emission region area.

Accordingly, because the number of multi-mode optical fibers (the number of laser modules) can be reduced, a lowering in costs of the light source can be expected. Further, by reducing the number of optical fibers, the light emission portion diameter can be made smaller. Thus, a luminance about ten times higher can be expected.

As mentioned above, an example in which a plurality of optical fibers with different cladding diameters are joined into an optical fiber in which the cladding diameter of the emission end is smaller than the cladding diameter of the incidence end has been described. However, it is also possible to structure the optical fibers such that the cladding diameter gets smaller from the incidence end to the emission end gradually.

Light Amount Distribution-correcting Optical System

In the embodiments described above, a light intensity distribution-correcting optical system formed of a single pair of combination lenses is used at the exposure head. The light intensity distribution-correcting optical system converts an optical flux width at each of emission positions such that a ratio of a flux width at a peripheral edge portion to a flux width at a central portion, which is near an optical axis, is smaller at an emission side of the light intensity distribution-correcting optical system than at an incidence side thereof, and corrects the light intensity distribution such that a light intensity distribution at irradiated surfaces of the DMD or the like is substantially uniform when the parallel flux from the light source is irradiated at the DMD. Operation of this light intensity distribution-correcting optical system will be described.

Figure 25A:
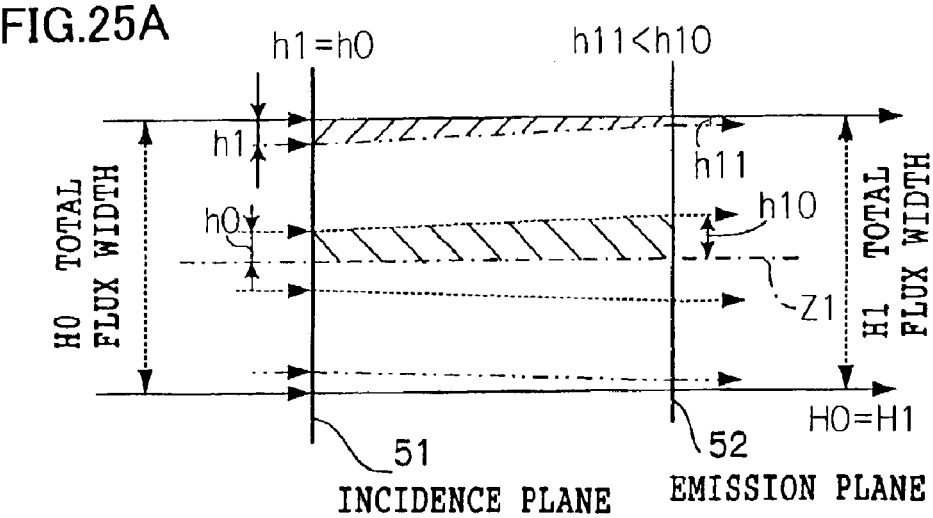
FIGS. 25A, 25B and 25C are views for explaining concepts of correction by a light intensity distribution-correcting optical system.

First, as shown in FIG. 25A, a case in which the overall luminous flux widths (total flux widths) H0 and H1 of incidence luminous flux and emission luminous flux are the same is described. In FIG. 25A, the portions indicated by the reference numerals 51 and 52 represent, virtually, an incidence plane and an emission plane of the light intensity distribution-correcting optical system.

In the light intensity distribution-correcting optical system, luminous flux widths h0 of luminous flux that is incident at a central portion near to an optical axis Z1, and luminous flux width h1 of luminous flux that is incident at a peripheral edge portion are set to be the same (h0=h1). The light intensity distribution-correcting optical system implements operations on the luminous flux widths h0 and h1 at the incidence side, which are equal, so as to expand the luminous flux width h0 for the incident flux of the central portion and, conversely, to contract the luminous flux width h1 for the incident light of the peripheral edge portion. That is, for a width h10 of emission luminous flux of the central portion and a width h11 of emission luminous flux of the peripheral edge portion, h11 is made to be less than h10. Represented as a ratio of flux widths, at the emission side, a ratio of the luminous flux width at the peripheral edge portion to the luminous flux width at the central portion, (h11/h10) is smaller than the ratio (h1/h0=1) at the incidence side (i.e., h11/h10<1).

When the luminous flux widths are converted in this manner, the flux at central portions, at which the luminous flux distribution is usually large, can be shifted to peripheral edge portions, at which light intensities are usually insufficient. Thus, the light intensity distribution can be made uniform at the irradiated surfaces without a drop in efficiency of utilization of the light as a whole. The degree to which the luminous flux is made uniform is such that, for example, unevenness of light intensities inside an effective region is within 30%, and preferably within 20%.

Figure 25B:
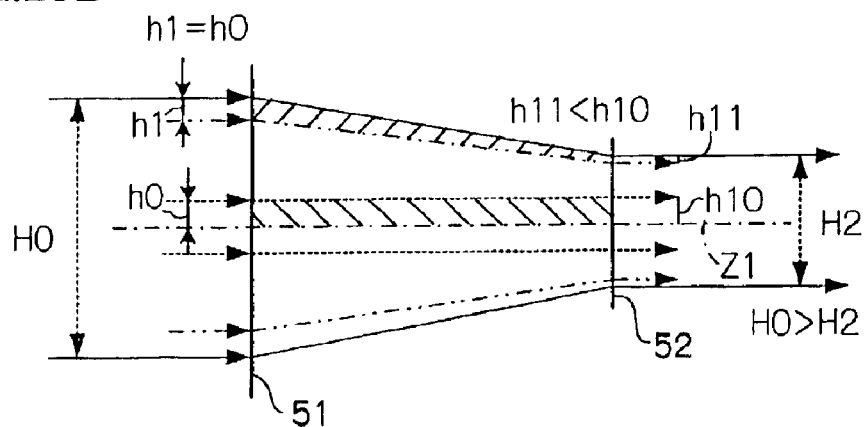
Figure 25C:
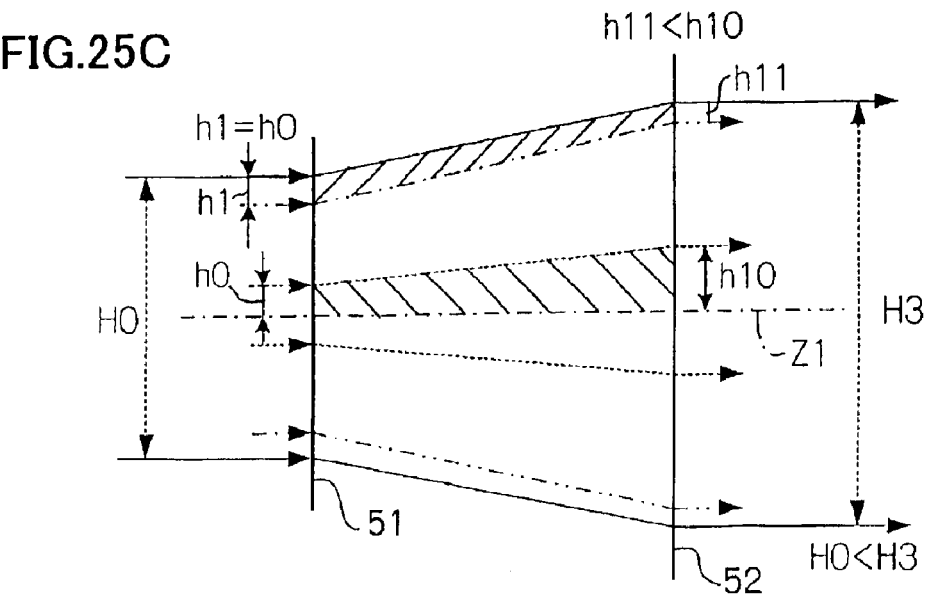

Operation and effects of this light intensity distribution-correcting optical system are the same in a case in which the overall flux width changes between the incidence side and the emission side (see FIGS. 25B and 25C).

FIG. 25B shows a case in which the overall flux width H0 at the incidence side is "contracted" to a width H2 and emitted (H0>H2). In this case too, the light intensity distribution-correcting optical system acts on the light which has flux widths at the incident side h0 and h1, which are equal, to make the flux width h10 of the central portion at the emission side greater in comparison to the peripheral edge portion and, in contrast, to make the flux width h11 of the peripheral edge portion smaller in comparison to the central portion. In terms of a contraction ratio of the flux, the light intensity distribution-correcting optical system implements operation such that a contraction ratio relative to the incident luminous flux is smaller at the central portion than at the peripheral edge portion and a contraction ratio relative to the incident luminous flux is larger at the peripheral edge portion than at the central portion. In this case too, the ratio of the flux width at the peripheral edge portion to the flux width at the central portion (h11/h10) is smaller than the ratio (h1/h0=1) at the incidence side (i.e., h11/h10<1).

FIG. 25C shows a case in which the overall flux width H0 at the incidence side is "expanded" to a width H3 and emitted (H0<H3). In this case too, the light intensity distribution-correcting optical system acts on the light which has flux widths at the incident side h0 and h1, which are equal, to make the flux width h10 of the central portion at the emission side greater in comparison to the peripheral edge portion and, in contrast, to make the flux width h11 of the peripheral edge portion smaller in comparison to the central portion. In terms of an expansion ratio of the flux, the light intensity distribution-correcting optical system implements operation such that an expansion ratio relative to the incident luminous flux is greater at the central portion than at the peripheral edge portion, and an expansion ratio relative to the incident luminous flux is smaller at the peripheral edge portion than at the central portion. In this case too, the ratio of the flux width at the peripheral edge portion relative to the flux width at the central portion (h11/h10) is smaller than the ratio (h1/h0=1) at the incidence side (i.e., h11/h10<1).

Thus, the light intensity distribution-correcting optical system changes the luminous flux widths at each emission position, and makes ratios of luminous flux widths at peripheral edge portions to luminous flux widths at central portions, which are close to the optical axis Z1, smaller at the emission side than at the incidence side. Thus, at the emission side, light that has flux widths that are equal at the incidence side has flux widths at central portions that are greater than at peripheral edge portions, and flux widths at the peripheral edge portions become smaller than at the central portions. Hence, the flux of the central portions can be shifted towards the peripheral edge portions, and a luminous flux cross-section whose light intensity distribution has been made uniform can be formed without bringing down light usage efficiency of the optical system as a whole.

Next, one example of specific lens data of the combination lenses that are employed as the light intensity distribution-correcting optical system will be illustrated. In this example, lens data is illustrated for a case in which, as in cases in which the light source is a laser array light source, the light intensity distribution of a cross-section of emitted flux is a gaussian distribution. Now, in a case in which a single semiconductor laser is connected to the incidence end of a single-mode optical fiber, the light intensity distribution of emitted flux from the optical fiber will be a gaussian distribution. This is also applicable in cases such as the present embodiments. Furthermore, this is also applicable to a case in which light intensities at central portions, which are close to the optical axis, are greater than light intensities at peripheral edge portions because the core diameter of a multi-mode optical fiber has been made smaller, approaching the structure of a single-mode optical fiber, or the like.

Basic lens data is shown in the following table 1.

TABLE 1

Basic Lens Data

| Si (surface number) | ri (radius of curvature) | di (surface separation) (mm) | Ni (refractive index) |
|---|---|---|---|
| 01 | aspherical surface | 5.000 | 1.52811 |
| 02 | 8 | 50.000 | |
| 03 | 8 | 7.000 | 1.52811 |
| 04 | aspherical surface | | |

As seen from table 1, the single pair of combination lenses is structured by two aspherical-faced lenses with rotational symmetry. If a face at the light incidence side of a first lens, which is disposed at the light incidence side of the pair, is considered to be a first face, and a face at the emission side of the first lens is considered to be a second face, the first face has an aspherical surface form. If a face at the light incidence side of a second lens, which is disposed at the light emission side of the pair, is considered to be a third face and a face at the light emission side of the second lens is considered to be a fourth face, the fourth face has an aspherical surface form.

In table 1, surface number Si represents the number of the i-th surface (i=1 to 4) radius of curvature ri represents the radius of curvature of the i-th surface, and surface distance di represents a surface spacing, on the optical axis, between the i-th surface and the (i+1)-th surface. The dimension of surface distance di is millimeter (mm). Refractive index Ni represents the value of an index of refraction, for wavelength 405 nm, of the optical element at which the i-th surface is provided.

Aspherical surface data of the first and fourth surfaces is shown in the following table 2.

TABLE 2

Aspherical Surface Data

|  | First Surface | Fourth Surface |
| --- | --- | --- |
| C | −1.4098E−02 | −9.8506E−03 |
| K | −4.2192E+00 | −3.6253E+01 |
| a3 | −1.0027E−04 | −8.9980E−05 |
| a4 | 3.0591E−05 | 2.3060E−05 |
| a5 | −4.5115E−07 | −2.2860E−06 |
| a6 | −8.2819E−09 | 8.7661E−08 |
| a7 | 4.1020E−12 | 4.4028E−10 |
| a8 | 1.2231E−13 | 1.3624E−12 |
| a9 | 5.3753E−16 | 3.3965E31 15 |
| a10 | 1.6315E−18 | 7.4823E−18 |

The aspherical surface data shown above represents factors in the following formula (A), which represents aspherical surface forms.

$$Z = \frac{C \cdot \rho^2}{1 + \sqrt{1 - K \cdot (C \cdot \rho)^2}} + \sum_{i=3}^{10} a_i \cdot \rho^i \quad (A)$$

Each of the factors in the above formula (A) is defined as follows.

Z: length (mm) of a vertical line descending, in a plane tangential to an apex point of the aspherical surface (a flat plane pependicular to the optical axis), from a point on the aspherical surface which is positioned at a height $\rho$ from the optical axis $\rho$: distance from the optical axis (mm)

K: a coefficient of conicality

C: a rate of curvature near the axis (1/r, r being a near-axis radius of curvature)

$a_i$: an i-th aspherical surface coefficient (i=3 to 10)

In the numerical values shown in table 2, the symbol "E" signifies that the number following the E represents a decimal exponent, and that the number preceding the E is to be multiplied by a value represented by the decimal exponent. For example, "1.0E-2" represents $1.0 \times 10^{-2}$.

Figure 26:
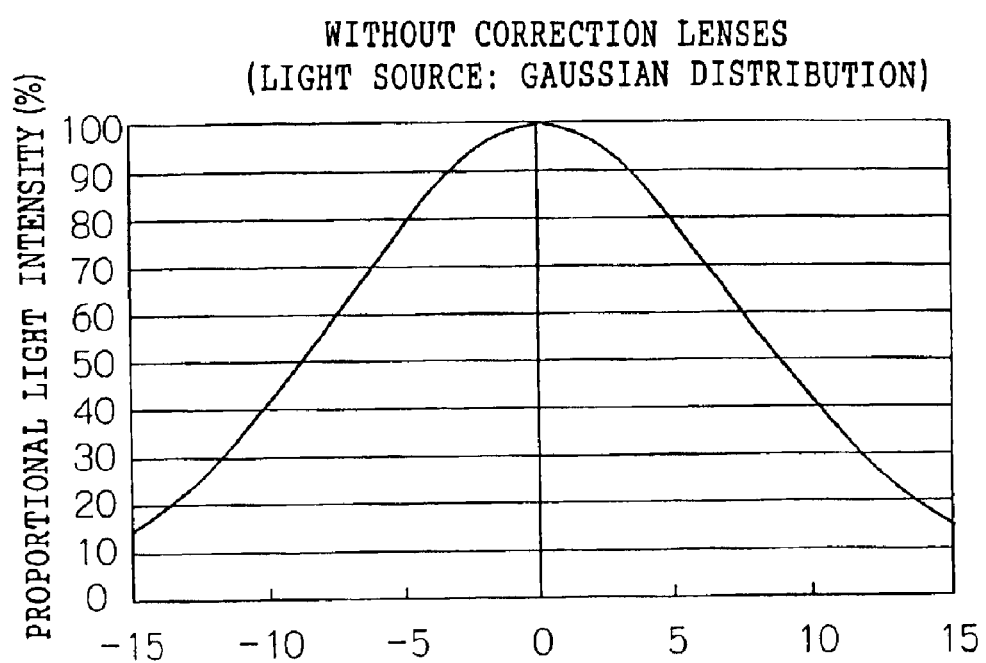
FIG. 26 is a graph showing a light intensity distribution in a case in which a light source has a gaussian distribution and correction of the light intensity distribution is not carried out.
Figure 27:
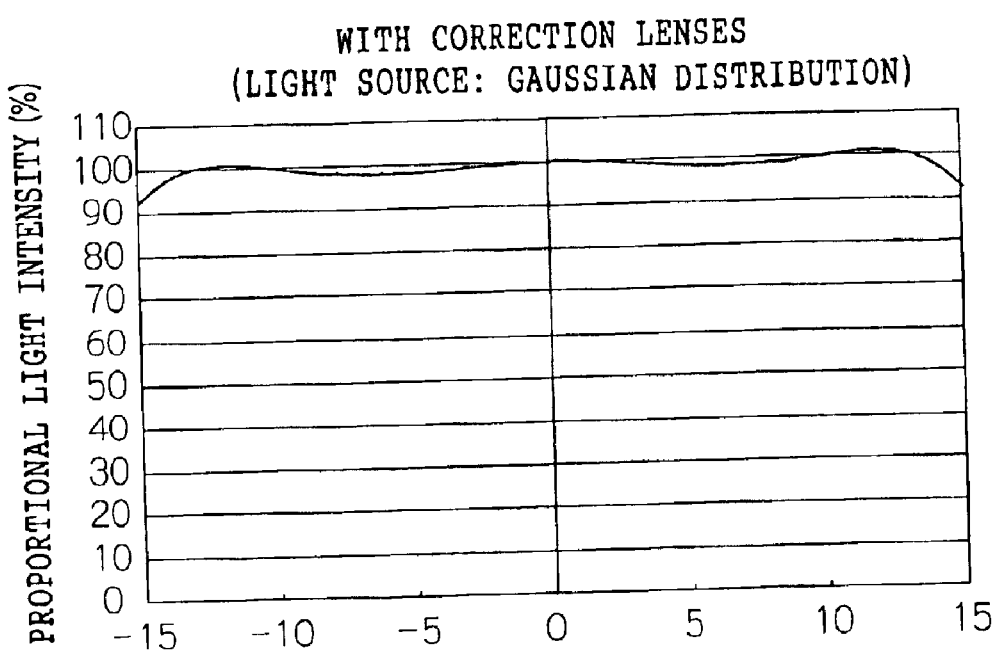
FIG. 27 is a graph showing a light intensity distribution after correction by the light intensity distribution-correcting optical system.

FIG. 27 shows a light intensity distribution of illumination light provided by the single pair of combination lenses illustrated in table 1 and table 2 above. The horizontal axis shows co-ordinates from the optical axis, and the vertical axis shows light intensity ratios (%). For comparison, FIG. 26 shows a light intensity distribution of illumination light in a case in which the correction is not carried out (a gaussian distribution). As can be seen from FIGS. 26 and 27, because the correction is carried out by the light intensity distribution-correcting optical system, a light intensity distribution which is substantially uniform in comparison to the case in which the correction is not carried out can be obtained. Thus, exposure with uniform laser light that is free of unevenness can be carried out without reducing the efficiency of utilization of the light in the exposure head.

An example of a light intensity distribution correcting optical system has been shown. However, conventionally known means, such as a rod integrator, a fly-eye lens array or the like may be used.

Another Imaging Optical System

In the first embodiment described above, two groups of lenses are disposed to serve as an imaging optical system at the light reflection side of the DMD employed in the exposure head. However, a coupling optical system which widens and focuses the laser light may be disposed thereat. By widening the cross-sectional area of optical flux lines reflected by the DMD, an exposure area at the surface to be exposed (an imaging region) can be enlarged to a desired size.

Figure 28A:
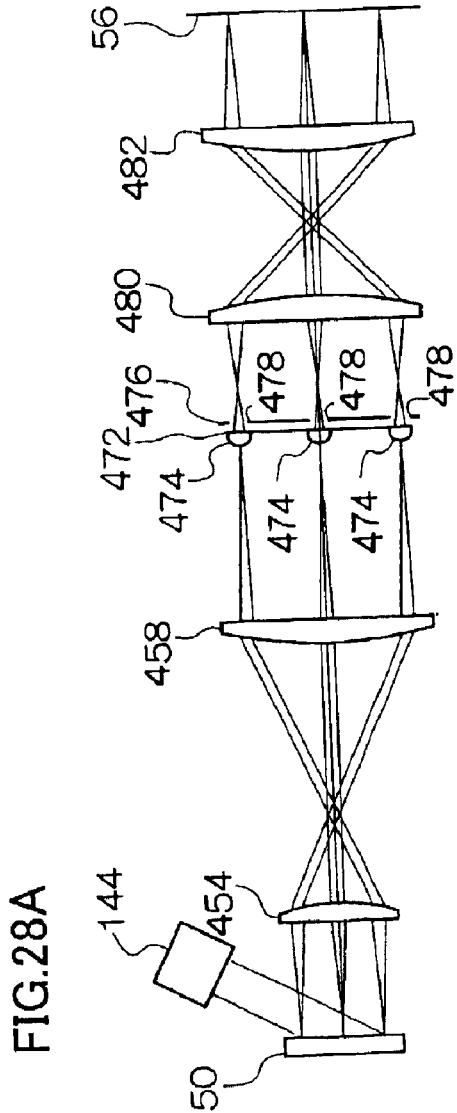
FIG. 28A is a sectional view, cut along the optical axis, showing structure of another exposure head, in which a focusing optical system is different.

For example, as shown in FIG. 28A, the exposure head may be structured with the DMD 50, an illumination apparatus 144, lens systems 454 and 458, a microlens array 472, an aperture array 476, and lens systems 480 and 482. The illumination apparatus 144 illuminates laser light onto the DMD 50. The lens systems 454 and 458 widen and focus laser light that has been reflected at the DMD 50. A large number of microlenses 474 are disposed at the microlens array 472, in respective correspondence with the pixels of the DMD 50. The aperture array 476 is provided with a large number of apertures 478 in respective correspondence with the microlenses of the microlens array 472. The lens systems 480 and 482 focus laser light that has been transmitted through the apertures onto the surface to be exposed 56.

In this exposure head, when laser light is irradiated from the illumination apparatus 144, the cross-sectional area of luminous flux lines reflected in the 'ON' direction by the DMD 50 is enlarged to a magnification (for example, ×2) by the lens systems 454 and 458. The enlarged laser light is condensed in accordance with the pixels of the DMD 50 by the microlenses of the microlens array 472, and is passed through the corresponding apertures of the aperture array 476. The laser light that has passed through the apertures is imaged on the surface to be exposed 56 by the lens systems 480 and 482.

Figure 28C:
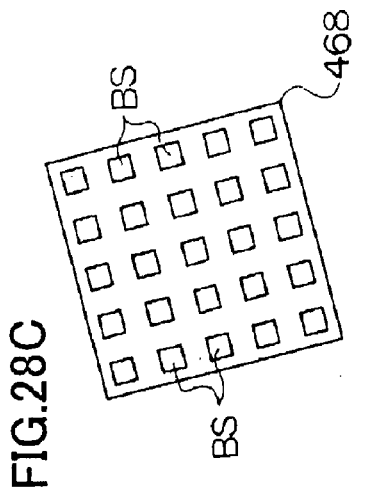
FIG. 28C is a plan view showing an image which is projected onto the surface that is to be exposed in a case in which the microlens array or the like is employed.
Figure 28B:
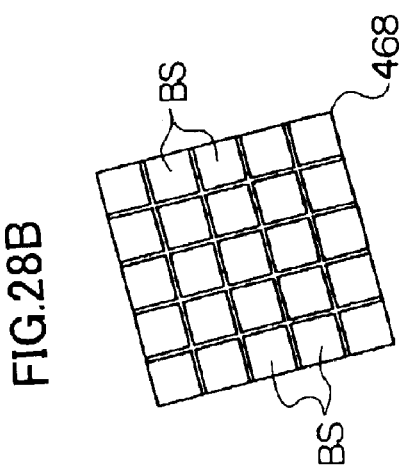
FIG. 28B is a plan view showing an image which is projected onto a surface that is to be exposed in a case in which a microlens array or the like is not employed.
Figure 29:
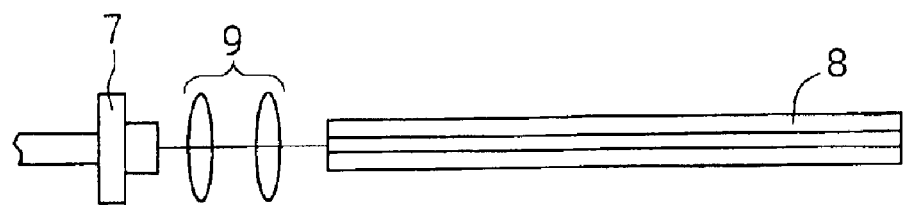
FIG. 29 is a sectional view, cut along the optical axis, showing structure of a conventional fiber light source.

In this imaging optical system, because the laser light that has been reflected by the DMD 50 is enlarged to a certain magnification by the enlarging lens systems 454 and 458 and then projected on the surface to be exposed 56, the overall image region becomes larger. Here, if the microlens array 472 and the aperture array 476 is not disposed in the system, then, as shown in FIG. 28B, a one-pixel size (spot size) of each beam spot BS that is projected onto the surface to be exposed 56 will have a size corresponding to the size of an exposure area 468, and an MTF (modulation transfer function) characteristic representing sharpness of the exposure area 468 will fall.

In contrast, in the case in which the microlens array 472 and aperture array 476 are disposed in the system, the laser light that has been reflected by the DMD 50 is condensed in correspondence with the pixels of the DMD 50 by the microlenses of the microlens array 472. As a result, as shown in FIG. 28C, even though the exposure area is enlarged, the spot size of each beam spot BS can be shrunk to a desired size (for example, 10 $\mu$m by 10 $\mu$m). Thus, the reduction of the MTF characteristic can be prevented, and high precision exposure can be carried out. Note that the exposure area 468 is inclined because the DMD 50 is disposed at an angle so as to eliminate gaps between pixels.

Moreover, even if the beams are broadened by aberration of the microlenses, the beams can be smoothed by the apertures such that the spot sizes on the surface to be exposed 56 have a certain size. In addition, by this transmission through the apertures provided in correspondence with the pixels, crosstalk between adjacent pixels can be prevented.

By employing the illumination apparatus 144 as a high-brightness light source in the same way as in the embodiments described above, the angle of flux that is incident on the microlenses of the microlens array 472 from the lens system 458 is made small. Thus, incidence of portions of the flux at neighboring pixels can be prevented. Thus, a high extinction ratio can be realized. The extinction ratio could also be further improved by making the aperture diameters smaller to cut excess light, but light intensity losses would be large. In contrast, in the present example the extinction ratio can be improved without increasing light intensity losses.

Another Structure of Connected Optical Fibers

Figure 40:
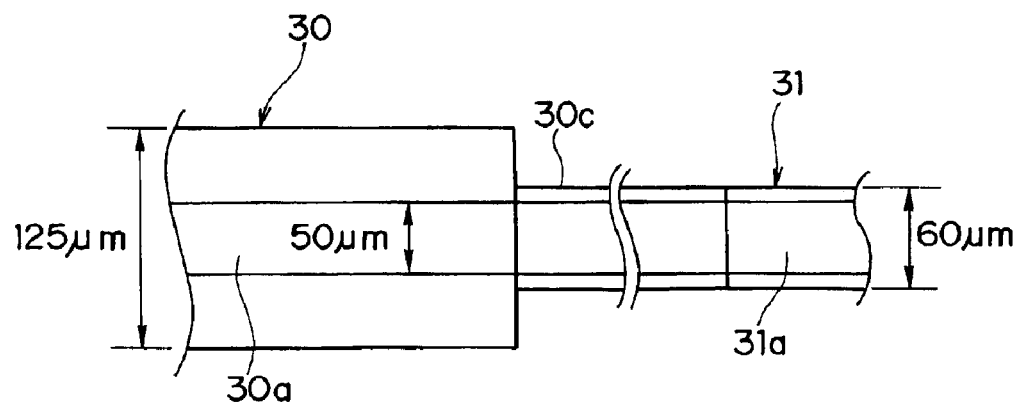
FIG. 40 is a view showing structure of a multi-mode optical fiber.

With FIG. 10, an example has been described in which the incidence end face of the optical fiber 31 is fused and joined at the emission end face of the multi-mode optical fiber 30. However, as shown in FIG. 40, it is also possible to form a small diameter portion 30c at a distal end portion of the laser light emission side of the multi-mode optical fiber 30 whose cladding diameter is large, and to coaxially join the optical fiber 31, with a small cladding diameter and a length of 100 mm to the small diameter portion 30c. A connection method for this optical fiber is described next.

As the multi-mode optical fiber 30 and the optical fiber 31, any of step index-type optical fibers, graded index-type optical fibers and multiplex-type optical fibers can be used. For example, step index-type optical fibers produced by Mitsubishi Cable Industries, Ltd. can be utilized. In the present embodiment, the multi-mode optical fiber 30 and the multi-mode optical fiber 31 are step index-type optical fibers. For the multi-mode optical fiber 30, cladding diameter=125 $\mu$m, core diameter=50 $\mu$m, NA=0.2, and transmittance of the end face coating=99.5% or more. For the optical fiber 31, cladding diameter=60 $\mu$m, core diameter=50 $\mu$m, and NA=0.2.

Optical Fiber Connection Methods

Conventionally, since the tapered region of the cladding could not be obtained for a sufficient length, the tapered region included only the distal end of the cladding. Accordingly, it was difficult to closely dispose the claddings to arrange the claddings in a array or a bundle, and to obtain a high-brightness light source. Furthermore, since it was difficult to arrange the cladding diameters evenly, it was difficult to form a uniform fiber array.

Accordingly, connecting separate optical fibers, whose cladding diameters are smaller, to distal ends of optical fibers that are usually employed for light propagation, and bundling portions of these optical fibers whose cladding diameters are smaller has been considered. Conventionally, to connect two optical fibers in such a manner, electric discharge-type fusion-splicing devices, which fuse and splice end portions of two optical fibers which have been coaxially aligned, are widely used.

However, in a case in which two optical fibers having a large difference in external diameters (cladding diameters) thereof are fusion-spliced in this manner, if electric discharge conditions are specified such that the thicker of the optical fibers is suitably melted, the thinner of the optical fibers is excessively melted and the distal end thereof becomes rounded. Hence, the two optical fibers cannot be suitably fusion-spliced. Conversely, if the electric discharge conditions are specified such that the thinner of the optical fibers is suitably melted, the electrical discharge is weak, and the thicker of the optical fibers is not melted. Consequently, in this case too, the two optical fibers cannot be tightly contacted and suitably fusion-spliced. Specifically, in cases depending on this conventional method, losses of the order of 1 dB may occur at the connection portion, and a connection efficiency may be limited to around 80%.

According to a connection method described below, two optical fibers having a large difference in external diameter can be reliably connected. This optical fiber connection method will be described with reference to FIGS. 37A and 37B. A present example, as shown in FIGS. 37A and 37B, is an example in which the distal end portion of the multi-mode optical fiber 30, whose external diameter (cladding diameter) is 125 $\mu$m, is connected with the multi-mode optical fiber 31 whose external diameter (cladding diameter), being 60 $\mu$m, is smaller. As an example, the multi-mode optical fiber 30 is a step index-type optical fiber, in which the core 30a is covered with a cladding 30b, whose refraction index is lower than that of the core 30a. Similarly, at the multi-mode optical fiber 31, the core 31a is covered with a cladding 31b, whose refraction index is lower than that of the core 31a.

At the multi-mode optical fiber 30, cladding diameter= 125 $\mu$m, core diameter=50 $\mu$m, NA=0.2, and transmittance of the end face coating=99.5% or more. At the multi-mode optical fiber 31, cladding diameter=60 $\mu$m, core diameter=50 $\mu$m, and NA=0.2.

First, as shown in FIG. 37A, mechanical machining such as grinding or the like is applied to the cladding 30b at the distal end portion of the core 30a. Thus, the small diameter portion 30c is formed with a length of the order of around 100 mm. The external diameter of this small diameter portion 30c is 60 $\mu$m, the same as the cladding diameter of the multi-mode optical fiber 31.

Next, as shown in FIG. 37B, at the distal end of the small diameter portion 30c described above, the multi-mode optical fiber 31, whose external diameter is the same as portion 30c, is fusion-spliced in a state in which the core axes of the small diameter portion 30c and the multi-mode optical fiber 31 are coaxially aligned with one another. For this fusion, an ordinary electric discharge-type fusion-splicing device which is used for fusing such optical fibers may be used. Examples of such optical fiber fusion-splicing devices include a compact direct core monitoring optical fiber fusion splicer SUMIOFCAS TYPE-37, from Sumitomo Electric Industries, Ltd., and the like.

In the method described above, the small diameter portion 30c is formed at the distal end portion of the multi-mode optical fiber 30, and then the optical fiber 31 having the same external diameter as the small diameter portion 30c is fusion-spliced thereto. Therefore, the two optical fibers 30 and 31 can be connected simply and reliably without, as in cases of fusing and connecting two optical fibers whose external diameters differ greatly, the external diameter of the optical fiber 31 whose external diameter is smaller being excessively melted or, conversely, the external diameter of the optical fiber 30 whose external diameter is larger not being melted. Specifically, losses at the connection portion of the two optical fibers 30 and 31 can be suppressed to around 0.05 dB, and a connection efficiency of 99% can be realized.

As described later, a plurality of optical fibers in which the two optical fibers 30 and 31 are connected are prepared, and the distal end portions of the optical fibers 31 thereof are bundled for employment. Here, because the small diameter portions 30c of the distal end portions of the multi-mode optical fibers 30 are not bundled, a mechanical machining precision that is required at the small diameter portions 30c is not particularly high, and the small diameter portions 30c can accordingly be formed with ease.

Next, another optical fiber connection method will be described, with reference to FIG. 38. In FIG. 38, the same reference numerals are applied to elements that are the same as elements in FIG. 37, and descriptions thereof that are not particularly necessary will be omitted (and the same applies hereafter).

In this example, a small diameter portion 30c' with a length of, for example, around 100 mm, is formed by applying mechanical machining, such as grinding or the like, to the cladding 30b at the distal end portion of the multi-mode optical fiber 30. The external diameter of this small diameter portion 30c' is set to 80 $\mu$m, which is a little greater than the 60 $\mu$m cladding diameter of the multi-mode optical fiber 31. Next, the distal end of the small diameter portion 30c' is fusion-spliced with the multi-mode optical fiber 31, whose external diameter is a little smaller than that of the small diameter portion 30c', in a state in which the core diameters of the small diameter portion 30c' and the multi-mode optical fiber 31 are coaxially aligned with one another.

In the above-described case too, the two optical fibers 30 and 31 can be connected simply and reliably without, as in a case of fusing and connecting the multi-mode optical fiber 31 directly to the distal end portion of the multi-mode optical fiber 30 in which case the external diameters of the two optical fibers differ greatly, the optical fiber 31 whose external diameter is smaller being excessively melted or, conversely, the optical fiber 30 whose external diameter is larger not being melted.

Figure 39:
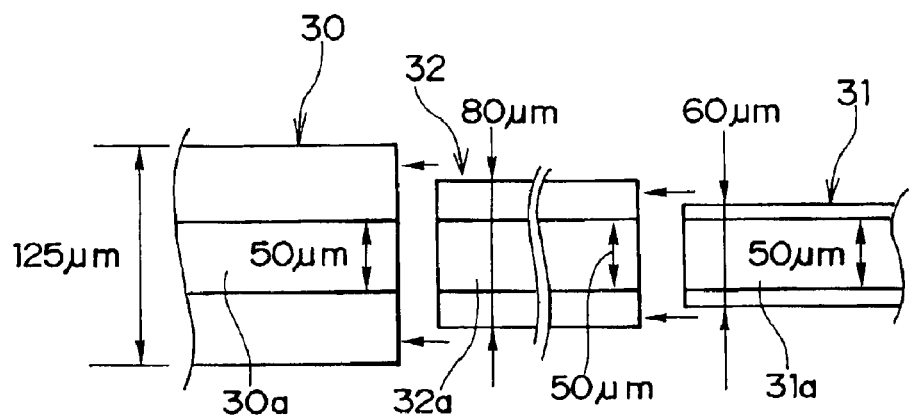
FIG. 39 is a view for explaining yet another example of an optical fiber connection method.

Next, yet another optical fiber connection method will be described, with reference to FIG. 39. In this example, first, the distal end portion of the multi-mode optical fiber 30 is fusion-spliced with a multi-mode optical fiber 32 having an external diameter of 80 $\mu$m, which is smaller than the external diameter of the multi-mode optical fiber 30 and larger than the external diameter of the multi-mode optical fiber 31. Then the distal end portion of the multi-mode optical fiber 32 with the intermediate diameter is fusion-spliced with the multi-mode optical fiber 31 whose external diameter is smaller than that of the multi-mode optical fiber 32.

As described above, when the multi-mode optical fiber 32 whose external diameter does not differ greatly from that of the multi-mode optical fiber 30 is fusion-spliced to the multi-mode optical fiber 30, the external diameter of the optical fiber 32 whose external diameter is smaller is not excessively melted and, conversely, the optical fiber 30 whose external diameter is larger does not fail to be melted. Further, when the multi-mode optical fiber 31 whose external diameter does not differ greatly from that of the multi-mode optical fiber 32 is fusion-spliced to the multi-mode optical fiber 32, the external diameter of the optical fiber 31 whose external diameter is smaller is not excessively melted and, conversely, the optical fiber 32 whose external diameter is larger does not fail to be melted. As a result, the two optical fibers 30 and 31 can be easily and reliably connected.

Conversely to the above, the multi-mode optical fiber 30 and multi-mode optical fiber 32 may be fusion-spliced after the optical fiber 31 and multi-mode optical fiber 32 have been fusion-spliced. In this case too, the same effects as described above are obtained.

APPLICATION EXAMPLES

The exposure apparatus of the present invention may be suitably applied to an optical modelling device in which a light beam exposes a photo-curable resin to form a three-dimensional model, a lamination modelling device which sinters a powder with a light beam to form sintered layers and accumulates the sintered layers to form a three-dimensional model which is formed by a sintered powder body, and the like.

Figure 34:
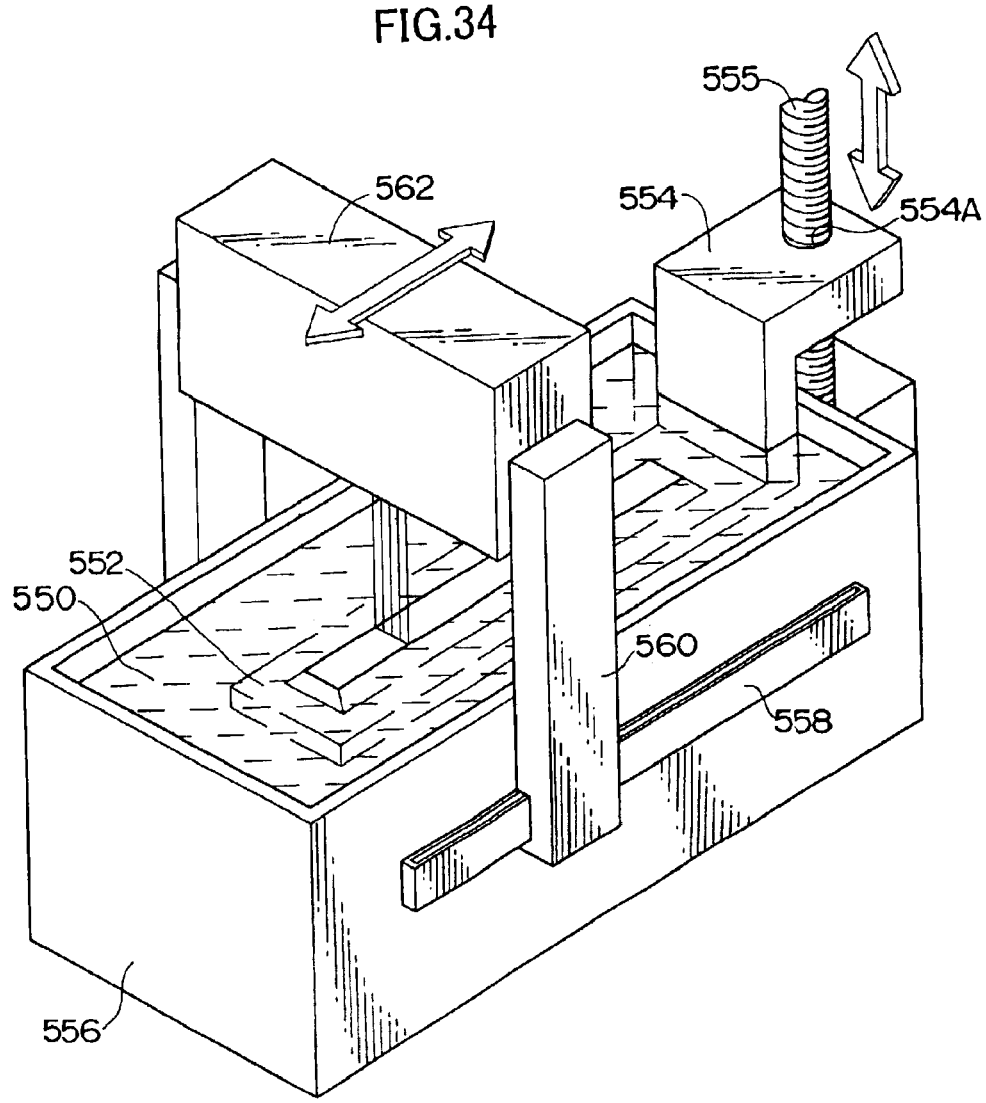
FIG. 34 is a perspective view showing an example in which the present invention is applied in an optical modelling device.

For example, FIG. 34 shows structure of an optical modelling device in which the present invention is applied. This optical modelling device is provided with a tank 556 whose top opens. A photocurable resin 550 is accommodated in the tank 556. A flat board-like ascending/descending stage 552 is disposed in the tank 556. This ascending/descending stage 552 is supported by a support portion 554 which is disposed outside the tank 556. A female screw portion 554A is provided at the support portion 554. This female screw portion 554A is screwingly engaged with a lead screw 555 which is driven to rotate by an unillustrated driving motor. The ascending/descending stage 552 ascends and descends in accordance with the rotation of the lead screw 555.

Above a liquid surface of the ascending/descending stage 552 accommodated in the tank 556, a box-like scanner 562 is disposed with long sides thereof oriented in a direction of short sides of the tank 556. The scanner 562 is supported by two support arms 560, which are attached at two side faces in a short side direction of the scanner 562. The scanner 562 has the same structure as the scanners in the embodiments described above, is provided with a plurality of exposure heads, and is connected to an unillustrated controller which controls the exposure heads.

Respective guides 558, which extend in a longitudinal direction, are provided at two side faces in a long side direction of the tank 556. Lower end portions of the two support arms 560 are attached at these guides 558 so as to be reciprocally movable along the longitudinal direction. In this optical modelling device, an unillustrated driving apparatus is provided for moving the support arms 560 and the scanner 562 along the guides 558.

In this optical modelling device, the scanner 562 is moved at a constant speed along the guides 558, from an upstream side to a downstream side in the longitudinal direction, by the unillustrated driving apparatus. In accordance with the movement of the scanner 562 at the constant speed, the liquid surface of the photocurable resin 550 is scanned, and a strip-form cured region is formed by each recording head. When curing of a portion corresponding to one layer by one cycle of sub-scanning by the scanner 562 has been completed, the scanner 562 is returned along the guides 558 by the unillustrated driving device to a start point at an upstream-most side. Then the lead screw 555 is rotated by the unillustrated driving motor, and the ascending/descending stage 552 descends by a predetermined amount. Thus, the cured portion of the photocurable resin 550 is submerged below the liquid surface, and the liquid-form photocurable resin 550 fills the space above the cured portion. Hence, the sub-scanning is carried out by the scanner 562 repeatedly. In this manner, exposure (curing) by the sub-scanning and lowering of the stage is carried out repeatedly and, by accumulating the cured portions, a three-dimensional model is formed. Because the high-brightness laser apparatus of the present invention is utilized at the exposure heads of the scanner 562, deep focal depth can be obtained. Thus, modelling can be carried out with high-speed and high accuracy.

According to the present invention, a high-brightness laser apparatus is provided. Further, when an exposure apparatus and/or exposure head of the present invention utilizes this high-brightness laser apparatus, an effect that deep depth of focus can be obtained is additionally produced. Further still, in the case of an area-type exposure beam, an effect that beam blurring at peripheral edge portions can be suppressed is provided. Further yet, in a case in which a multiplex laser light source is utilized as the high-brightness laser apparatus, an effect that the exposure apparatus and exposure head can be designed for higher output and lower costs is obtained.

What is claimed is:

1. An exposure head comprising:
   a laser apparatus including a fiber light source which includes an optical fiber with an incidence end and an emission end, the fiber light source emitting laser light that enters the incidence end of the optical fiber from the emission end of the optical fiber, the optical fiber including an optical fiber having a uniform core diameter and a cladding diameter of the emission end which is smaller than a cladding diameter of the incidence end;
   a spatial modulation element which modulates laser light irradiated from the laser apparatus, the spatial modulation element including numerous pixel portions, light modulation states of which change in accordance with respective control signals, the pixel portions being arranged in a two-dimensional form on a support; and
   an optical system for focusing laser light that has been modulated at the pixel portions on an exposure surface.

2. The exposure head of claim 1, wherein the spatial modulation element comprises a micromirror device which includes numerous micromirrors arranged in the two-dimensional form on the support, angles of reflection surfaces of the micromirrors being changeable in accordance with the respective control signals.

3. The exposure head of claim 1, wherein the spatial modulation element comprises a grating light valve which includes numerous movable grilles, which are provided with ribbon-like reflection surfaces and are movable in accordance with the control signals, and fixed grilles, which are provided with ribbon-like reflection surfaces, the numerous movable grilles and fixed grilles being alternately disposed in parallel.

4. The exposure head of claim 1, further comprising, at an emission side of the spatial modulation element, a microlens array which includes microlenses which are disposed in correspondence with the pixel portions of the spatial modulation element for condensing the laser light at each pixel.

5. The exposure head of claim 1, further comprising, between the laser apparatus and the spatial modulation element:
   a collimator lens for making luminous flux from the laser apparatus parallel flux; and
   a light intensity distribution-correcting optical system which converts a luminous flux width at each of emission positions thereof such that a ratio of a luminous flux width at a peripheral edge portion to a luminous flux width at a central portion, which is near an optical axis, is smaller at an emission side of the light intensity distribution-correcting optical system than at an incidence side thereof, and corrects a light intensity distribution of the laser light that has been converted to parallel flux by the collimator lens so as to be substantially uniform at irradiated surfaces of the spatial modulation element.

6. An exposure apparatus comprising:
   an exposure head which includes
   a laser apparatus including a fiber light source which includes an optical fiber with an incidence end and an emission end, the fiber light source emitting laser light that enters the incidence end of the optical fiber from the emission end of the optical fiber, the optical fiber including an optical fiber having a uniform core diameter and a cladding diameter of the emission end which is smaller than a cladding diameter of the incidence end,
   a spatial modulation element which modulates laser light irradiated from the laser apparatus, the spatial modulation element including numerous pixel portions, light modulation states of which change in accordance with respective control signals, the pixel portions being arranged in a two-dimensional form on a support, and
   an optical system for focusing laser light that has been modulated at the pixel portions on an exposure surface; and
   moving means which moves the exposure head relatively with respect to the exposure surface.

* * * * *